(12) United States Patent
  Gale

(10) Patent No.: US 12,691,962 B2
(45) Date of Patent: Jul. 28, 2026

(54) ANCHOR FOR AN ANGLE RAIL UTILITY TRAILER

(71) Applicant: Indiana Mills & Manufacturing, Inc., Westfield, IN (US)

(72) Inventor: Steven Gale, Colfax, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 375 days.

(21) Appl. No.: 18/444,958

(22) Filed: Feb. 19, 2024

(65) Prior Publication Data

US 2025/0263140 A1    Aug. 21, 2025

(51) Int. Cl.
  B62D 63/08          (2006.01)

(52) U.S. Cl.
  CPC ..................................... B62D 63/08 (2013.01)

(58) Field of Classification Search
  CPC ...................................................... B62D 63/08
  See application file for complete search history.

(56) References Cited

U.S. PATENT DOCUMENTS

| | | | | |
|---|---|---|---|---|
| 4,067,601 A * | 1/1978 | Tuerk | .................. | B62D 33/033 |
| | | | | 52/704 |
| 4,231,606 A * | 11/1980 | Tuerk | ..................... | B62D 33/08 |
| | | | | 280/143 |
| 5,320,396 A * | 6/1994 | Petelka | ................... | B60J 7/104 |
| | | | | 296/43 |
| 7,768,428 B1 * | 8/2010 | Leisure | ................ | E01F 13/028 |
| | | | | 340/908.1 |
| 9,085,332 B2 * | 7/2015 | McBride | .............. | B62D 33/023 |
| 10,166,906 B1 * | 1/2019 | Lau | ............................ | B60J 5/08 |
| 2010/0109367 A1 * | 5/2010 | Mihalko | .............. | B62D 33/044 |
| | | | | 296/43 |

* cited by examiner

*Primary Examiner* — Faye M Fleming
(74) *Attorney, Agent, or Firm* — Barnes & Thornburg

(57) ABSTRACT

An anchor is configured to be slidably received within an elongated channel defined between a base rail and an upright angle rail of an angle rail utility trailer. The anchor includes an elongated body having first and second side walls configured complementary to the channel so as to be slidably receivable within the channel, an anchor head extending from a top end of the first and/or second side wall, at least one support surface configured to engage the bottom rail of the trailer to support the body of the anchor received within the channel on the bottom rail with the anchor head extending above the bottom rail, and means for engaging the first and/or second side wall and/or bottom rail following insertion of the elongated body into the channel to prevent or restrict upward movement of the anchor within the channel.

20 Claims, 35 Drawing Sheets

ANCHOR FOR AN ANGLE RAIL UTILITY TRAILER

FIELD OF THE INVENTION

The present disclosure relates generally to anchors and anchor systems for utility trailers, and more specifically to anchors and anchor systems for angle rail utility trailers.

BACKGROUND

Utility trailers are typically constructed with framing components making up at least a front wall and two side walls. Generally, three different shapes of steel, other metal, and/or metal composite, are used to construct a trailer frame; box tubing, so-called channel iron, and so-called angle iron. A box tubing frame component is generally a closed, hollow structure, e.g., in the form of a square or rectangle, a channel iron frame component is similar to box tubing but contains a channel extending along one of the sides, and an angle iron frame component is an elongated piece worked or otherwise provided in the shape of a two-sided, open-ended triangle. This disclosure is directed to anchors and anchor systems for so-called angle iron utility trailers.

SUMMARY

The present invention may comprise one or more of the features recited in the attached claims, and/or one or more of the following features and combinations thereof. In a first aspect, an anchor is configured to be slidably received within an elongated channel defined between and bounded by a base rail and an upright angle rail of an angle rail utility trailer. The anchor may comprise an elongated body including an elongated first side wall and an elongated second side wall extending laterally away at an angle from the elongated first side wall, each of the first and second side walls defining a respective top end and a bottom end opposite the top end, the elongated body sized and configured complementary to the elongated channel so as to be slidably receivable within the elongated channel, an anchor head extending from the top end of at least one of the first and second side walls, the anchor head configured to secure at least one structure thereto, wherein at least one of the anchor head, the first side wall and the second side wall defines at least one support surface configured to engage the bottom rail of the angle rail utility trailer to support the body of the anchor received within the channel on the bottom rail with the anchor head extending above the bottom rail, and means for engaging at least one of the first and second side walls at or near a respective bottom end thereof and at least one of the bottom rail and a lower terminal end of the upright angle rail following insertion of the elongated body into the channel to prevent or restrict upward movement of the anchor within the channel.

In a second aspect, an anchor is configured to be slidably received within an elongated channel defined between and bounded by a base rail and an upright angle rail of an angle rail utility trailer. The anchor may comprise an elongated body including an elongated first side wall and an elongated second side wall extending laterally away at an angle from the elongated first side wall, each of the first and second side walls defining a respective top end and a bottom end opposite the top end, the elongated body sized and configured complementary to the elongated channel so as to be slidably receivable within the elongated channel, an anchor head extending from the top end of at least one of the first and second side walls, the anchor head configured to secure at least one engagement structure thereto, wherein at least one of the anchor head, the first side wall and the second side wall defines at least one support surface configured to engage the bottom rail of the angle rail utility trailer to support the body of the anchor received within the channel on the bottom rail with the anchor head extending above the bottom rail, and an anchor coupling structure configured to detachably engage at least one of the first and second side walls at or near a respective bottom end thereof, the anchor coupling structure sized and configured such that, with the elongated body received within the channel and the engagement member engaged with the at least one of the first and second side walls at or near a respective bottom end thereof, the anchor coupling structure prevents or restricts upward movement of the elongated body within the channel by contact with at least one of the bottom rail and a lower terminal end of the upright angle rail.

DETAILED DESCRIPTION OF THE DRAWINGS

Figure 1:
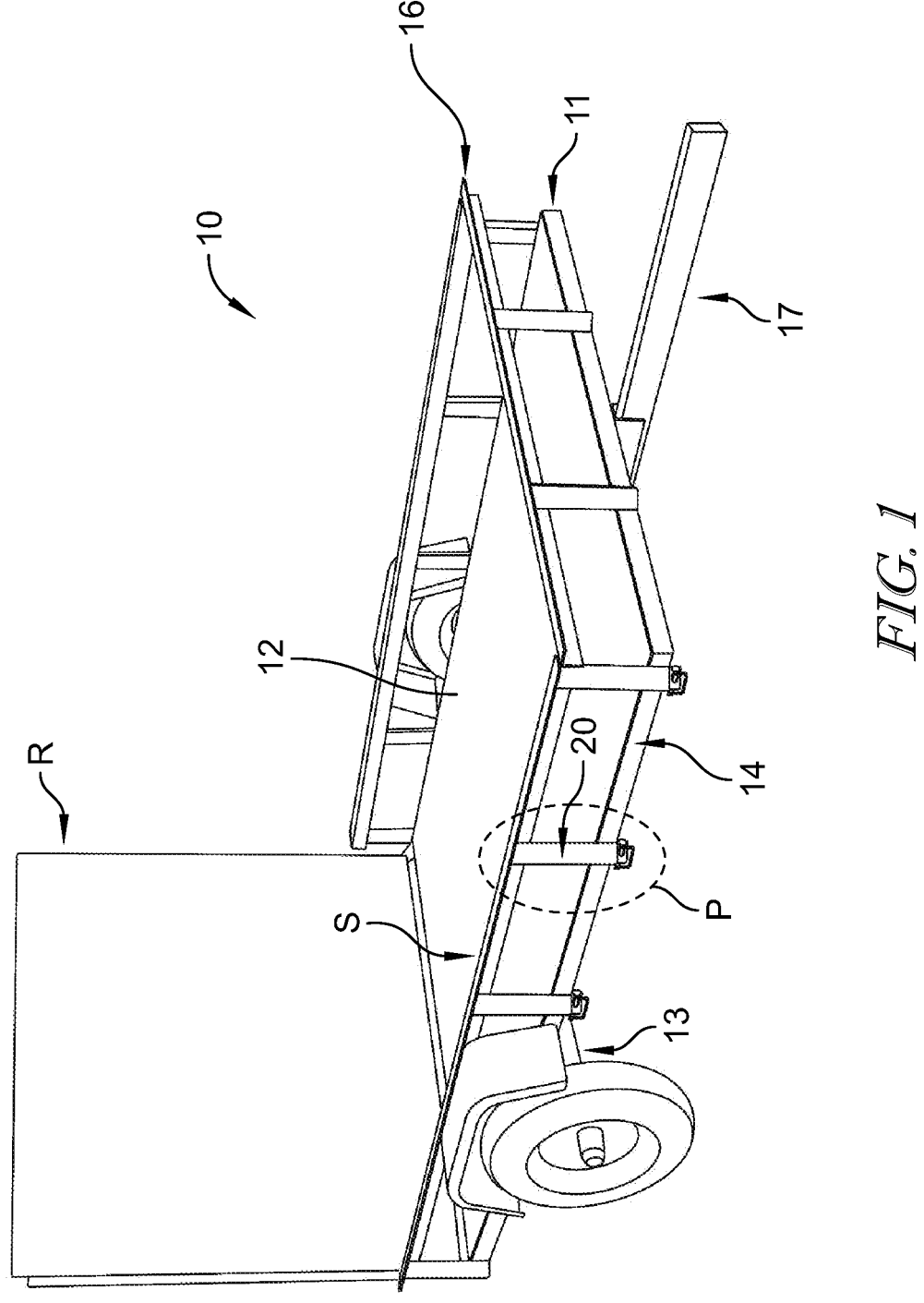
FIG. 1 is a front perspective view of an angle rail utility trailer including an embodiment of a number of anchors each mounted in one of a number of different channels each defined between the bottom rail of the trailer and a different one of the upright angle rails attached to and between the bottom rail and a top rail of the trailer.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Referring now to FIGS. 1-6, an embodiment is shown of a tie down anchor 30 configured to be removably coupled to and between an upright angle rail 20 and a bottom or base rail 14 of a conventional angle iron utility trailer. It will be understood that the term "iron" used in the phrase "angle iron utility trailer" is a term of art in the utility trailer industry, and should not be interpreted to mean that one or more frame components of such a trailer is/are made of iron. To avoid confusion, the remainder of this disclosure will refer to a conventional "angle iron utility trailer" as an "angle rail utility trailer," wherein the rails of such a utility trailer may be made of steel, other metal, including but not limited to iron, other metal composite, other suitable material(s), and/or a combination of any such material(s). In any case, the term "angle rail utility trailer," as used herein, will be understood to mean a utility trailer in which at least a number of spaced-apart upright "angle rails" 20 are coupled to and between a base platform including a number of bottom or base rails 14 coupled together to form a perimeter configured to support a conventional floor or bed of the utility trailer, and a top rail assembly including a number of top rails coupled together to form at least a portion of a perimeter configured to be vertically spaced apart from the base platform, wherein the top rail assembly is suspended above the base platform by the number of spaced-apart upright angle rails 20.

The term "angle rail," as used herein, will be understood to mean an elongated structure having two substantially planar sides, wherein the two substantially planar sides are of unitary construction or are coupled to one another along their lengths, and wherein an angle is defined between the two substantially planar sides along the length of the angle rail such that the angle rail defines an open-ended triangle in lateral cross-section. In the various embodiments illustrated by example in the attached drawings, the two substantially planar sides of the upright angle rail define about a 90-degree angle therebetween such that the two planar sides together form at least approximately a right angle, although it will be understood that in alternate embodiments the angle defined between the two substantially planar sides of the upright angle rail may be greater or less than 90 degrees. Also in the various embodiments illustrated by example in the attached drawings, the bottom or base rails 14 used to construct the base platform and the top rails used to construct the top rail assembly are also "angle rails" as just defined, although it will be understood that in alternate embodiments one or more of the bottom or base rails may be provided in the form of conventional box tubing, channel iron or rail(s) of other conventional shapes/configurations, and/or one or more of the top rails may be provided in the form of conventional box tubing, channel iron or rail(s) of other conventional shapes/configurations.

Before describing the various embodiments of the tie down anchors and and/or systems illustrated by example in the attached drawings, construction of a conventional angle rail utility trailer 10, illustrated by example in FIGS. 1-3 and 5-6, will be described to make clear how and where, relative to the frame components of the angle iron utility trailer 10, such anchors and anchor systems will engage and be coupled to the trailer 10. In the typical constructions of an angle rail utility trailer 10 depicted by example in FIG. 1, a number of bottom or base rails 14 are secured together, e.g., by welding, to form a closed-perimeter base platform 11 configured to support a floor or bed 12 of the trailer 10. The base platform 11 formed by the bottom or base rails 14 is secured to at least one conventional axle assembly 13 and to a conventional tongue assembly 17 in a conventional manner. A number of top rails 18 are likewise secured together to form a top rail assembly 16, typically in the same general shape as the base platform 11 formed by the bottom or base rails 14, and a number of spaced apart upright angle rails 20 are secured to and between the bottom or base rails 14 and the top rails 18 to support the top rail assembly 16 and form opposed side walls, a front and, in some cases, at least a portion of a rear of the utility trailer 10. In the illustrated embodiment, the rear of the utility trailer 10 is fitted with a conventional loading ramp R, e.g., for loading and unloading of wheeled vehicles onto and from the utility trailer 10. In some alternate embodiments, the rear of the utility trailer may be fitted with a conventional tailgate configured to be pivotable or otherwise movable relative to the base platform 11, and in such embodiments the tailgate may or may not be constructed of upright angle rails and/or one or more top rails. In any case, in the example depicted in FIG. 1, which should not be considered to be limiting in any way, one side wall S of the angle rail utility trailer 10 is formed by at least three spaced-apart upright angle rails 20 secured to and between one bottom or base rail 14 and one top rail 18. It will be understood that the bottom or base rail 14, the top rail 18, and/or one or more of the upright angle rails 20 may each be a single piece or may be formed by two or more pieces secured to one another.

Figure 2A:
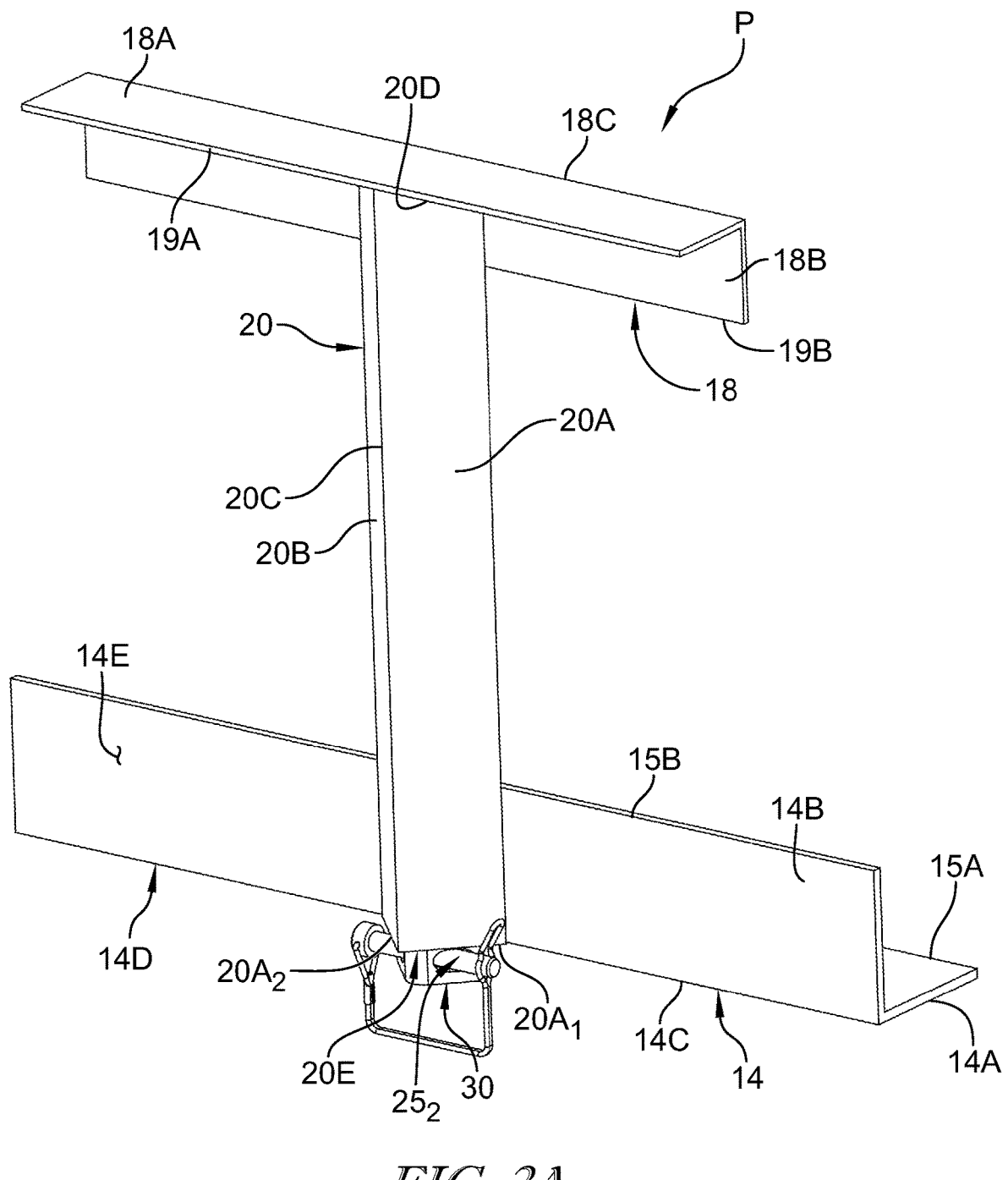
FIG. 2A is a magnified view of the outwardly-facing portion P of the trailer of FIG. 1, i.e., the portion P facing outwardly away from the trailer.
Figure 2B:
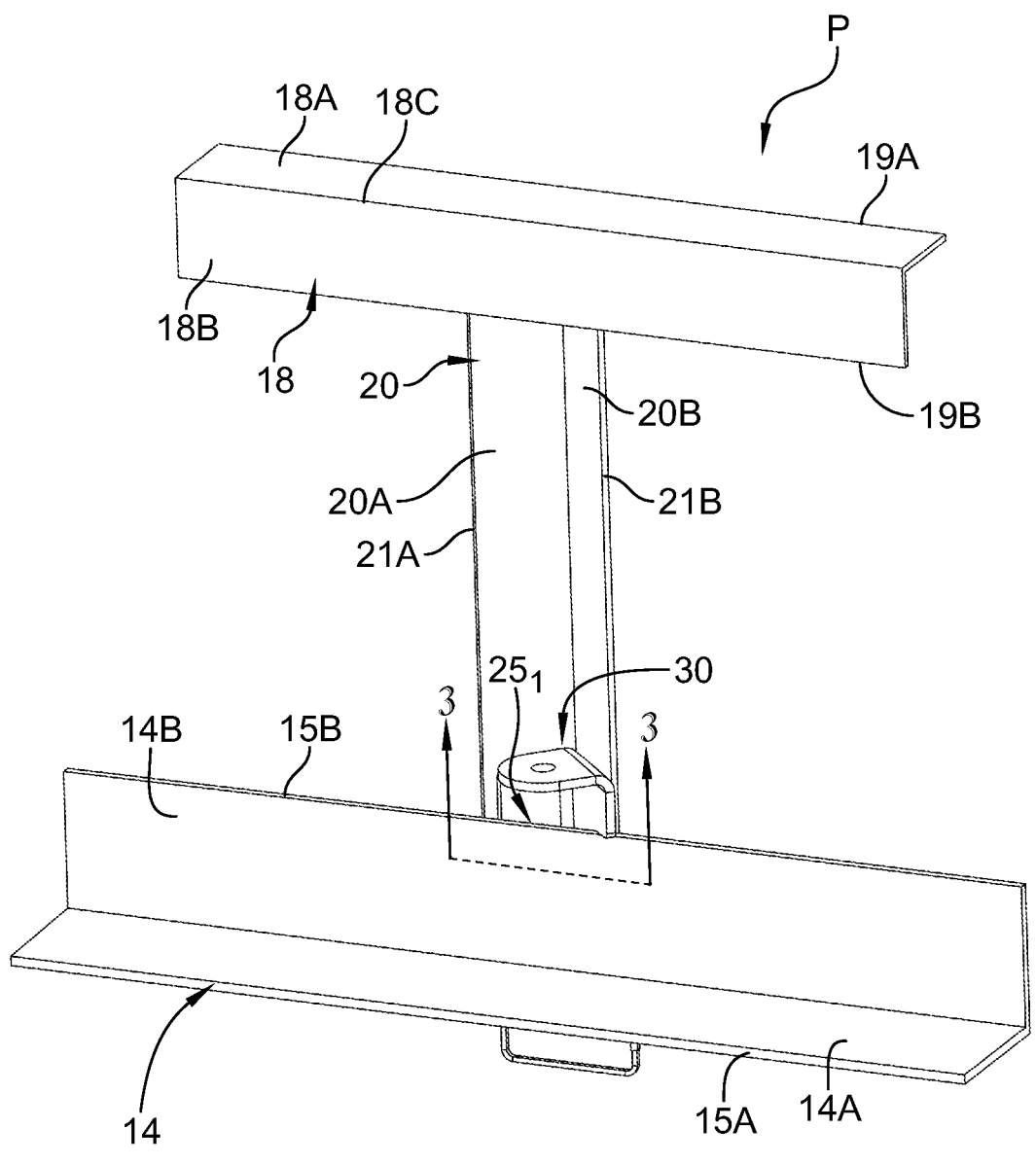
FIG. 2B is a magnified view of the inwardly-facing portion P of the trailer of FIG. 1, i.e., the portion P facing inwardly toward an interior of the trailer.

Referring now to FIGS. 2A and 2B, the portion P of the side wall S of the angle rail utility trailer 10 illustrated in FIG. 1 is shown, wherein FIG. 2A shows the portion P of the exterior side of the side wall S, i.e., the side of the angle rail utility trailer 10 that faces outwardly away from the trailer 10, and FIG. 2B shows the portion P of the interior side of the side wall S, i.e., the side of the angle rail utility trailer 10 that faces inwardly toward the interior of the trailer 10. In the illustrated embodiment, the bottom or base rail 14 is an elongated structure illustratively provided in the form of an angle rail, as this term is defined above, including planar side walls 14A and 14B each extending away from an apex 14C of the bottom or base rail 14 to a terminal end 15A, 15B of the respective side wall 14A, 14B. As described above in the definition of an angle rail, the side walls 14A, 14B form an angle therebetween such that the base or bottom rail 14 defines an open-ended triangle in lateral cross-section, with the apex 14C forming an apex of the open-ended triangle. In the illustrated embodiment, the angle between the side walls 14A, 14B of the base or bottom rail 14 is approximately 90 degrees such that the side walls 14A, 14B form substantially a right angle therebetween, and the base or bottom rail 14 is oriented such that an interior and upwardly-facing surface of the side wall 14A is positioned horizontally (relative to a flat and level surface upon which the trailer 10 is positioned) with the terminal end 15A of the side wall 14A facing the interior of the trailer 10 so as to support the floor or bed 12 of the utility trailer 10 (as illustrated by example in FIG. 1), and such that the side wall 14B extends upwardly away from, at a substantially right angle relative to, the side wall 14A, such that the terminal end 15B of the side wall 14B extends above the apex 14C of the base or bottom rail 14.

The top rail 18 is likewise an elongated structure illustratively provided in the form of an angle rail, as this term is defined above, including planar side walls 18A and 18B each extending away from an apex 18C of the top rail 18 to a terminal end 19A, 19B of the respective side wall 18A, 18B. The side walls 18A, 18B form an angle therebetween such that the top rail 18 defines an open-ended triangle in lateral cross-section, with the apex 18C forming an apex of the open-ended triangle. In the illustrated embodiment, the angle between the side walls 18A, 18B of the top rail 18 is approximately 90 degrees such that the side walls 18A, 18B form substantially a right angle therebetween, and the top rail 18 is oriented such that an interior and downwardly-facing surface of the side wall 18B is positioned horizontally (relative to a flat and level surface upon which the trailer 10 is positioned) with the terminal end 19A of the side wall 18A facing outwardly away from the trailer 10, and such that the side wall 18B extends downwardly away from, at a substantially right angle relative to, the side wall 18A, such that the terminal end 19B of the side wall 18B extends below the apex 18C of the top rail 18 and the exterior surface of the side wall 18B faces the interior of the utility trailer 10.

The upright angle rail 20, illustrated by example in FIGS. 2A and 2B, is an elongated structure illustratively provided in the form of an angle rail, as this term is defined above, including planar side walls 20A and 20B each extending away from an apex 20C of the upright angle rail 20 to a terminal end 21A, 21B of the respective side wall 20A, 20B. The side walls 20A, 20B form an angle therebetween such that the upright angle rail 20 defines an open-ended triangle in lateral cross-section, with the apex 20C forming an apex of the open-ended triangle. The upright angle rail 20 has a length defined between a top end 20D of the side walls 20A, 20B and a bottom end 20E of the side walls 20A, 20B. In the illustrated embodiment, the length of the side wall 20A is the same as the length of the side wall 20B, and the top ends of the side walls 20A, 20B are coterminous as are the bottom ends 21A$_1$, 21A$_2$ of the side walls 20A, 20B such that the top end 20D and the bottom end 20E of the upright angle rail 20 are both planar in the transverse direction. In the illustrated embodiment, the angle between the side walls 20A, 20B of the upright angle rail 20 is approximately 90 degrees such that the side walls 20A, 20B form substantially a right angle therebetween, although in alternate embodiments the angle between the side walls 20A, 20B may be greater or less than 90 degrees.

The top end 20D of the upright angle rail 20 is illustratively received into contact with the downwardly-facing surface of the side wall 18A of the top rail 18, and with the terminal ends 21A, 21B of the respective side walls 20A, 20B in contact with the outwardly-facing surface (i.e., facing away from the utility trailer 10) of the side wall 18B of the top rail 18. With the upright angle rail 20 and the top rail 18 so positioned, the upright angle rail 20 and the top rail 18 are secured to one another, such as by welding or by one or more other conventional securement device(s), medium(s) and/or technique(s). In some embodiments, at least one of the terminal ends 21A, 21B of the respective side walls 20A, 20B is secured to the outwardly-facing surface of the side wall 18B. Alternatively or additionally, at least one of the top ends of the respective side walls 20A, 20B may be secured to the downwardly-facing surface of the side wall 18A. In some embodiments, such as illustrated by example in FIG. 2A, the upright angle rail 20 and the top rail 18 are sized such that, when secured to one another as just described, the apex 20C of the upright angle rail 20 is coterminous with the terminal end 19A of the side wall 18A of the top rail 18. In alternative embodiments, the upright angle rail 20 and/or the top rail 18 may be sized such that, when secured to one another as just described, the terminal end 19A of the side wall 18A extends laterally (i.e., horizontally) beyond the apex 20C of the upright angle rail 20, or such that, when secured to one another as just described, the apex 20C of the upright angle rail 20 extends laterally (i.e., horizontally) beyond the terminal end 19A of the side wall 18A of the top rail 18. In some alternative embodiments, the top end 20D of the upright angle rail 20 may be spaced apart from the downwardly-facing surface of the side wall 18A of the top rail 18.

The terminal ends 21A, 21B of the respective side walls 20A, 20B of the upright angle rail 20 adjacent to and near the bottom end 20E of the upright angle rail 20 are positioned in contact with the outwardly-facing surface 14E (i.e., facing away from the utility trailer 10) of the side wall 14B of the bottom rail 14. In the embodiment illustrated by example in FIG. 2A, the bottom end 20E of the upright angle rail 20 is positioned flush with the downwardly-facing surface 14D of the side wall 14A of the bottom rail 14 such that each of the bottom ends 20A$_1$, 20A$_2$ of the respective side walls 20A, 20B of the upright angle rail 20 are flush with the surface 14D, although in alternate embodiments the bottom end 20E of the upright angle rail 20 may terminate at a position along the side wall 14B above the apex 14C of the bottom rail 14 or may extend below the downwardly-facing surface 14D of the side wall 14A of the bottom rail 14. In any case, with the upright angle rail 20 and the bottom rail 14 so positioned relative to one another, the upright angle rail 20 and the bottom rail 14 are secured to one another, such as by welding or by one or more other conventional securement device(s), medium(s) and/or technique(s). In some embodiments, both of the terminal ends 21A, 21B of the respective side walls 20A, 20B of the upright are secured to the outwardly-facing surface 14E of the side wall 14B of the bottom rail 14, and in some alternative embodiments only one of the terminal ends 21A, 21B of the respective side walls 20A, 20B of the upright angle rail 20 is secured to the outwardly-facing surface 14E of the side wall 14B of the bottom rail 14.

The height of the top rail 18 relative to the bottom rail 14 depends on the position at which the upright angle rail 20 is secured to the top rail 18 relative to the top end 20D of the upright angle rail 20 and the downwardly-facing surface of the side wall 18A of the top rail, and the position at which the upright angle rail 20 is secured to the bottom rail 14 relative to the bottom end 20E of the upright angle rail 20 and the downwardly-facing surface 14D of the side wall 14A of the bottom rail 14. If, for example as described above and illustrated by example in FIGS. 2A and 2B, the upright angle rail 20 is secured to the top rail 18 with the top end 20D of the upright angle rail 20 in contact with the downwardly-facing surface of the side wall 18A of the top rail 18, and the upright angle rail 20 is secured to the bottom rail 14 with the bottom end 20E of the upright angle rail 20 flush with the downwardly-facing surface 14D of the side wall 14A of the bottom rail 14, the height of the top rail 18 relative to the bottom rail 14 will be equal to the sum of the length of the upright angle rail 20 (i.e., between the top and bottom ends 20D, 20E) and the thickness of the side wall 18A of the top rail 18. The height of the top of the side wall S of the utility trailer 10 above the bed or floor 16 in such embodiments will be the height just described less the sum of the thickness of the side wall 14A of the bottom rail 14 and the thickness of the floor or bed 16 supported on the upwardly-facing surface of the side wall 14A of the bottom rail 14. These heights will, of course, be different if the upright angle rail 20 is positioned differently with respect to the top rail 18 and/or with respect to the bottom rail 14, as described above.

Figure 3:
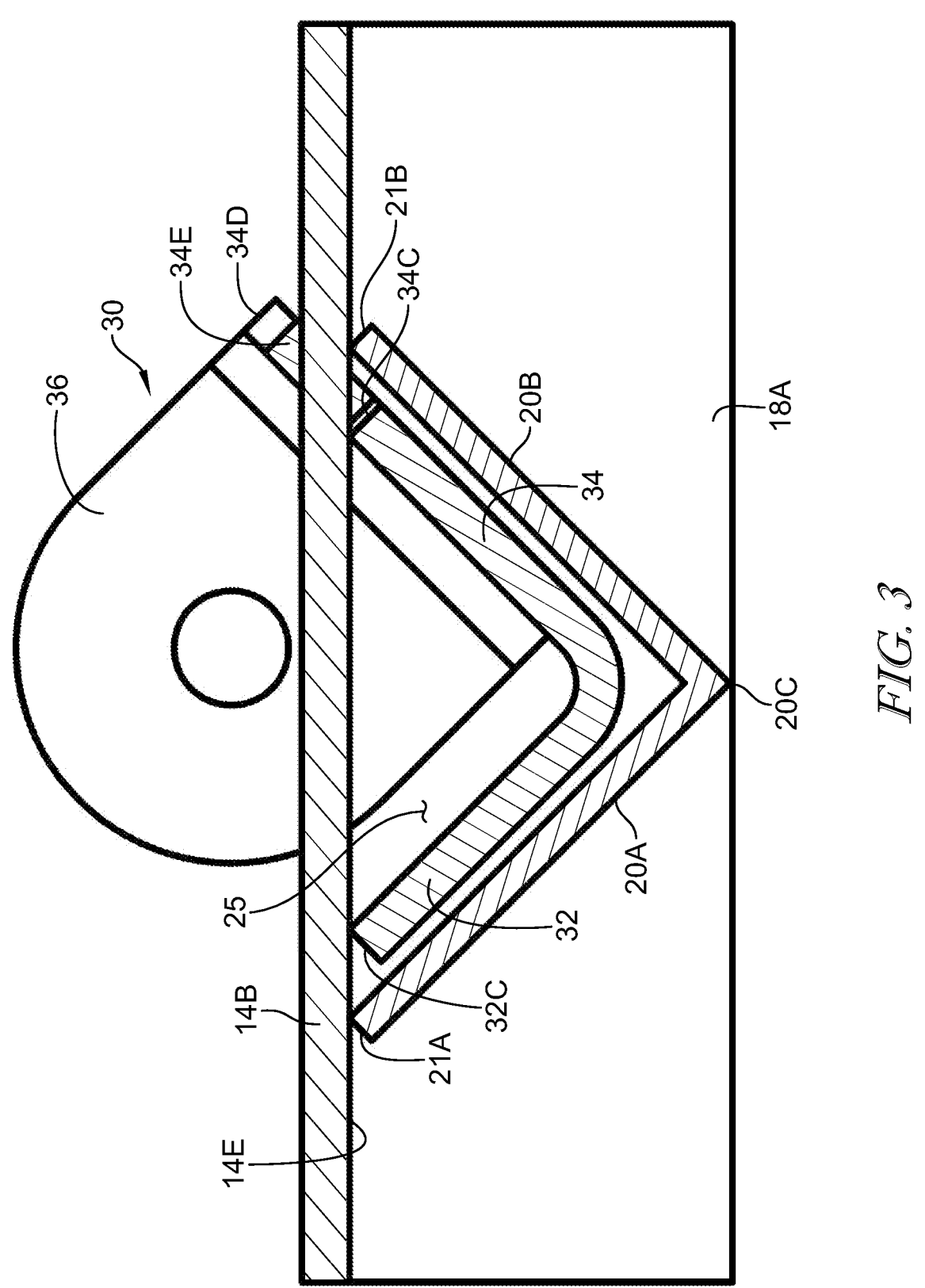
FIG. 3 is a cross-sectional view of the channel defined between the upright angle rail and the bottom rail of FIGS. 2A and 2B as viewed along the section line 3-3 of FIG. 2B.
Figure 4A:
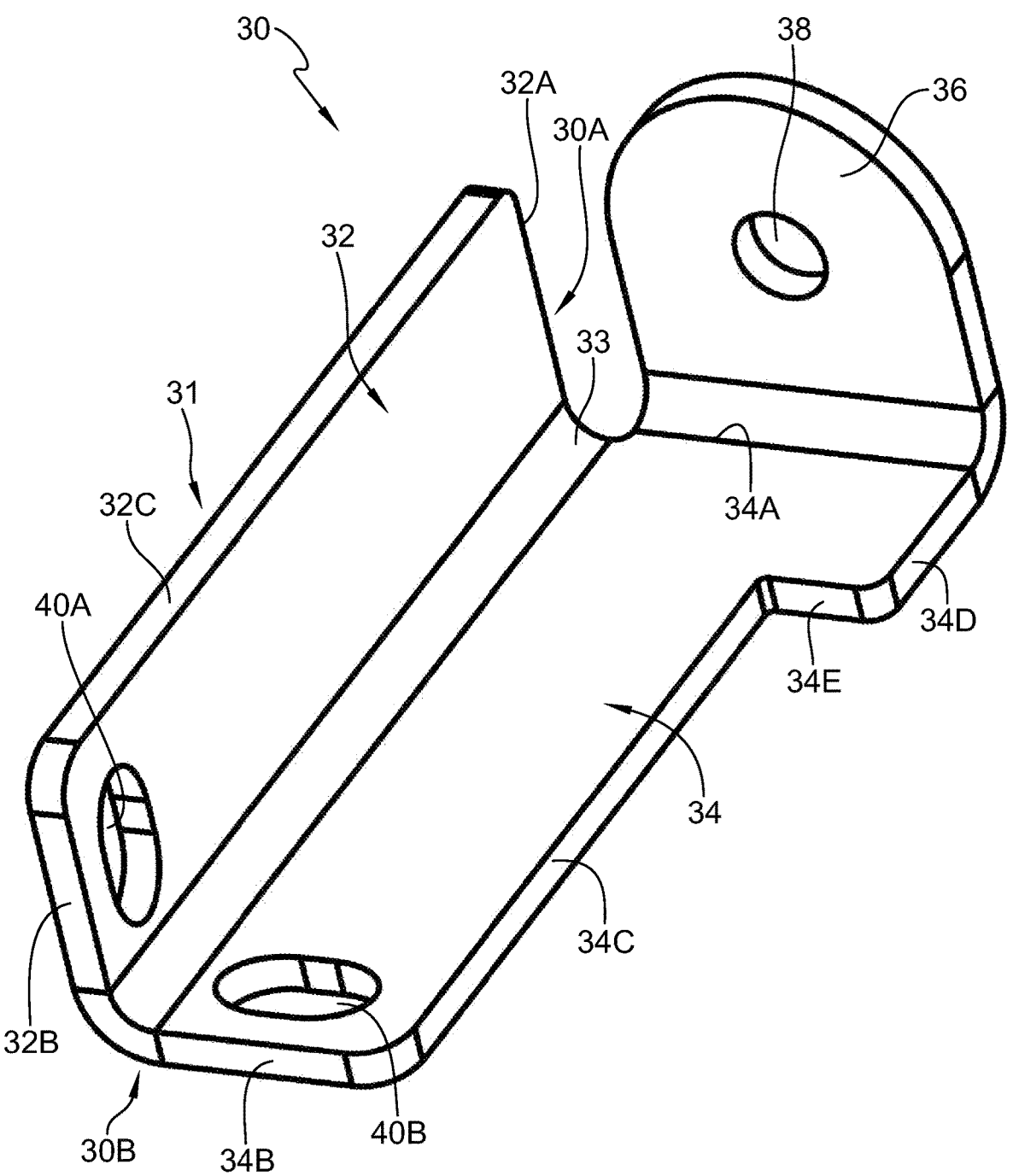
FIG. 4A is a front perspective view of an embodiment of an anchor mountable to and within a channel defined between a bottom rail and an upright angle rail of the trailer of FIG. 1.
Figure 4B:
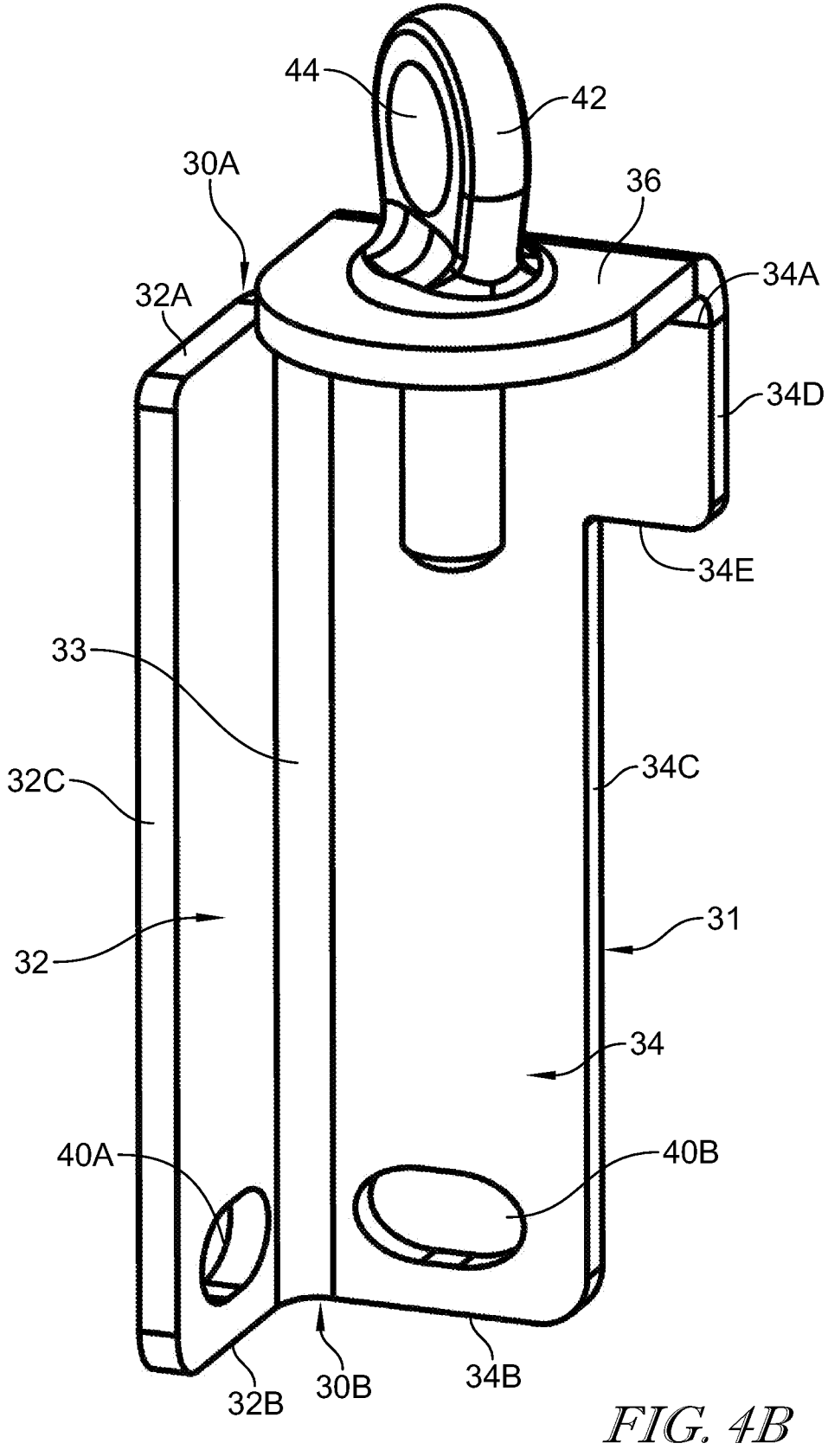
FIG. 4B is a front perspective view of the anchor of FIG. 4A shown with an anchor element mounted to the anchor head of the illustrated anchor.

With the upright angle rail 20 secured to the bottom rail 14 as just described, a channel 25 is defined between the inwardly-facing surfaces of the side walls 20A, 20B of the upright angle rail 20 and the outwardly-facing surface 14E of the side wall 14B of the bottom rail 14, as illustrated in the cross-sectional diagram of FIG. 3. The channel 25 is triangular in lateral cross-section, which triangular cross-section is bounded by the inwardly-facing surfaces of the side walls 20A, 20B of the upright angle rail 20 and the portion of the outwardly-facing surface 14E of the side wall 14B of the bottom rail 14 that extends between the junction of the terminal end 21A of the side wall 20A and the outwardly-facing surface 14E of the side wall 14B, and the junction of the terminal end 21B of the side wall 20B and the outwardly-facing surface 14E of the side wall 14B. The channel 25 has a length extending between a top end 251 of the channel 25 defined by the terminal end 15B of the side wall 14B of the bottom rail 14, and a bottom end 252 of the channel 25. As will be described in detail below, various embodiments of an anchor or anchor system are configured to be removably inserted in the channel 25 and to be secured to and between the bottom rail 14 at the top end 251 of the channel 25 and one or any combination of the bottom end 20A₁ of the side wall 20A of the upright angle rail 20, the bottom end 20A₂ of the side wall 20B of the upright angle rail 20, and the downwardly-facing surface 14D of the side wall 14A of the bottom rail 14, at or near the bottom end 252 of the channel 25. Depending upon the mounting of the upright angle rail 20 relative to the side wall 14B of the bottom rail 14 as described above, the bottom end 252 of the channel 25 may be defined by a combination of the bottom ends 20A₁, 20A₂ of the respective side walls 20A, 20B of the upright angle rail 20 and the downwardly-facing surface 14D of the side wall 14A of the bottom rail in embodiments in which the bottom ends 20A₁, 20A₂ are flush with the surface 14D as depicted by example in FIGS. 2A and 2B, or may be defined only by the combination of the bottom ends 20A₁, 20A₂ of the respective side walls 20A, 20B or only be the downwardly-facing surface 14D of the side wall 14A of the bottom rail 14.

Figure 5:
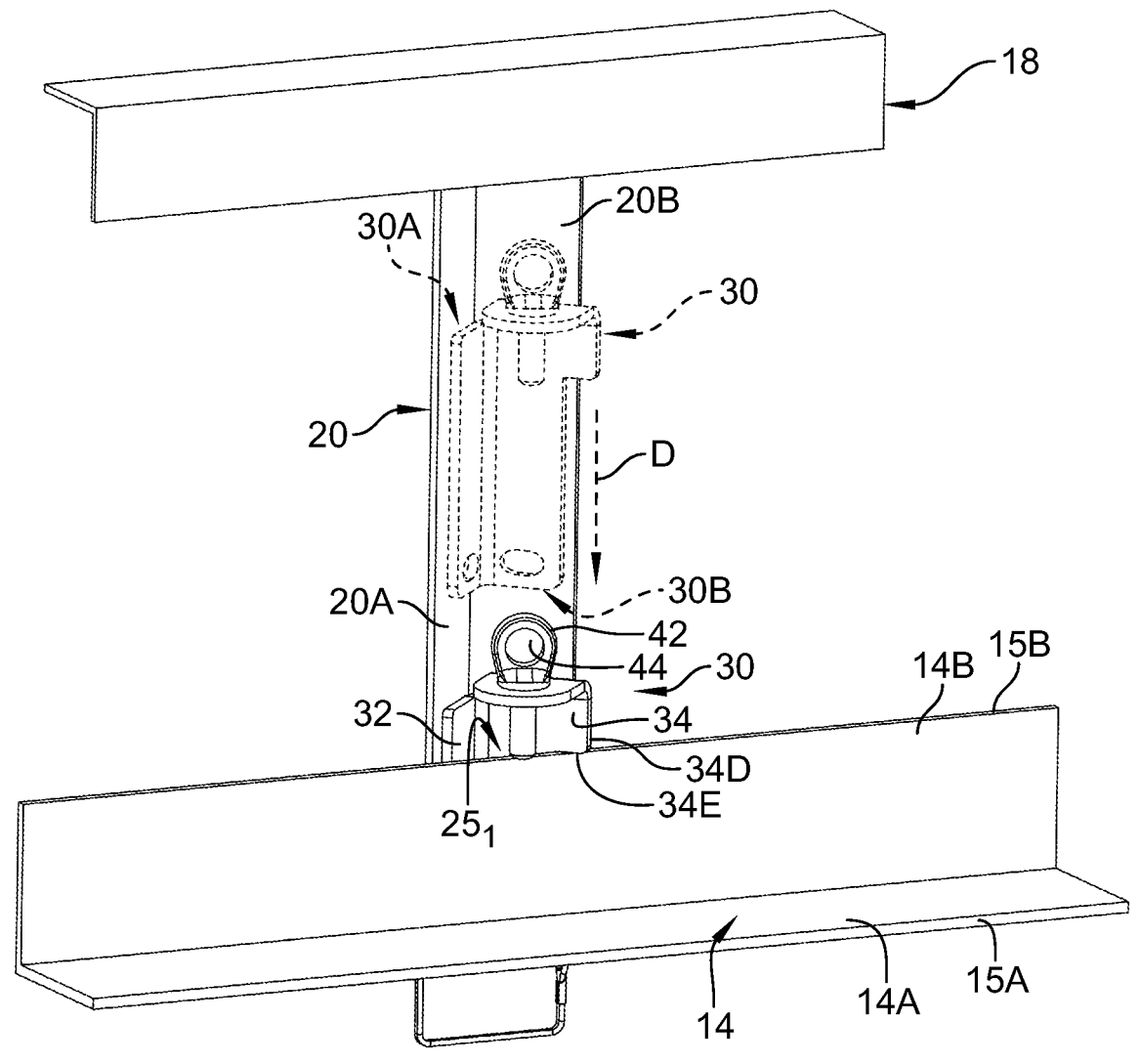
FIG. 5 is a front perspective view similar to FIG. 2B illustrating insertion of the anchor of FIG. 4B into the channel defined between the bottom rail and an upright angle rail of the trailer of FIG. 1.
Figure 6:
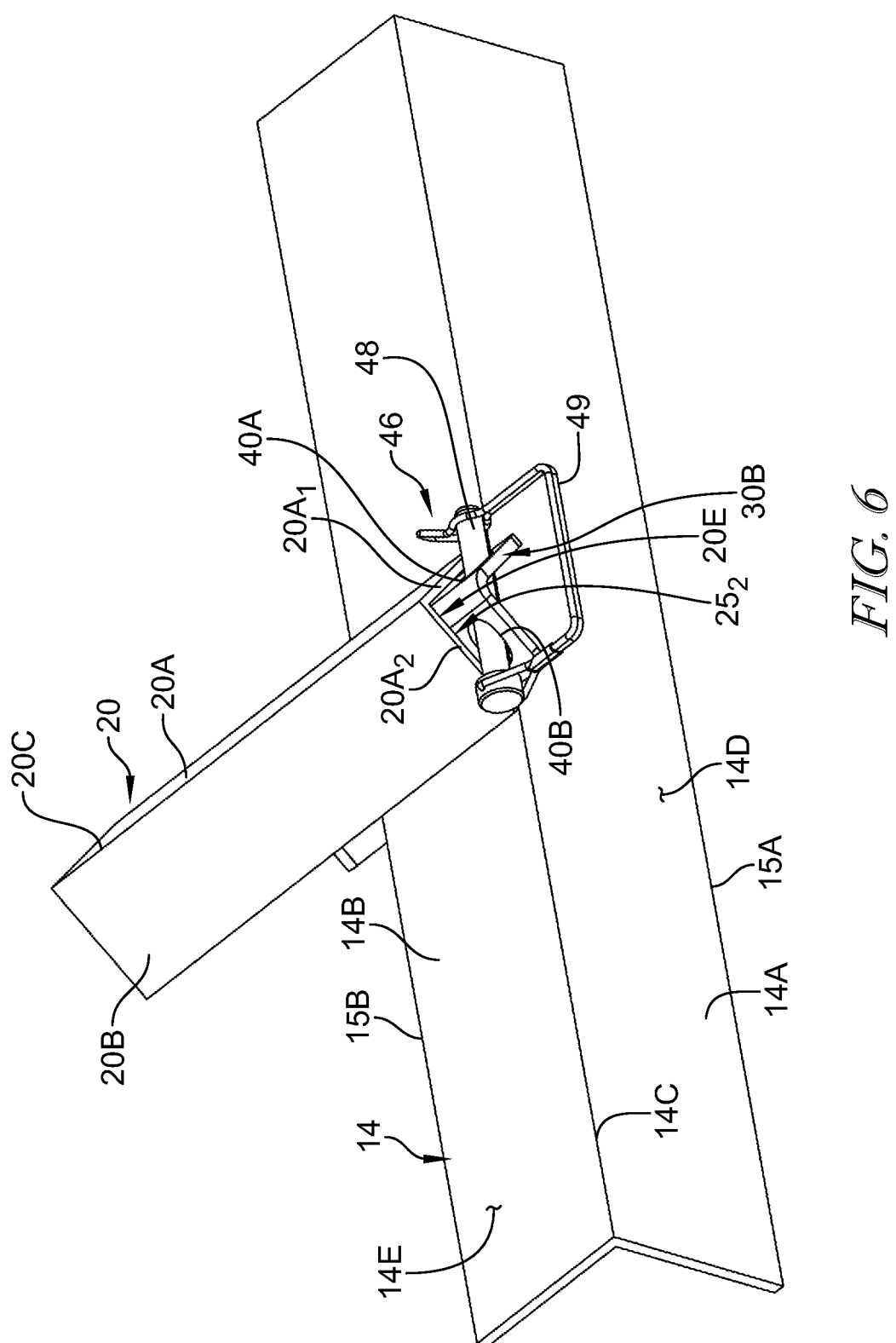
FIG. 6 is a bottom, exterior perspective view of the portion P of FIG. 1 illustrating an embodiment of an anchor coupling structure for preventing upward movement of the anchor of FIGS. 4B and 5 within the channel defined between the bottom rail and an upright angle rail.

As depicted by example in FIGS. 1-6, an embodiment is shown of an anchor 30 configured to be slidably received within the channel 25 defined between the upright angle rail 20 and the bottom rail 14, and to be secured to and between the bottom rail 14 at the top end 251 of the channel 25 and to the upright angle rail 20 and/or to the bottom rail 14 at the bottom end 252 of the channel 25 (or near the bottom end 252 of the channel 25 depending upon the position of the end 20E of the upright angle rail 20 relative to the downwardly-facing surface 14D of the bottom rail 14 as described above). In this regard, it bears pointing out that the channel 25 defined between the upright angle rail 20 and the bottom rail 14 is distinguishable from a conventional "stake pocket," in that the channel 25 (in fact, several channels 25) is/are pre-existing channels defined between the conventional frame components of a conventional angle rail utility trailer as just described, whereas a "stake pocket" is a component that may be added to, i.e., secured to, an otherwise conventional and pre-existing frame component of a utility trailer. In some cases, one or more such stake pockets may be secured to a pre-existing frame structure of a conventional utility trailer and extend outwardly away from such a frame structure, and in other cases one or more such stake pockets may be secured to and between an existing frame structure of the utility trailer and a fascia strip such that the fascia strip extends along, and opposite to, the frame component with the stake pocket(s) positioned therebetween. In any case, such stake pockets, if included on a utility trailer, are not part of, or defined by, conventional frame components of a conventional utility trailer as are the channels 25 illustrated in the attached figures and just described, but are rather additional components that are added to, i.e., secured to, one or more conventional frame components As best shown in FIGS. 4A and 4B, the anchor 30 is an elongated structure having a body 31 illustratively shaped similarly to the upright angle rail 20 and including planar side walls 32 and 34 each extending away from an apex 33 of the body 31 to a respective terminal end. The side wall 32 extends between a top end 32A and a bottom end 32B of the side wall 32, and extends away from the apex 33 of the body 31 to a lateral terminal end 32C. The side wall 34 extends between a top end 34A and a bottom end 34B of the side wall 34. A portion of the side wall 34 extending upwardly from the bottom end 34B extends away from the apex 33 of the body 31 to a lateral terminal end 34C, and another portion of the side wall 34 extending downwardly from the top end 34A extends away from the apex 33 of the boy 31 to another lateral terminal end 34D, wherein the lateral terminal end 34D extends further laterally than does the lateral terminal end 34C such that a step 34E is formed at the intersection of the lateral terminal ends 34C, 34D. The dimensions of the side walls 32, 34 of the body 31 of the anchor 30 are sized complementarily to the dimensions of the channel 25 defined between the upright angle rail 20 and the bottom rail 14 of the frame of the utility trailer 10 such that the body 31 of the anchor can be slidably received within the channel 25. As best shown in FIG. 3, the side walls 32, 34 of the body 31 are illustratively sized such that the dimensions of the portion of the body 31 defined between the lateral terminal ends 32C and 34C of the respective side walls 32, 34 are slightly smaller than the respective dimensions of the channel 25 such that this portion of the body 31 fits snugly within, but is freely slidably relative to, the respective inwardly-facing side walls of the channel 25. As best shown in FIG. 5, the anchor 30 is slidably received within the channel 25 by inserting the bottom end 30B of the body 31 of the anchor 30 into the top end 251 of the channel 25, and then passing the body 31 of the anchor 30 downwardly, indicated by the dashed-line arrow "D" in FIG. 5, into the channel 25 (see, e.g., FIG. 3) until the step 34E defined between the lateral terminal ends 34C and 34D of the side wall 34 comes to rest upon the terminal end 15B of the side wall 14B of the bottom rail 14. The anchor 30 is prevented by the step 34E from passing further into the channel 25, and the anchor 30 is thus supported one the bottom rail 14 by the step 34E. As illustrated by example in FIGS. 2B and 5, the portion of the side wall 34 defined between the step 34E and the top end 34A of the side wall 34, along with a corresponding portion of the side wall 32, extend above the channel 25, i.e., above the terminal end 15B of the side wall 14B of the bottom rail 14, due to the step 34E supporting the anchor 30 on the terminal end 15B of the bottom rail 14.

An anchor head 36 is illustratively integral with, and extends outwardly away from the top end 34A of the side wall 34 of the anchor body 31. In the embodiment illustrated in FIGS. 1-6, the anchor head is provided in the form of a planar, D-shaped plate, e.g., with the same or similar thickness as the side walls 32, 34 of the body 31 of the anchor 30, which illustratively extends perpendicularly away from the inwardly-facing surface of the side wall 34 of the body 31 of the anchor 30, i.e., at an angle of approximately 90 degrees relative to the inwardly-facing planar surface of the side wall 34. The anchor head 36 illustratively defines an anchor opening 38 which extends through the anchor head

36. In some embodiments, the anchor opening 38 is sized for connection thereto of a conventional hook or other engagement structure attached to or integral with a conventional tie-down or anchoring strap. In some embodiments, an eye-bolt 42 is provided and secured to the anchor head 36 via the anchor opening 38, wherein the eyebolt 42 has an opening 44 defined therethrough. The eyebolt 42 and the opening 44 are sized and configured for connection thereto of a conventional hook or other engagement structure attached to or integral with a conventional tie-down or anchoring strap. In this regard, the terms "anchor" and "tie down anchor," as used herein, will be understood to be synonymous with one another. In any case, the anchor head 36 is positioned above the step 34E defined between lateral terminal ends 34C and 34D of the side wall 34 of the anchor body 31, such that as the anchor 30 is prevented by the step 34E from passing further downwardly into the channel 25, the anchor head 36 is maintained by the step 34E in a fixed position above the terminal end 15B of the side wall 14B of the bottom rail 14 at all times.

The bottom end 30B of the body 31 of the anchor 30 is illustratively configured to accommodate a coupling structure 46 configured to prevent upward movement of the anchor body 31 into the channel 25 after the anchor 30 is inserted into the channel 25 as illustrated in FIG. 5. In the embodiment illustrated in FIGS. 1-6, for example, the side wall 32 of the anchor body 31 defines an opening 40A therethrough adjacent to the bottom end 32B of the side wall 32, and the side wall 32 of the anchor body 31 likewise defines another opening 40B therethrough adjacent to the bottom end 34B of the side wall 34 of the anchor body. Illustratively, the length of the side wall 34, between bottom end 34B and the step 34E, and the length of the corresponding portion of the side wall 32, are sized such that the openings 40A, 40B clear the bottom ends 20A$_1$, 20A$_2$ of the respective side walls 20A, 20B of the upright angle rail 20 as the body 31 of the anchor 30 is fully inserted into the channel 25 with the step 34E resting on the terminal end 15B of the side wall 14B of the bottom rail 14, as illustrated by example in FIGS. 5 and 6. The coupling structure 46 in this embodiment is illustratively provided in the form of a locking pin 48, e.g., a headed locking pin 48, and a complementarily configured locking clip or bracket 49 coupled to the head end of the pin 48 and configured to releasably couple to the opposite end of the pin 48. After the body 31 of the anchor 30 is fully inserted into the channel 25, with the step 34E resting on the terminal end 15B of the side wall 14B of the bottom rail 14, the coupling structure 46 is engaged with the bottom end 30B of the anchor 30 by extending the pin 48 through both of the openings 40A, 40B, and then securing the coupling bracket 49 to the pin 48 to prevent the pin 48 from passing back through either of the openings 40A, 40B. In the illustrated embodiment, the pin 48 of the coupling structure 46 is sized to extend laterally beyond the side walls 20A, 20B of the upright angle rail 20 to prevent, or at least restrict, upward movement of the anchor 30 within the channel 25 by contact between the pin 48 and the respective bottom ends 20A$_1$, 20A$_2$ of the respective side walls 20A, 20B of the upright angle rail 20 as depicted by example in FIG. 6. In alternate embodiments, only one of the openings 40A, 40B may be provided or used, such that a pin or other coupling structure may be inserted therein and secured to as to prevent, or at least restrict, upward movement of the anchor 30 within the channel 25 by contact between such a pin or other coupling structure with only one of the bottom ends 20A$_1$, 20A$_2$ of a respective one of the side walls 20A, 20B of the upright angle rail 20.

It will be understood that the anchor head 36 of the anchor 30 illustrated and described with respect to FIGS. 1-6 represents only one non-limiting example of an anchor head configuration, and that other anchor head configurations are contemplated by this disclosure. Some non-limiting examples other anchor head embodiments are illustrated in FIGS. 7A-14B, and will be described below. In some such embodiments, the body 31 of the anchor 30 may be unchanged from that illustrated in FIGS. 1-6, and in other such embodiments one or more modifications may be made to the anchor body, as will also be described below. In all cases, however, it should be understood that in the various anchor embodiments illustrated by example in FIGS. 7A-14B, use and operation of such alternate anchor embodiments is the same as that described above with respect to FIGS. 1-6 in that the respective anchor body is configured to be slidably received within the channel 25 defined between the upright angle rail 20 and the bottom or base rail 14, to be configured to engage the terminal end 15B of the side wall 14B of the bottom rail 14 so as to maintain the anchor head in a fixed position above the terminal end 15B of the side wall 14B of the bottom rail 14, and to be configured to engage with a suitable coupling structure to prevent, or at least restrict, upward movement of the anchor received within the channel 25 by contact between such a coupling structure with one or both of the bottom ends 20A$_1$, 20A$_2$ of a respective one of the side walls 20A, 20B of the upright angle rail 20 and/or with the downwardly-facing surface 14D of the bottom rail 14.

Figure 7A:
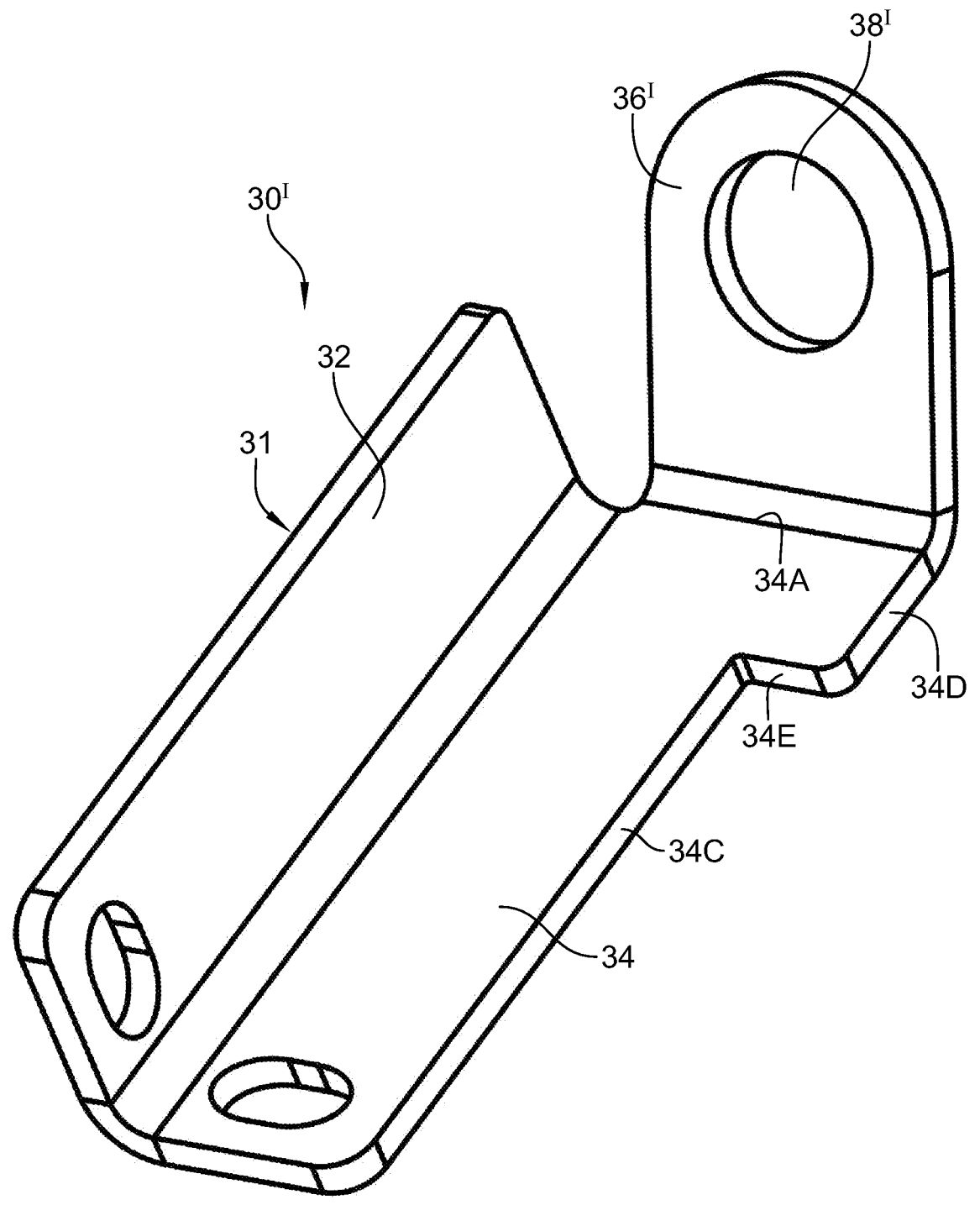
FIG. 7A is a front perspective view of another embodiment of an anchor mountable to and within a channel defined between a bottom rail and an upright angle rail of the trailer of FIG. 1.
Figure 7B:
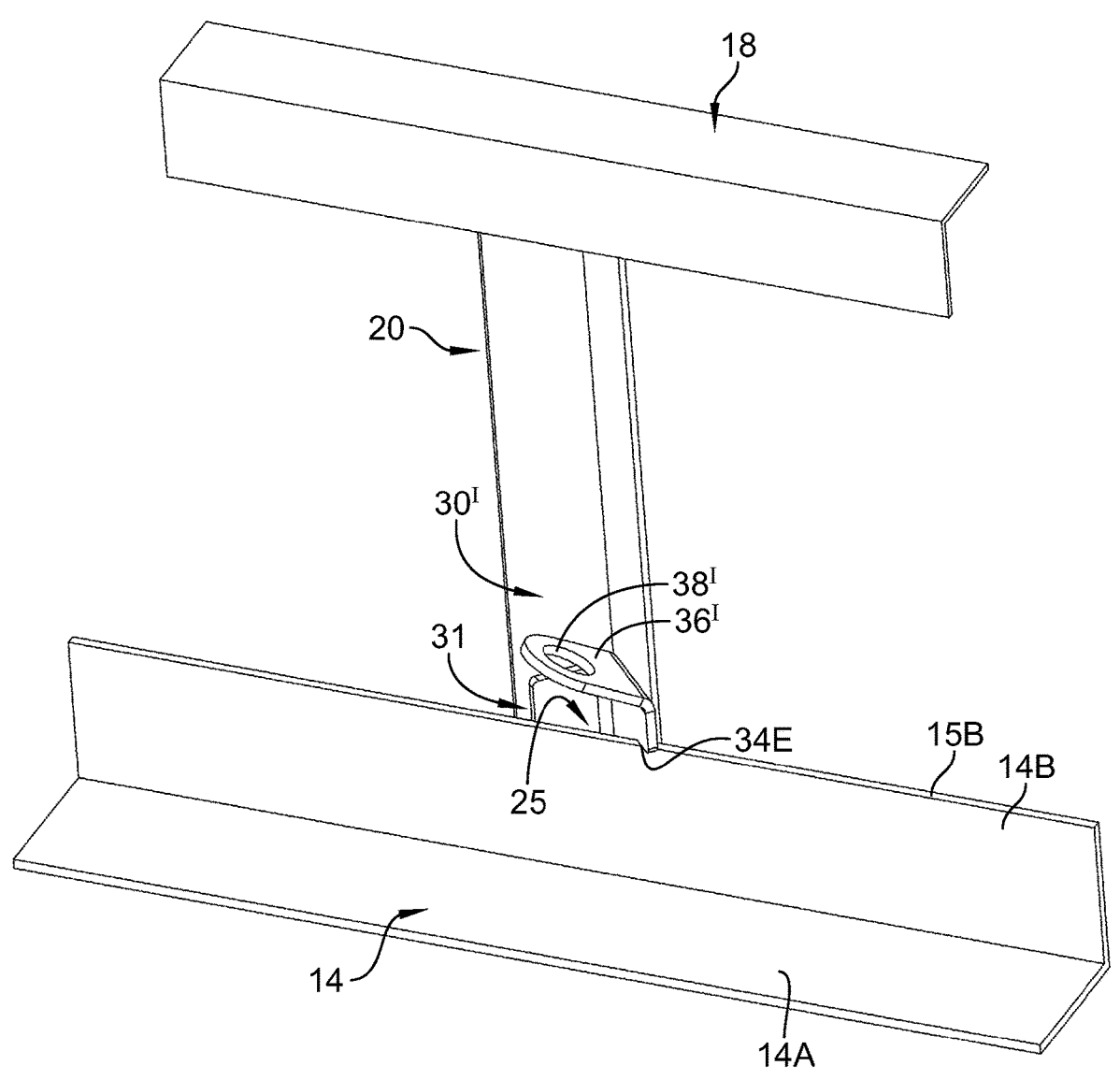
FIG. 7B is a front perspective view similar to FIG. 2B showing the anchor of FIG. 7A inserted into the channel defined between the bottom rail and an upright angle rail of the trailer of FIG. 1.

Referring now to FIGS. 7A and 7B, an alternate embodiment is shown of an anchor 30', wherein the body 31 of the anchor 30' is illustratively identical to the body 31 of the anchor 30 illustrated in FIGS. 1-6 and described above. The anchor 30' illustratively differs from the anchor 30 in the configuration of the anchor head 36'. In the embodiment illustrated in FIGS. 7A and 7B, the anchor head 36' is illustratively integral with, and extends upwardly and outwardly away from the top end 34A of the side wall 34 of the anchor body 31. Like the anchor head 36, the anchor head 36' is provided in the form of a planar, D-shaped plate, e.g., with the same or similar thickness as the side walls 32, 34 of the body 31 of the anchor 30', which illustratively has an inwardly-facing surface which extends at an obtuse angle, e.g., in a range of 60-75 degrees, away from the inwardly-facing surface of the side wall 34 of the body 31 of the anchor 30'. The anchor head 36' illustratively defines an anchor opening 38' which extends through the anchor head 36'. In some embodiments, the anchor opening 38' is sized for connection thereto of a conventional hook or other engagement structure attached to or integral with a conventional tie-down or anchoring strap, although in other embodiments the opening 38' may be sized to receive and engage an eyebolt or other securement structure configured for connection thereto of a conventional hook or other engagement structure to or integral with a conventional tie-down or anchoring strap. In any case, the anchor head 36' is positioned above the step 34E defined between the lateral terminal ends 34C and 34D of the side wall 34 of the anchor body 31, such that as the anchor 30' is prevented by the step 34E from passing further downwardly into the channel 25, the anchor head 36' is maintained by the step 34E in a fixed position above the terminal end 15B of the side wall 14B of the bottom rail 14 at all times as illustrated by example in FIG. 7B.

Figure 8A:
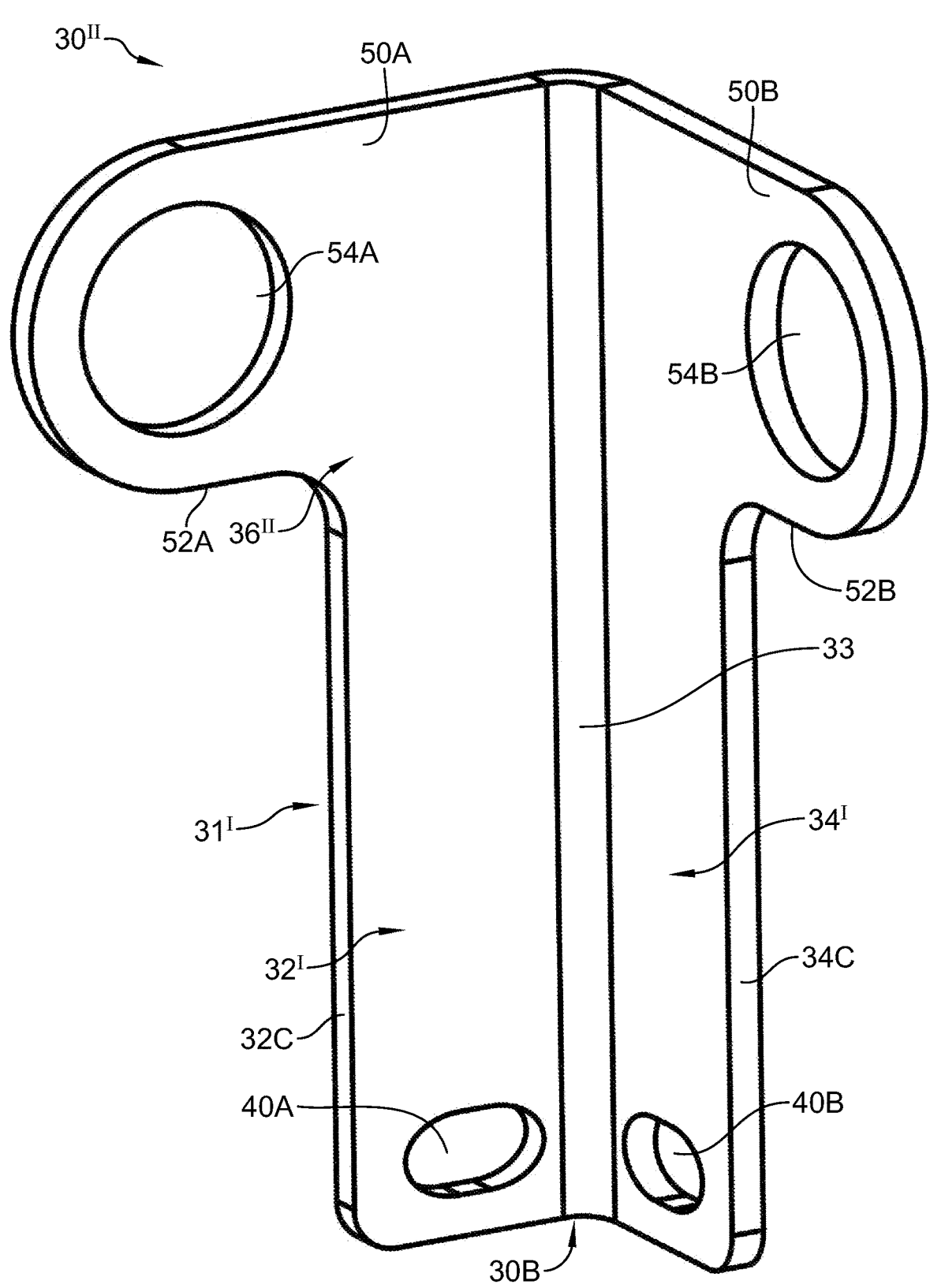
FIG. 8A is a front perspective view of yet another embodiment of an anchor mountable to and within a channel defined between a bottom rail and an upright angle rail of the trailer of FIG. 1.
Figure 8B:
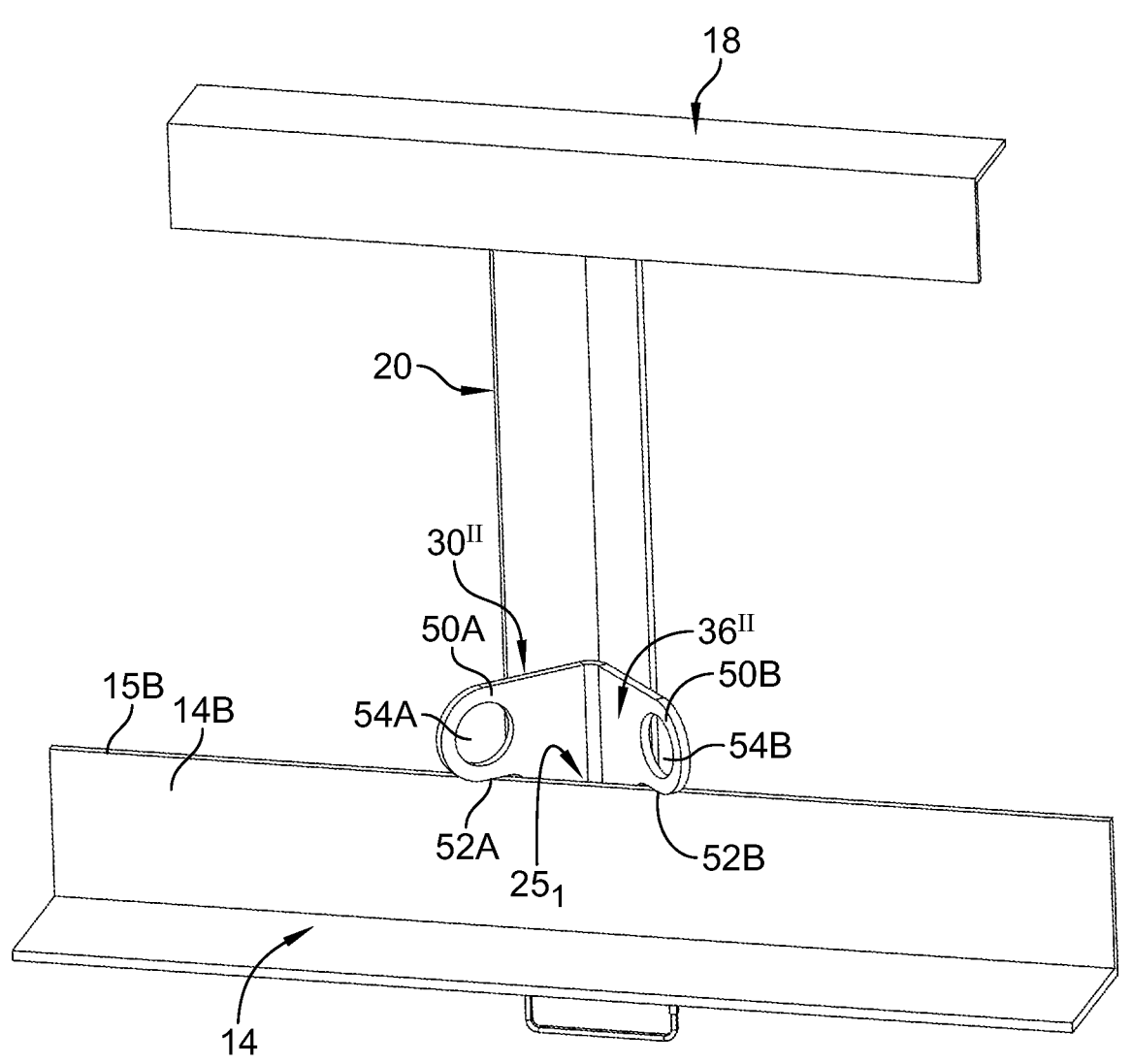
FIG. 8B is a front perspective view similar to FIG. 2B showing the anchor of FIG. 8A inserted into the channel defined between the bottom rail and an upright angle rail of the trailer of FIG. 1.

Referring now to FIGS. 8A and 8B, another alternate embodiment is shown of an anchor 30", wherein the body 31' of the anchor 30" illustratively differs from the body 31 of the anchor 30 illustrated in FIGS. 1-6 in that the side wall 34' does not include the step 34E, and in that the side walls 32', 34' of the anchor 30" extend upwardly to, and are integral with, a two-sided anchor head 36". In the embodiment illustrated in FIGS. 8A and 8B, the anchor head 36" illustratively includes a lobe 50A which extends outwardly away from the apex 33 of the anchor body 31' adjacent to the top of the side wall 32', and which extends beyond the lateral terminal end 32C of the side wall 32' so as to define a downwardly-facing anchor support surface 52A. The lobe 50A is illustratively provided in the form of a planar, D-shaped plate, e.g., with the same or similar thickness as the side walls 32', 34' of the body 31' of the anchor 30", which illustratively has an inwardly-facing surface which is co-planar with the inwardly-facing surface of the side wall 32' of the body 31' of the anchor 30". An opening 54A is defined through the lobe 50A generally above the anchor support surface 52A, and is sized for connection thereto of a conventional hook or other engagement structure to or integral with a conventional tie-down or anchoring strap. The anchor head 36" further illustratively includes another lobe 50B which extends outwardly away from the apex 33 of the anchor body 31' adjacent to the top of the side wall 34', and which extends beyond the lateral terminal end 34C of the side wall 34' so as to define a downwardly-facing anchor support surface 52B. The lobe 50B is illustratively provided in the form of a planar, D-shaped plate, e.g., with the same or similar thickness as the side walls 32', 34' of the body 31' of the anchor 30", which illustratively has an inwardly-facing surface which is co-planar with the inwardly-facing surface of the side wall 34' of the body 31' of the anchor 30". An opening 54B is defined through the lobe 50B generally above the anchor support surface 52B, and is sized for connection thereto of a conventional hook or other engagement structure to or integral with a conventional tie-down or anchoring strap. In the embodiment illustrated in FIGS. 8A and 8B, the support surfaces 52A, 52B prevent the anchor 30" from passing further downwardly into the channel 25, and the anchor head 36" is thus maintained by the support surfaces 52A, 52B in a fixed position above the terminal end 15B of the side wall 14B of the bottom rail 14 at all times as illustrated by example in FIG. 8B.

Figure 9A:
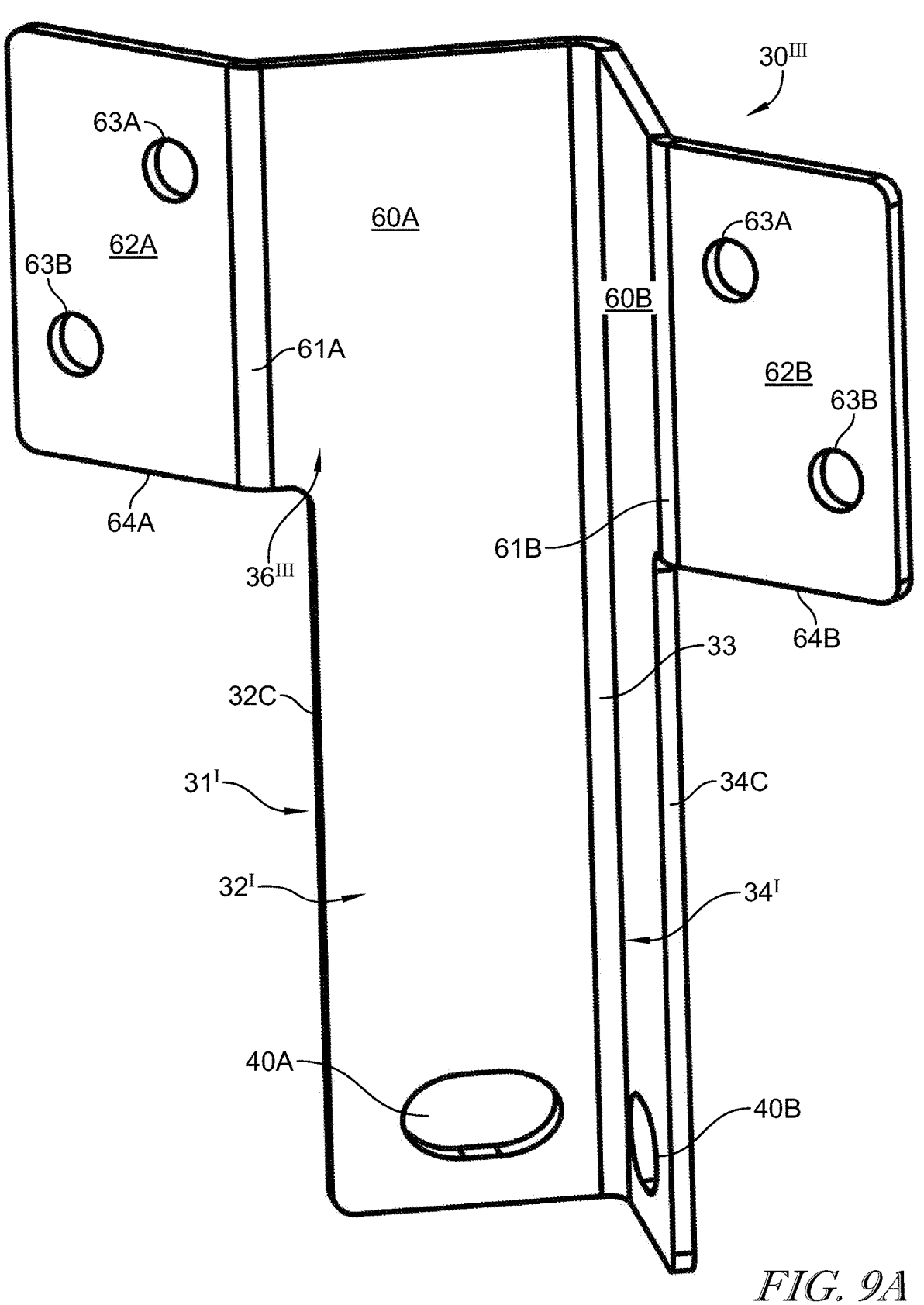
FIG. 9A is a front perspective view of still another embodiment of an anchor mountable to and within a channel defined between a bottom rail and an upright angle rail of the trailer of FIG. 1.
Figure 9B:
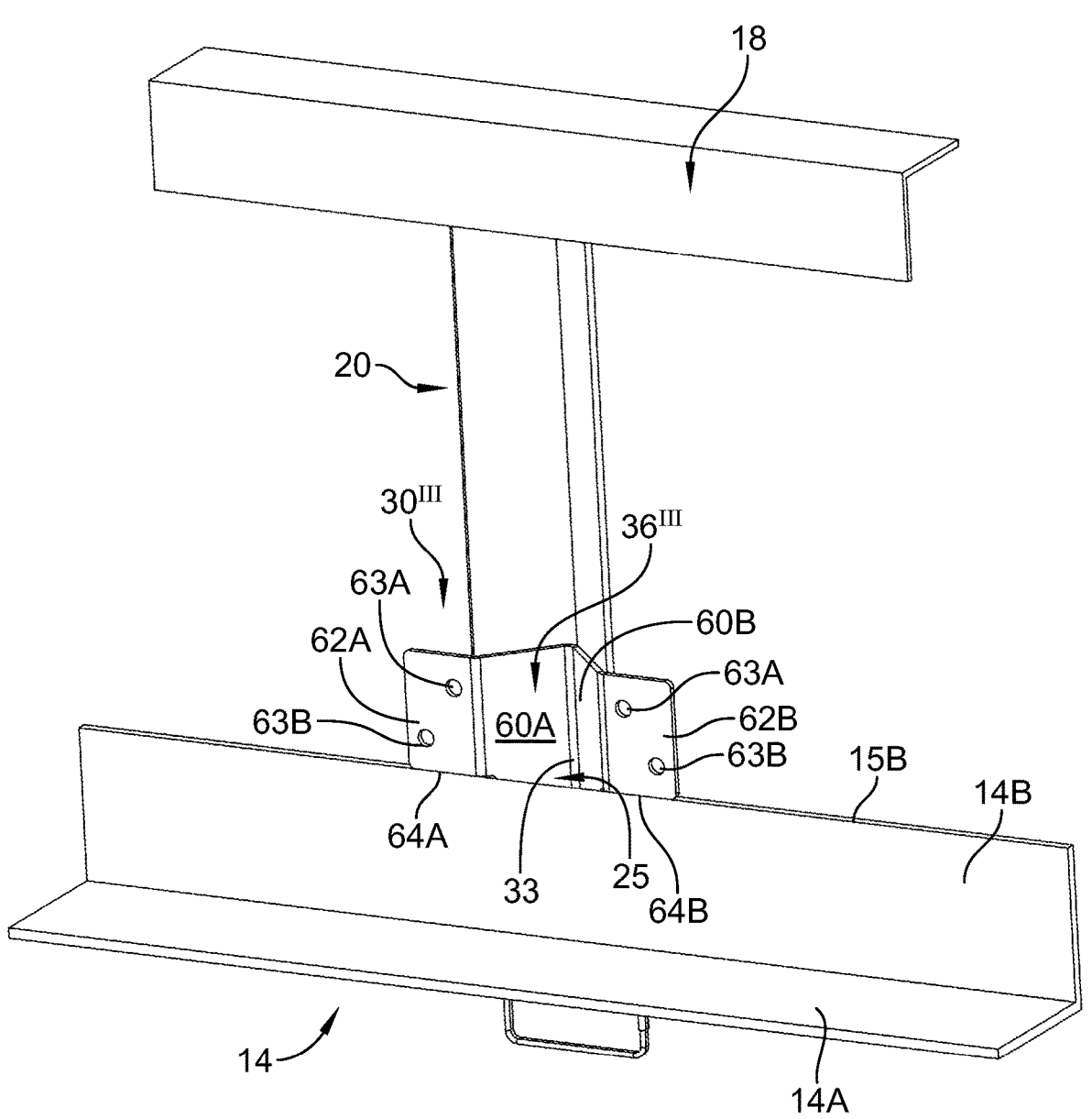
FIG. 9B is a front perspective view similar to FIG. 2B showing the anchor of FIG. 9A inserted into the channel defined between the bottom rail and an upright angle rail of the trailer of FIG. 1.

Referring now to FIGS. 9A and 9B, another alternate embodiment is shown of an anchor 30''', wherein the body 31' of the anchor 30''' is illustratively identical to the body 31' of the anchor 30" illustrated in FIGS. 8A and 8B, and wherein the anchor 30''' is further similar to the anchor 30" in that the anchor 30''' includes a two-sided anchor head 36'''. The anchor head 36''' illustratively differs from the anchor head 36" in the shape and configuration of the two opposing lobes. In the embodiment illustrated in FIGS. 9A and 9B, the anchor head 36''' illustratively includes a first region 60A which extends outwardly away from the apex 33 of the anchor body 31' adjacent to the top of the side wall 32'. The first region 60A is illustratively provided in the form of a planar, square or rectangular-shaped plate, e.g., with the same or similar thickness as the side walls 32', 34' of the body 31' of the anchor 30''', and which illustratively has an inwardly-facing surface which is co-planar with the inwardly-facing surface of the side wall 32' of the body 31' of the anchor 30'''. A first lobe 62A of the anchor head 36''' is integral with the first region 60A, and extends outwardly away from the first region 60A and beyond the lateral terminal end 32C of the side wall 32' so as to define a downwardly-facing anchor support surface 64A. The first lobe 62A is illustratively provided in the form of a planar, square or rectangular-shaped plate, e.g., with the same or similar thickness as the side walls 32', 34' of the body 31' of the anchor 30'''. A bend 61A is defined between the first region and the first lobe 60A, 62A respectively, such that the inwardly-facing surface of the first region 60A forms a reflex angle with the inwardly-facing surface of the first lobe 62A (both surfaces shown in FIG. 9A). The reflex angle is illustratively selected such that, when the anchor 30" is inserted into the channel 25 of the trailer 10, the inwardly-facing surface of the first lobe 62A is coplanar with the inwardly facing surface of the side wall 14B of the bottom rail 14, and the downwardly-facing anchor support surface 64A contacts, and is supported on, the terminal end 15B of the side wall 14B of the bottom rail 14 as illustrated by example in FIG. 9B.

The anchor head 36''' further illustratively includes a second region 60B which extends outwardly away from the apex 33 of the anchor body 31' adjacent to the top of the side wall 34'. The second region 60B is illustratively provided in the form of a planar, square or rectangular-shaped plate, e.g., with the same or similar thickness as the side walls 32', 34' of the body 31' of the anchor 30''', and which illustratively has an inwardly-facing surface which is co-planar with the inwardly-facing surface of the side wall 34' of the body 31' of the anchor 30'''. A second lobe 62B of the anchor head 36''' is integral with the second region 60B, and extends outwardly away from the second region 60B and beyond the lateral terminal end 32C of the side wall 34' so as to define a downwardly-facing anchor support surface 64B. The second lobe 62B is illustratively provided in the form of a planar, square or rectangular-shaped plate, e.g., with the same or similar thickness as the side walls 32', 34' of the body 31' of the anchor 30'''. A bend 61A is defined between the second region and the second lobe 60B, 62B respectively, such that the inwardly-facing surface of the second region 60B forms a reflex angle with the inwardly-facing surface of the second lobe 62B (both surfaces shown in FIG. 9A). The reflex angle is illustratively selected such that, when the anchor 30''' is inserted into the channel 25 of the trailer 10, the inwardly-facing surface of the second lobe 62B is coplanar with the inwardly facing surface of the side wall 14B of the bottom rail 14, and the downwardly-facing anchor support surface 64B contacts, and is supported on, the terminal end 15B of the side wall 14B of the bottom rail 14 as illustrated by example in FIG. 9B. Both of the lobes 62A, 62B illustratively define a number of openings therethrough, e.g., two such openings 63A, 63B shown, although more or fewer such openings may be defined through either or both of the lobes 62A, 62B. In any case, with the inwardly-facing surfaces of the first lobe 62A and the second lobe 62B both coplanar with one another and with the inwardly facing surface of the side wall 14B of the bottom rail 14 on either side of the upright angle rail 20, as shown in FIG. 9B, the anchor 30" provides a suitable attachment structure for securing installable trailer side walls, e.g., plywood side walls or side walls of one or more other suitable material, thereto, e.g., at least partially along and about the inner periphery of the utility trailer 10.

Figure 10A:
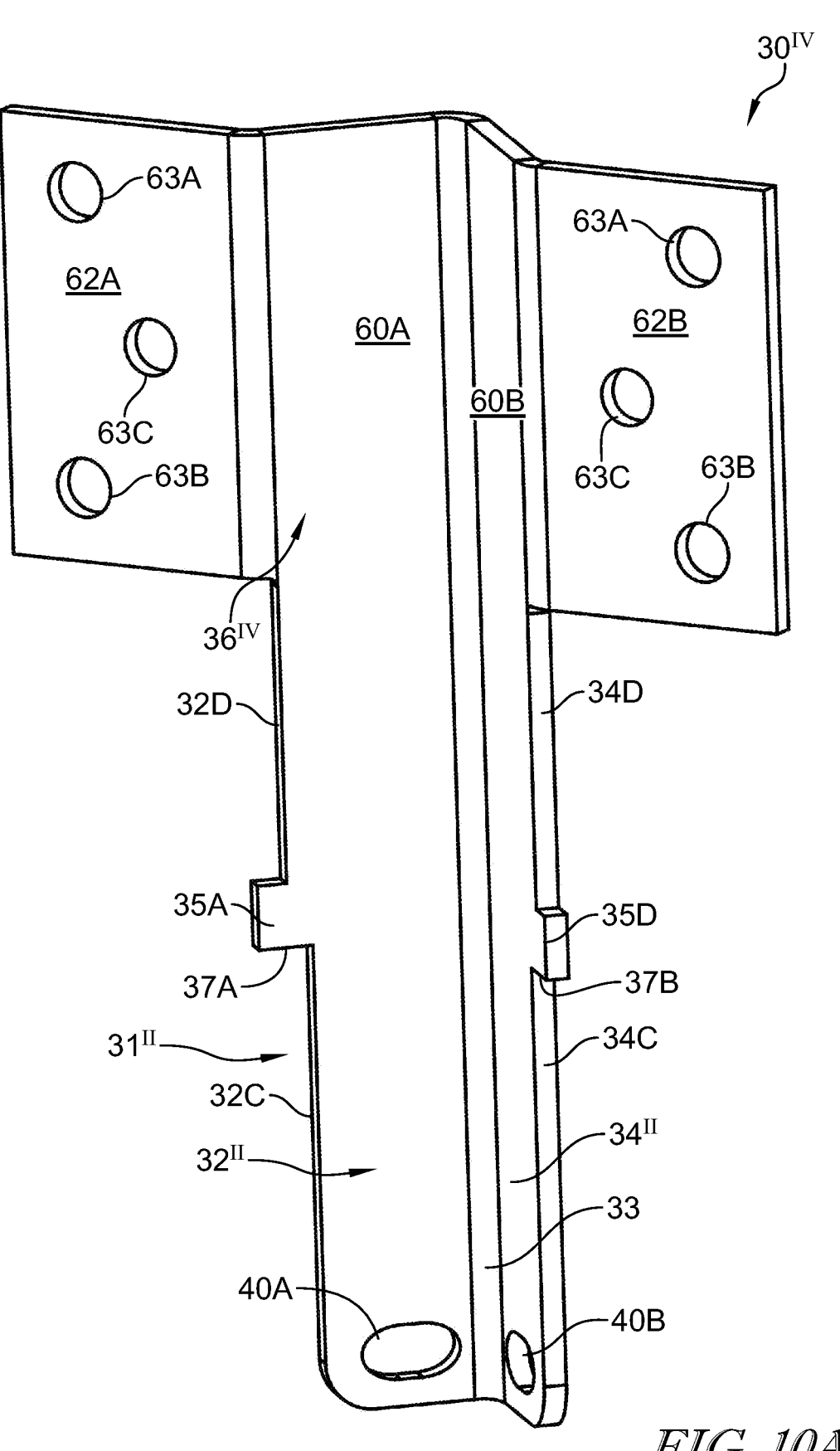
FIG. 10A is a front perspective view of a further embodiment of an anchor mountable to and within a channel defined between a bottom rail and an upright angle rail of the trailer of FIG. 1.
Figure 10B:
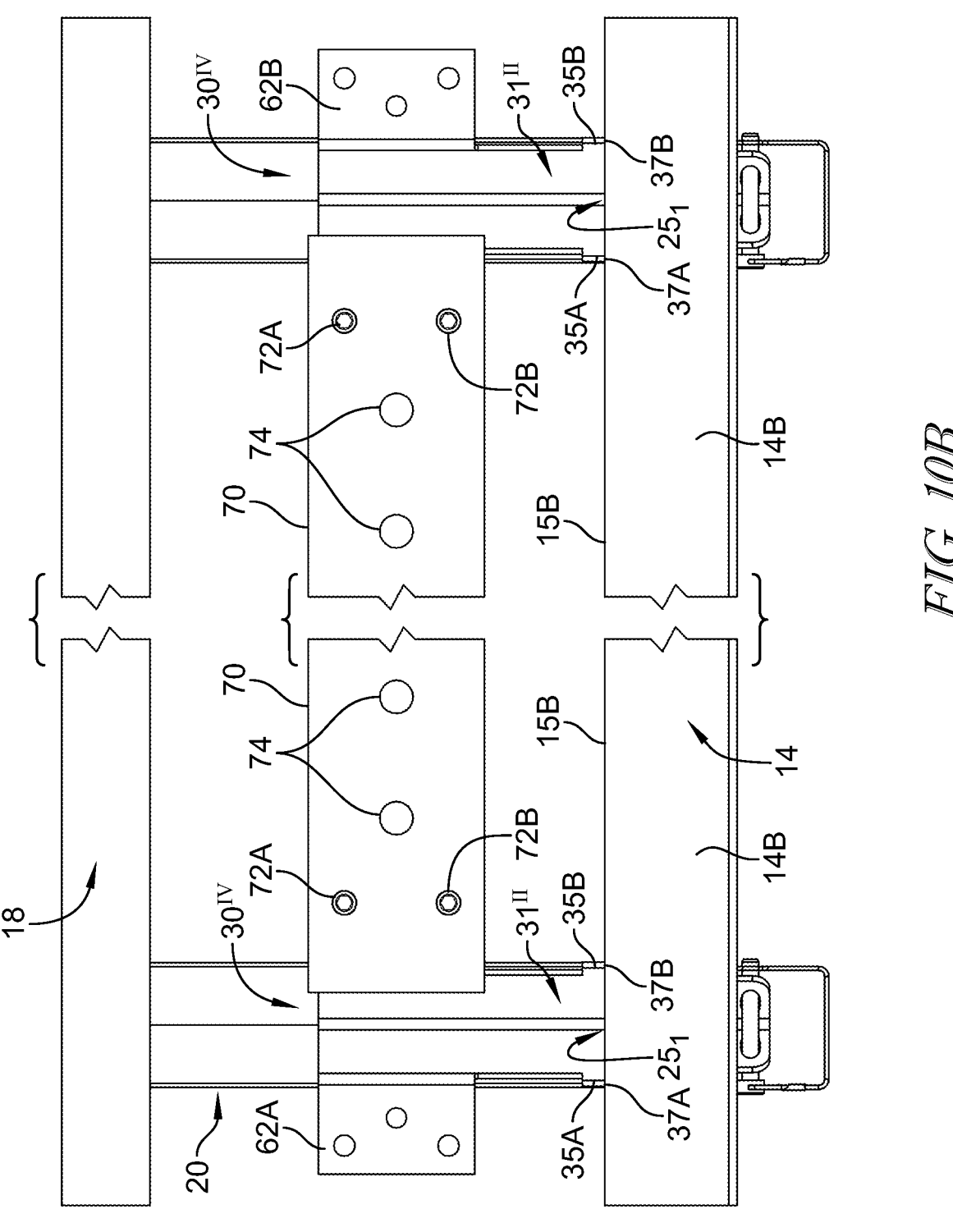
FIG. 10B is a front elevational view of an inwardly-facing portion of the trailer of FIG. 1 showing an embodiment of an anchor system including two of the anchors of FIG. 10A each inserted into adjacent channels defined between the bottom rail and respective adjacent upright angle rails of the trailer of FIG. 1.

Referring now to FIGS. 10A and 10B, yet another alternate embodiment is shown of an anchor 30$^{IV}$, wherein the body 31" of the anchor 30$^{IV}$ is illustratively similar to the body 31' of the anchors 30' and anchor 30''' illustrated in FIGS. 8A-9B, and wherein the anchor head 361\ differs from the anchor head 36''' only in the number of openings defined through the first and second lobes 62A, 62B, e.g., each of the lobes 62A, 62B illustratively define three openings 63A-63C therethrough, although in alternate embodiments more or fewer openings may be defined through the first lobe 62A and/or the second lobe 62B. In any case, the anchor body 31" illustratively differs from the anchor body 30' in the support structures for supporting the anchor 30$^{IV}$ on the terminal end 15B of the side wall 14B of the bottom rail 14 when the anchor 30$^{IV}$ is received within the pocket 25 of the utility trailer 10, and in the position of anchor head 36$^{IV}$ above such supports. As depicted by example in FIG. 10A, the side wall 32" extends outwardly from the apex 33 to a lateral terminal end 32C which extends upwardly from the bottom end of the side wall 32" as described previously. Above the portion of the side wall 32" having the lateral terminal end 32C is a projection 35A which defines a step 37A between the projection 35A and the lateral terminal end 32C of the side wall 32". Above the projection 35A, the side wall 32" extends outwardly from the apex 33 to another lateral terminal end 32D, which illustratively extends beyond the terminal end 32C, and which extends upwardly to an intersection with the anchor head 36$^{IV}$. The side wall 34" likewise extends outwardly from the apex 33 to a lateral terminal end 34C which extends upwardly from the bottom end of the side wall 34" as described previously. Above the portion of the side wall 34" having the lateral terminal end 34C is another projection 35B which defines a step 37B between the projection 35B and the lateral terminal end 34C of the side wall 34". Above the projection 35B, the side wall 34" extends outwardly from the apex 33 to another lateral terminal end 34D, which illustratively extends beyond the lateral terminal end 34C, and which extends upwardly to an intersection with the anchor head 36$^{IV}$. Upon insertion of the anchor 30$^{IV}$ into the channel 25 defined between the upright angle rail 20 and the bottom rail 14 as described above, the downwardly-facing surfaces of the steps 37A, 37B contact, and are supported on, the terminal end 15B of the side wall 14B of the bottom rail 14 as illustrated by example in FIG. 10B. This spaces the anchor head 36$^{IV}$ upwardly above the bottom rail 14, and thus upwardly above the floor or bed 12 of the utility trailer 10, as also depicted by example in FIG. 10B.

As further depicted by example in FIG. 10B, two or more of the anchors 30$^{IV}$ may form part of an anchor system 75 in which an accessory support panel 70 is secured to and between the anchor heads 36$^{IV}$, e.g., via conventional fixation members 72A, 72B, of two or more anchors 30$^{IV}$ each inserted into a different channel 25 defined by and between different respective upright angle rails 20 and the bottom rail 14. The accessory support panel 70 may illustratively define any number of openings or slots 74 therethrough along the length of the panel 70, and one or more of the openings may be configured to mount a peg, hook, shelf or other such structure to the panel 70. In any case, the anchor body 31" may be sized to suspend the panel 70 at any desired distance above the floor or bed 12 of the utility trailer 10, and the anchor head 36$^{IV}$ may be configured to accommodate mounting thereto of any number of vertically spaced apart panels 70 (only one such panel 70 illustrated by example in FIG. 10B). The number and configuration of such panels 70 and the number and configuration of openings 74 in any such panel(s) may be chosen to support any number and/or types of accessories on the panel(s) 70. Examples of some such accessories may include, but are not limited to, any lawn care or landscaping tools and/or equipment and/or supplies, construction tools and/or construction equipment, camping gear, sports equipment, cycling equipment, one or more barbeque grills, one or more food and/or beverage coolers, and the like. In any case, it will be understood that whereas the anchor system illustrated by example in FIG. 10B includes a single accessory support panel 70 mounted to and between two anchors 30$^{IV}$, more or fewer panels 70 may alternatively be mounted to and between the two anchors 30$^{IV}$, and/or any number of accessory support panels 70 may be mounted to more or fewer of the anchors 30$^{IV}$, i.e., to as few as one anchor 30$^{IV}$ or to three or more anchors 30$^{IV}$. It will be further understood that in implementations in which at least one accessory support panel 70 is mounted to and between two or more anchors 30$^{IV}$, the two or more anchors may, but need not, be inserted into channels 25 of adjacent or contiguous, i.e., sequential, upright angle rails 20, but may rather skip one or more adjacent or contiguous upright angle rails 20.

Figure 11A:
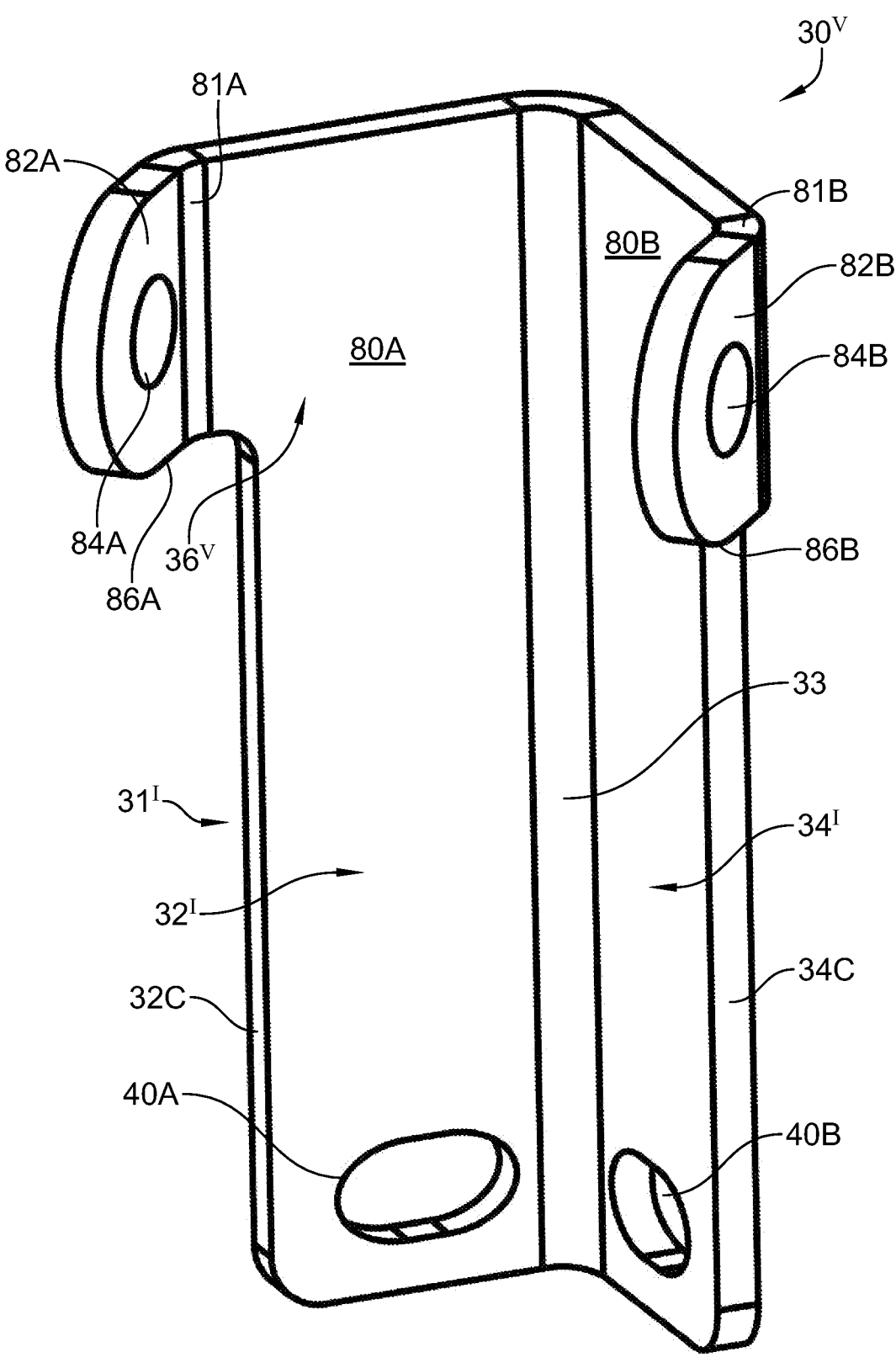
FIG. 11A a front perspective view of yet a further embodiment of an anchor mountable to and within a channel defined between a bottom rail and an upright angle rail of the trailer of FIG. 1.
Figure 11B:
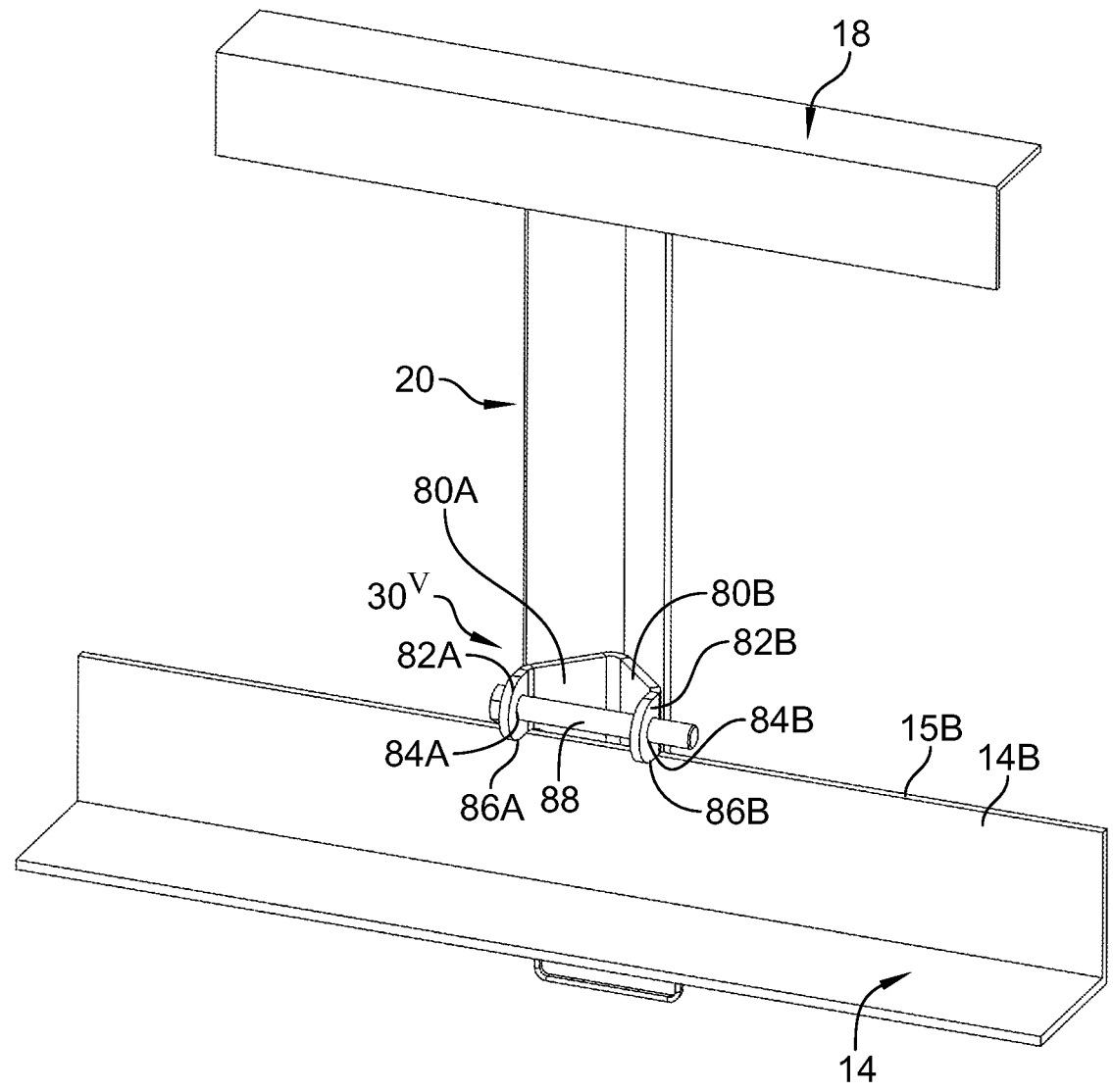
FIG. 11B is a front perspective view similar to FIG. 2B showing the anchor of FIG. 11A inserted into the channel defined between the bottom rail and an upright angle rail of the trailer of FIG. 1.

Referring now to FIGS. 11A and 11B, yet a further alternate embodiment is shown of an anchor 30$^V$, wherein the body 31' of the anchor 30''' is illustratively identical to the body 31' of the anchors 30'' and 30''' illustrated in FIGS. 8A-8B and 9A-9B respectively, and wherein the anchor 30$^V$ is further similar to the anchor 30'' of FIGS. 8A and 8B in that the anchor 30$^V$ includes a two-sided anchor head 36$^V$. The anchor head 36$^V$ illustratively differs from the anchor head 36'' of FIGS. 8A and 8B in the shape and configuration of the two opposing lobes. In the embodiment illustrated in FIGS. 11A and 11B, the anchor head 36$^V$ illustratively includes a first region 80A which extends outwardly away from the apex 33 of the anchor body 31' adjacent to the top of the side wall 32', and which is integral with the side wall 32' of the body 31' of the anchor 30$^V$. The first region 80A is illustratively provided in the form of a planar, square or rectangular-shaped plate, e.g., with the same or similar thickness as the side walls 32', 34' of the body 31' of the anchor 30$^V$, and which illustratively has an inwardly-facing surface which is co-planar with the inwardly-facing surface of the side wall 32' of the body 31' of the anchor 30$^V$. A first lobe 82A of the anchor head 36$^V$ is integral with the first region 80A, and extends outwardly away from the first region and beyond the lateral terminal end 32C of the side wall 32' so as to define a downwardly-facing anchor support surface 86A. The first lobe 82A is illustratively provided in the form of a planar, D-shaped plate, e.g., with the same or similar thickness as the side walls 32', 34' of the body 31' of the anchor 30$^V$, and in any case the first lobe 82A defines an opening 84A therethrough. A bend 81A is defined between the first region and the first lobe 80A, 82A respectively, such that the inwardly-facing surface of the first region 80A forms an obtuse angle with the inwardly-facing surface of the first lobe 82A. In the illustrated embodiment, the obtuse angle is illustratively selected such that, when the anchor 30$^V$ is inserted into the channel 25 of the trailer 10, the inwardly-facing planar surface of the first lobe 82A is approximately perpendicular to the inwardly-facing planar surface of the side wall 14B of the bottom rail 14, as illustrated by example in FIG. 11B, although in alternate embodiments the obtuse angle formed between the inwardly-facing surface of the first region 80A and the inwardly-facing surface of the first lobe 82A may be greater or lesser than the angle illustrated in FIGS. 11A and 11B. In any case, with the anchor 30$^V$ inserted in to the channel 25 defined between the upright angle rail 20 and the bottom rail 14, as illustrated by example in FIG. 11B, the downwardly-facing anchor support surface 86A of the first lobe 82A contacts, and is supported on, the terminal end 15B of the side wall 14B of the bottom rail 14.

The anchor head 36'' further illustratively includes a second region 80B which extends outwardly away from the apex 33 of the anchor body 31' adjacent to the top of the side wall 34', and which is integral with the side wall 34' of the body 31' of the anchor 30$^V$. The second region 80B is illustratively provided in the form of a planar, square or rectangular-shaped plate, e.g., with the same or similar thickness as the side walls 32', 34' of the body 31' of the anchor 30$^V$, and which illustratively has an inwardly-facing surface which is co-planar with the inwardly-facing surface of the side wall 34' of the body 31' of the anchor 30$^V$. A second lobe 82B of the anchor head 36$^V$ is integral with the second region 80B, and extends outwardly away from the second region 80B and beyond the lateral terminal end 34C of the side wall 34' so as to define a downwardly-facing anchor support surface 64B. The second lobe 82B is illustratively provided in the form of a planar, D-shaped plate, e.g., with the same or similar thickness as the side walls 32', 34' of the body 31' of the anchor 30$^V$, and in any case the second lobe 82B defines an opening 84B therethrough. A bend 81B is defined between the second region and the second lobe 80B, 82B respectively, such that the inwardly-facing surface of the second region 80B forms an obtuse angle with the inwardly-facing surface of the second lobe 82B. In the illustrated embodiment, the obtuse angle is illustratively selected such that, when the anchor 30$^V$ is inserted into the channel 25 of the trailer 10, the inwardly-facing planar surface of the second lobe 82B is approximately perpendicular to the inwardly-facing planar surface of the side wall 14B of the bottom rail 14, and such that the inwardly-facing planar surfaces of the first and second lobes 82A, 82B face one another and are approximately parallel with one another as illustrated by example in FIG. 11B such that the openings 84A, 84B defined through the lobes 82A, 82B are axially aligned, although in alternate embodiments the obtuse angle formed between the inwardly-facing surface of the second region 80B and the inwardly-facing surface of the second lobe 82B may be greater or lesser than the angle illustrated in FIGS. 11A and 11B and/or the openings 84A, 84B may not be axially aligned. In any case, with the anchor 30$^V$ inserted in to the channel 25 defined between the upright angle rail 20 and the bottom rail 14, as illustrated by example in FIG. 11B, the downwardly-facing anchor support surface 86B of the first lobe 82B contacts, and is supported on, the terminal end 15B of the side wall 14B of the bottom rail 14.

In embodiments of the anchor 30$^V$ in which the openings 84A, 84B defined through the first and second lobes 82A, 82B of the anchor head 36" are axially aligned, the openings 84A, 84B may illustratively be sized to receive a rod, pin, or bolt 88 therein such that the rod, pin or bolt 88 is mounted to each lobe 82A, 82B and extends across the space defined between the lobes 82A, 82B, i.e., such that a gap or space is defined between the rod, pin, or bolt 88 and the inwardly-facing surfaces of the upper portions of the side walls 32', 34' of the body 31' of the anchor 30$^V$. Illustratively, the lateral distance between the inwardly-facing surfaces of the lobes 82A, 82B is sized to accommodate the width of a conventional tie-down web or strap, such that the conventional tie-down web or strap may be passed downwardly or upwardly into and through the gap or space defined between the lobes 82A, 82B, around the rod, pin, or bolt 88, and then outwardly away from the gap or space, such that the rod, pin, or bolt 88 acts as an anchor point for the tie-down web or strap. In alternate embodiments, the vertical distance between the rod, pin, or bolt 88 and the terminal end 15B of the side wall 14B of the bottom rail 14 (or from the floor or bed 12 supported on the side wall 14A of the bottom rail 14 as shown by example in FIG. 1), may be greater than that shown in FIG. 11B via suitable modification of the lobes 82A, 82B and/or by increasing the distance between the lobes 82A, 82B and the terminal end 15B of the side wall 14B of the bottom rail 14 by suitably modifying the body 31' of the anchor 30\ such as illustrated with the anchor body 31" illustrated by example in FIGS. 10A and 10B and described above. In alternate embodiments, and/or in embodiments in which the openings 84A, 84B defined through the first and second lobes 82A, 82B of the anchor head 36$^V$ are not axially aligned, the openings 84A, 84B may be sized and configured for connection thereto of a conventional hook or other engagement structure to or integral with a conventional tie-down or anchoring strap.

Figure 12A:
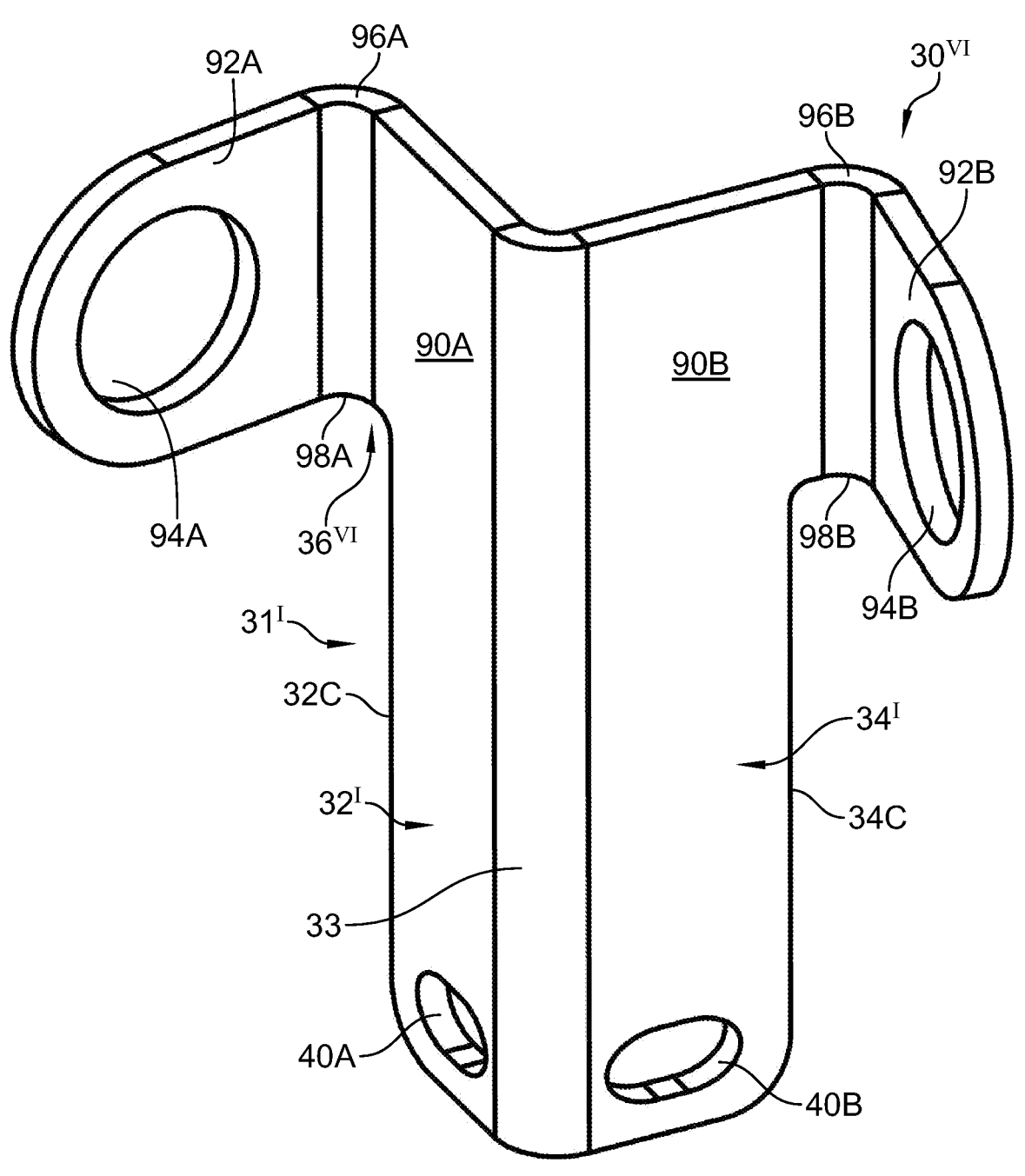
FIG. 12A a rear perspective view of still a further embodiment of an anchor mountable to and within a channel defined between a bottom rail and an upright angle rail of the trailer of FIG. 1.
Figure 12B:
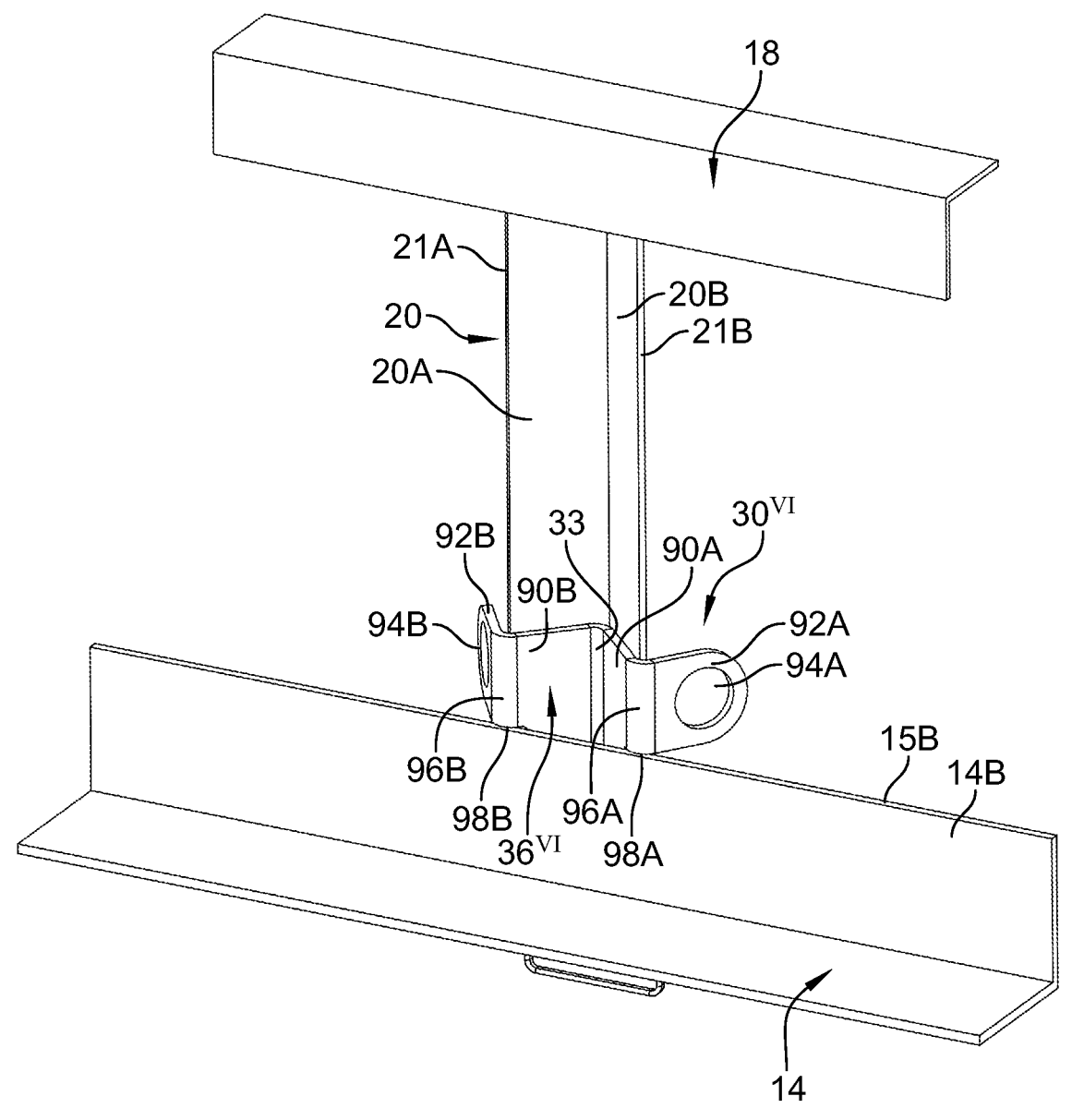
FIG. 12B is a front perspective view similar to FIG. 2B showing the anchor of FIG. 12A inserted into the channel defined between the bottom rail and an upright angle rail of the trailer of FIG. 1.
Figure 12C:
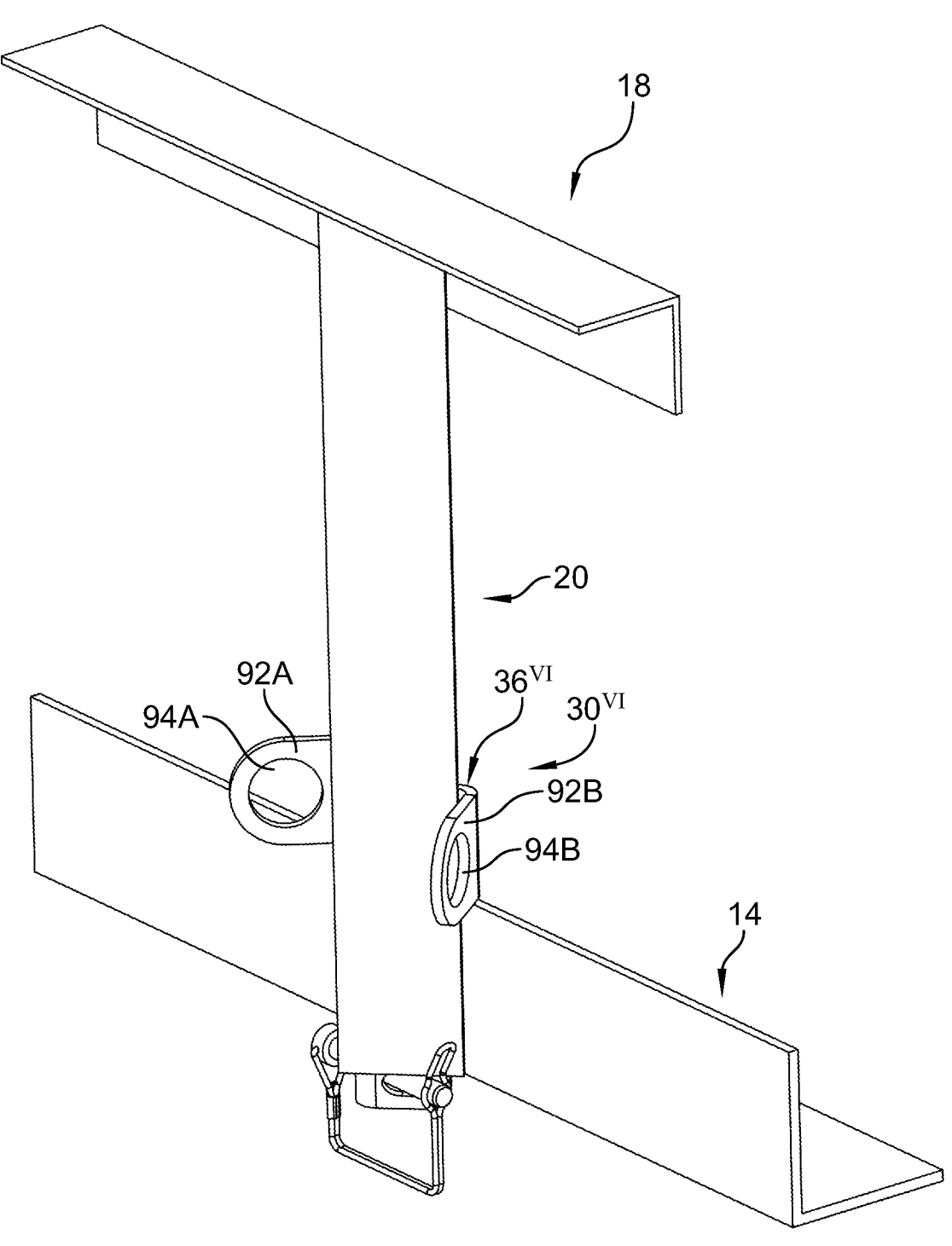
FIG. 12C is a rear perspective view similar to FIG. 2A showing the anchor of FIG. 12A inserted into the channel defined between the bottom rail and an upright angle rail of the trailer of FIG. 1.

Referring now to FIGS. 12A-12C, yet a further alternate embodiment is shown of an anchor 30$^{VI}$, wherein the body 31' of the anchor 30"" is illustratively identical to the body 31' of the anchors 30", 30"", and 30$^V$ illustrated in FIGS. 8A-8B, 9A-9B, and 11A-11B respectively, and wherein the anchor 30$^{VI}$ is further similar to the anchor 30$^V$ of FIGS. 11A and 11B in that the anchor 30$^{VI}$ includes a similar, two-sided anchor head 36$^{VI}$. The anchor head 36$^{VI}$ illustratively differs from the anchor head 36" of FIGS. 8A and 8B in the positioning of the two lobes. In the embodiment illustrated in FIGS. 12A-12C, the anchor head 36$^{VI}$ illustratively includes a first region 90A which extends outwardly away from the apex 33 of the anchor body 31' adjacent to the top of the side wall 32', and which is integral with the side wall 32' of the body 31' of the anchor 30$^{VI}$. The first region 90A is illustratively provided in the form of a planar, square or rectangular-shaped plate, e.g., with the same or similar thickness as the side walls 32', 34' of the body 31' of the anchor 30$^{VI}$, and which illustratively has an inwardly-facing surface which is co-planar with the inwardly-facing surface of the side wall 32' of the body 31' of the anchor 30$^{VI}$. A first lobe 92A of the anchor head 36$^{VI}$ is integral with the first region 90A, and extends outwardly away from the first region 90A and beyond the lateral terminal end 32C of the side wall 32'. The first lobe 92A is illustratively provided in the form of a planar, D-shaped plate, e.g., with the same or similar thickness as the side walls 32', 34' of the body 31' of the anchor 30$^{VI}$, and in any case the first lobe 92A defines an opening 94A therethrough. A bend 96A is defined between the first region and the first lobe 90A, 92A respectively, such that the inwardly-facing surface of the first region 90A forms a reflex angle with the inwardly-facing surface of the first lobe 92A, and such that the bend 96A defines a downwardly-facing anchor support surface 98A. In the illustrated embodiment, the reflex angle is illustratively selected such that, with the anchor 30$^{VI}$ inserted into the channel 25 of the trailer 10, the first lobe 92A extends rearwardly of the terminal end 15B of the side wall 14B of the bottom rail 14 and rearwardly of the terminal end 21B of the side wall 20B of the upright angle rail 20, i.e., such that the first lobe 92A faces generally away from the exterior of the utility trailer 10, as illustrated by example in FIGS. 12B and 12C, although in alternate embodiments the obtuse angle formed between the inwardly-facing surface of the first region 90A and the inwardly-facing surface of the first lobe 92A may be greater or lesser than the angle illustrated in FIGS. 12A-12C. In any case, with the anchor 30$^{VI}$ inserted in to the channel 25 defined between the upright angle rail 20 and the bottom rail 14, as illustrated by example in FIG. 12B, the downwardly-facing anchor support surface 98A of the bend 96A defined between the first region 90A and the first lobe 92A contacts, and is supported on, the terminal end 15B of the side wall 14B of the bottom rail 14.

The anchor head 36$^{VI}$ further illustratively includes a second region 90B which extends outwardly away from the apex 33 of the anchor body 31' adjacent to the top of the side wall 34', and which is integral with the side wall 34' of the body 31' of the anchor 30$^{VI}$. The second region 90B is illustratively provided in the form of a planar, square or rectangular-shaped plate, e.g., with the same or similar thickness as the side walls 32', 34' of the body 31' of the anchor $30^{VI}$, and which illustratively has an inwardly-facing surface which is co-planar with the inwardly-facing surface of the side wall 34' of the body 31' of the anchor $30^{VI}$. A second lobe 92B of the anchor head $36^{VI}$ is integral with the second region 90B, and extends outwardly away from the second region 90B and beyond the lateral terminal end 34C of the side wall 34'. The second lobe 92B is illustratively provided in the form of a planar, D-shaped plate, e.g., with the same or similar thickness as the side walls 32', 34' of the body 31' of the anchor $30^{VI}$, and in any case the second lobe 92B defines an opening 94B therethrough. A bend 96B is defined between the second region and the second lobe 90B, 92B respectively, such that the inwardly-facing surface of the second region 90B forms a reflex angle with the inwardly-facing surface of the second lobe 92B, and such that the bend 96B defines a downwardly-facing anchor support surface 98B. In the illustrated embodiment, the reflex angle is illustratively selected such that, with the anchor $30^{VI}$ inserted into the channel 25 of the trailer 10, the second lobe 92B extends rearwardly of the terminal end 15B of the side wall 14B of the bottom rail 14 and rearwardly of the terminal end 21A of the side wall 20A of the upright angle rail 20, i.e., such that the second lobe 92B faces generally away from the exterior of the utility trailer 10, as illustrated by example in FIGS. 12B and 12C, although in alternate embodiments the obtuse angle formed between the inwardly-facing surface of the second region 90B and the inwardly-facing surface of the second lobe 92B may be greater or lesser than the angle illustrated in FIGS. 12A-12C. In any case, with the anchor $30^{VI}$ inserted in to the channel 25 defined between the upright angle rail 20 and the bottom rail 14, as illustrated by example in FIG. 12B, the downwardly-facing anchor support surface 98B of the bend 96B defined between the second region 90B and the second lobe 92B contacts, and is supported on, the terminal end 15B of the side wall 14B of the bottom rail 14. As depicted by example in FIGS. 12B and 12C, e.g., in cases or situations in which not side wall is mounted to the utility trailer 10, the openings 94A, 94B of the lobes 90A, 90B are generally accessible from the interior side of the utility trailer 10 (FIG. 12B) as well as from the exterior side of the utility trailer 10 (FIG. 12C). However, in cases or situations in which a side wall is mounted to the utility trailer 10, e.g., as described above with respect to FIGS. 10A and 10B, the openings 94A, 94B of the lobes 90A, 90B will be accessible only from the exterior side of the utility trailer 10 (FIG. 12C).

Figure 13:
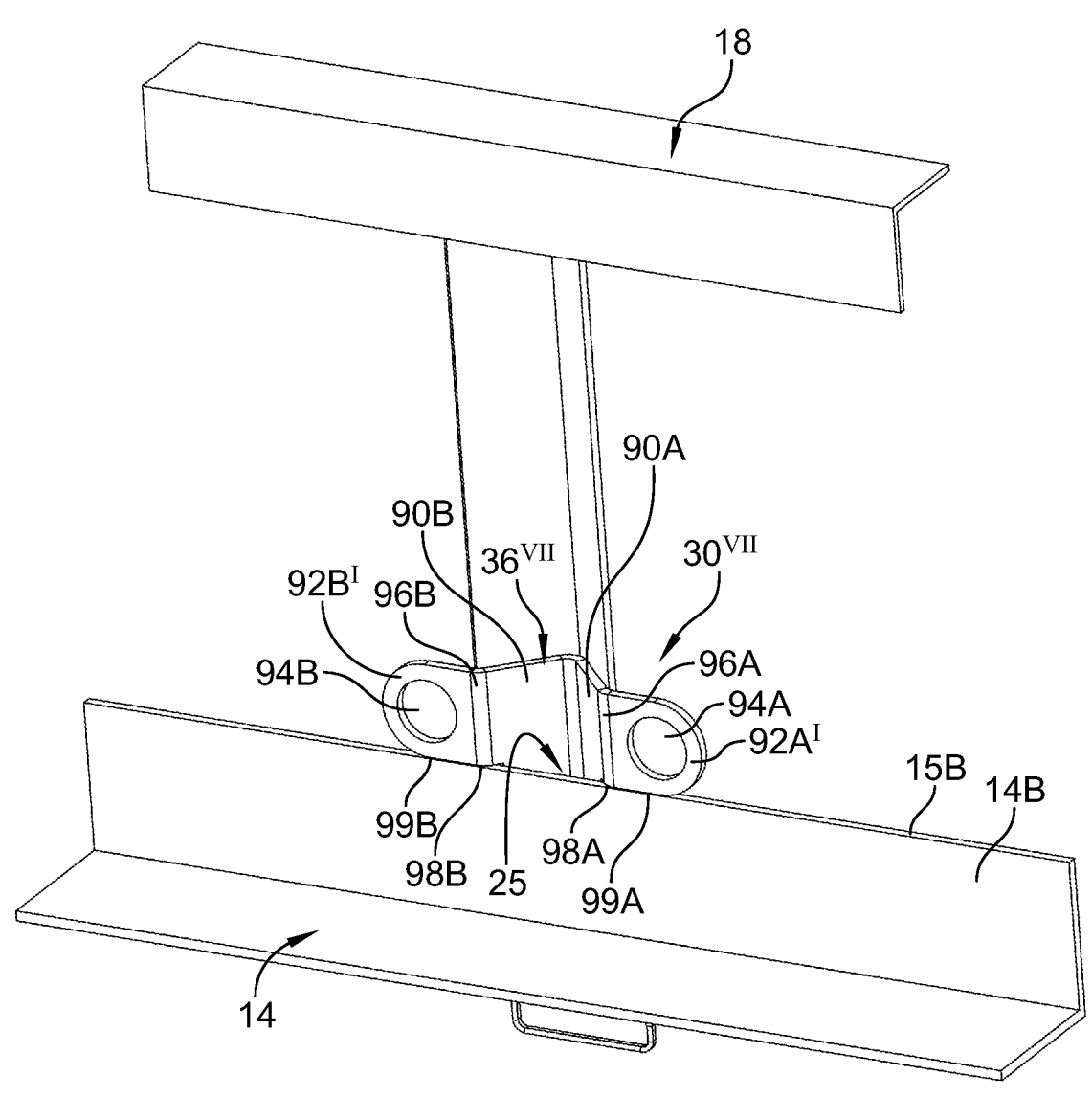
FIG. 13 is a front perspective view similar to FIG. 2B showing another embodiment of an anchor inserted into the channel defined between the bottom rail and an upright angle rail of the trailer of FIG. 1.

Referring now to FIG. 13, still a further alternate embodiment is shown of an anchor $30^{VII}$, which is illustratively identical to the anchor $30^{VI}$ illustrated in FIGS. 12A-12C except that the anchor head $36^{VII}$ differs from the anchor head $36^{VI}$ illustrated in FIGS. 12A-12C in that the first and second lobes 92A', 92B' of the anchor head $36^{VII}$ each form an obtuse angle relative to the first and second regions 90A, 90B respectively of the anchor head $36^{VII}$ so that the downwardly-facing surfaces 99A, 99B of the lobes 92A', 92B' respectively, together with the downwardly-facing surfaces 98A, 98B of the bend portions 96A, 96B, form anchor support surfaces which, with the anchor $30^{VII}$ inserted into the channel 25 as shown, support the anchor $30^{VII}$ on the terminal end 15B of the side wall 14B of the bottom rail 14.

It should be pointed out that whereas some of the embodiments of the anchors illustrated in FIGS. 1-13 are depicted as having various anchor heads with an associated anchor body 31 or an anchor body 31', any of the anchors illustrated in FIGS. 1-13 may alternatively have as an anchor body the anchor body 31" illustrated by example in FIGS. 10A-10B so as to space the respective anchor head a desired distance or length upwardly away from the bottom rail 14 or from the floor or bed 12 of the utility trailer 10.

The configuration of the bottom end 30B of the body 31 of the anchor 30 and of the coupling structure 46 illustrated and described above with respect to FIGS. 1-6 represents only one non-limiting example of a bottom end of an anchor body and of a corresponding anchor coupling structure, i.e., for coupling the anchor to one or both of the bottom ends 20A1, 20A2 of a respective one of the side walls 20A, 20B of the upright angle rail 20 and/or to the downwardly-facing surface 14D of the bottom rail 14, and it will be understood that other configurations of the bottom end of the body of an anchor and/or other anchor coupling configurations are contemplated by this disclosure. Some non-limiting examples of other configurations of the bottom end of the body of an anchor and/or of other anchor coupling embodiments are illustrated in FIGS. 14-19B, and will be described below. In some such embodiments, the bottom end of the body of the anchor may be unchanged from that illustrated by example in FIGS. 1-13 and only the anchor coupling structure may change, and in other embodiments one or more modifications may be made to the anchor body and to the anchor coupling structure, as will also be described below. In all cases, however, it should be understood that in the various embodiments illustrated by example in FIGS. 14-19B, use and operation of the anchor itself is the same as that described above with respect to FIGS. 1-13 in that the respective anchor body is configured to be slidably received within the channel 25 defined between the upright angle rail 20 and the bottom or base rail 14, and is configured to engage the terminal end 15B of the side wall 14B of the bottom rail 14 so as to maintain the anchor head in a fixed position above the terminal end 15B of the side wall 14B of the bottom rail 14, and may have any of the anchor head configurations illustrated and described above with respect to FIGS. 1-13.

Figure 14:
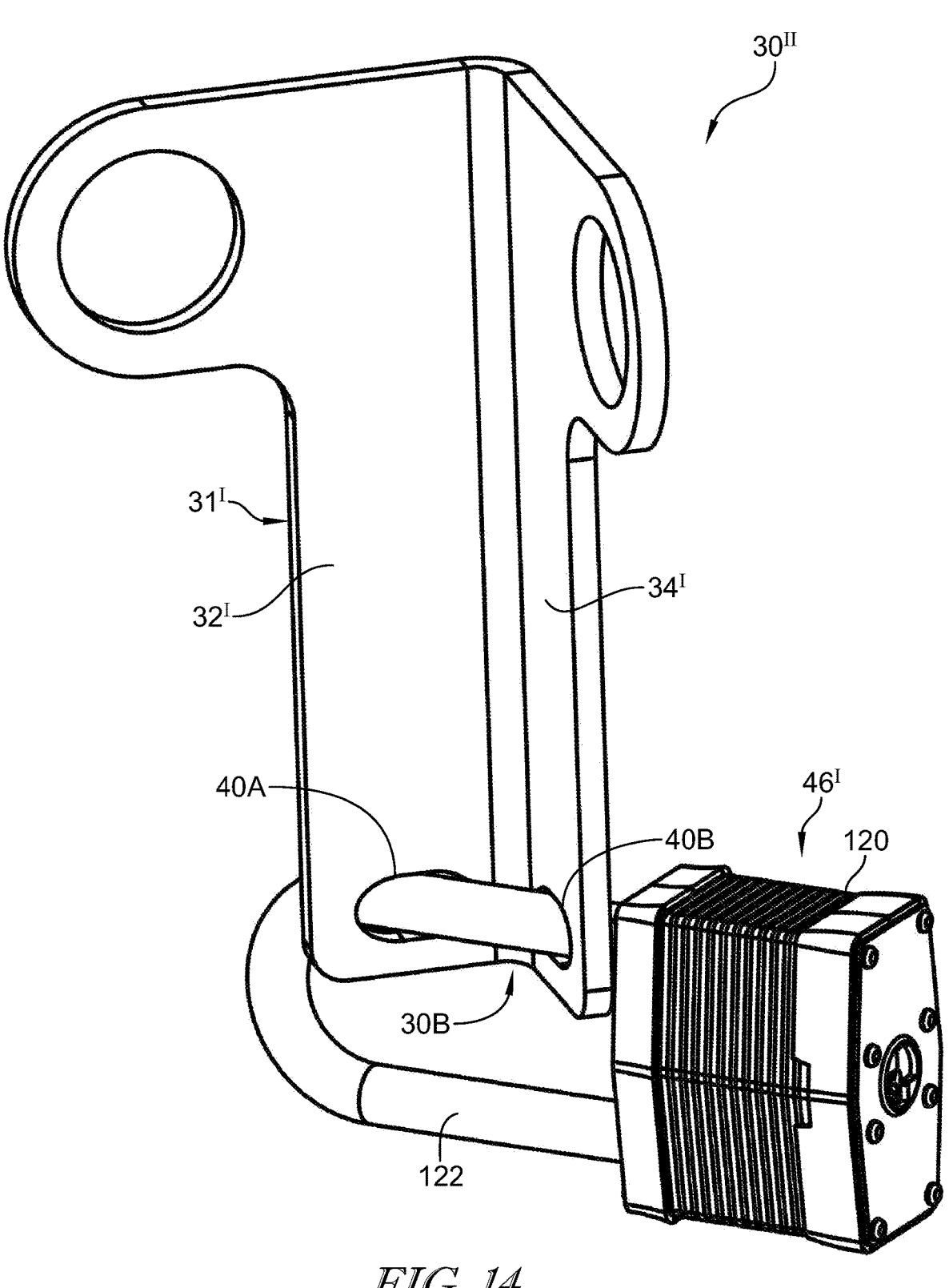
FIG. 14 is a front perspective view of the anchor of FIGS. 8A-8B illustrating another embodiment of an anchor coupling structure for preventing upward movement of the anchor within the channel defined between the bottom rail and an upright angle rail.

Referring now to FIG. 14, an alternate embodiment is shown of an anchor coupling structure 46' for coupling to the body 31-31" of any of the anchors 30-30$^{VII}$ illustrated in FIGS. 1-13 to prevent, or at least restrict, upward movement of the anchor 30-30$^{VII}$ received within the channel 25 defined between the upright angle rail 20 and the bottom rail 14 via contact between the coupling structure 46' and the bottom ends 20A1, 20A2 of the side walls 20A, 20B respectively of the upright angle rail 20. In the embodiment illustrated by example in FIG. 14, the anchor 30" of FIGS. 8A-8B is shown, although the anchor 30" may alternatively be any of the anchors 30-30$^{VII}$, and the coupling structure 46' in this embodiment is illustratively provided in the form of a conventional padlock having a conventional padlock body 120 operatively coupled to a conventional padlock shackle 122. The shackle 122 illustratively has sufficient length to pass through both of the openings 40A, 40B defined through the side walls 32', 34' respectively of the body 31' of the anchor 30', and to then couple and lock to the padlock body 120. In this embodiment, the coupling structure 46' is operable identically as described with respect to the coupling structure 46 of FIGS. 1-6 in that after the body 31' of the anchor 30" is fully inserted into the channel 25 with the bottom end 30B of the body 31' extending out of the bottom 20E of the upright angle rail 20 (see, e.g., FIG. 2A), the coupling structure 46' is engaged with the bottom end 30B of the anchor 30" by extending the unlocked shackle 122 through both of the openings 40A, 40B, and then securing, i.e., locking, the shackle 122 to the padlock body 120 in a conventional manner. With the shackle 122 extending through the openings 40A, 40B and locked to the padlock body 120, the shackle 122 is prevented from passing back through either of the openings 40A, 40B, and upward movement of the anchor 30" within the channel 25 is thereby prevented, or at least restricted, by contact between the shackle 122 and the respective bottom ends 20A$_1$, 20A$_2$ of the respective side walls 20A, 20B of the upright angle rail 20. In alternate embodiments, only one of the openings 40A, 40B may be used, such that the shackle 122 extends only through one of the openings 40A, 40B.

Figure 15A:
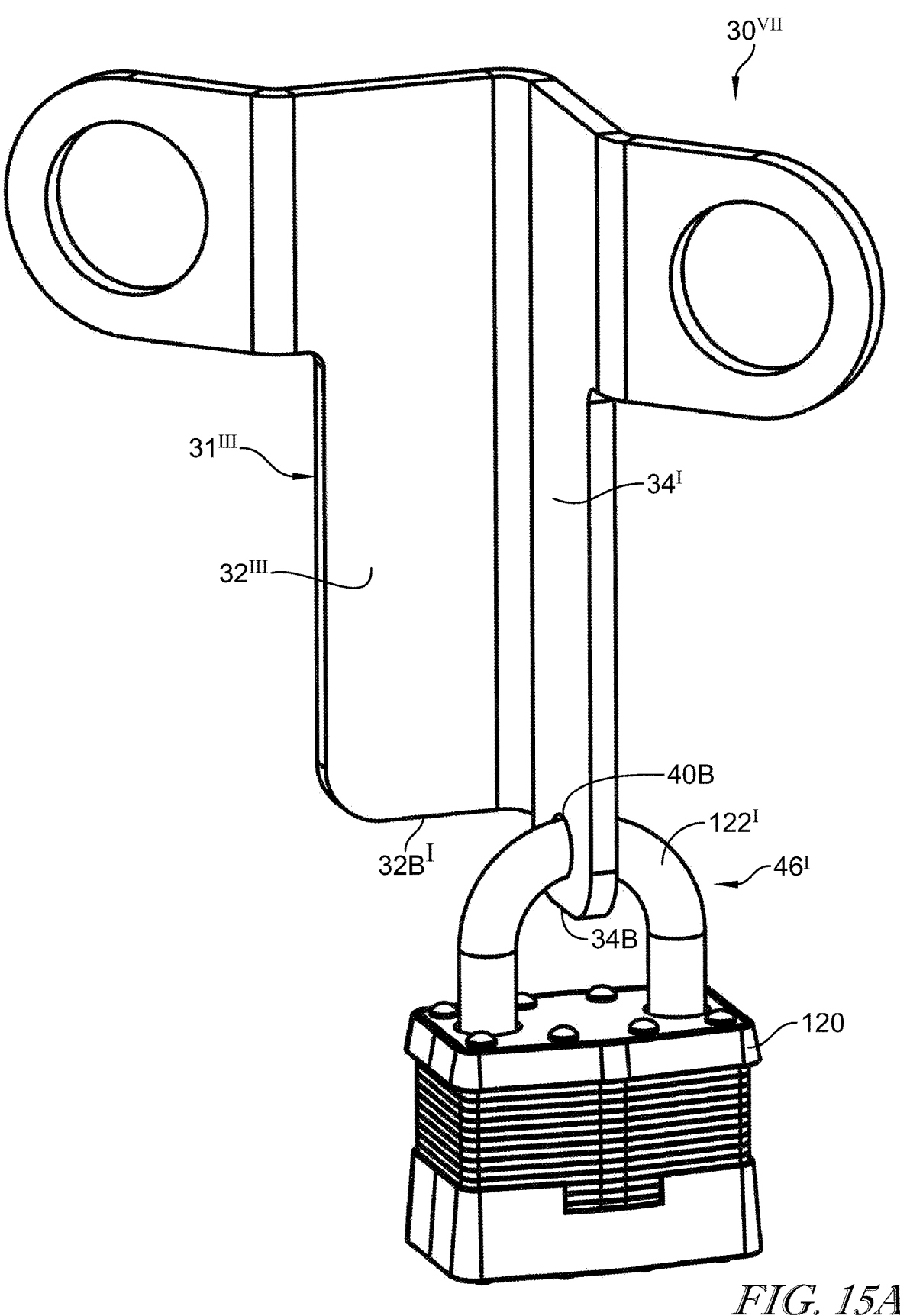
FIG. 15A is a front perspective view of the anchor of FIG. 13 illustrating a modified bottom end of the body of the anchor and another embodiment of an anchor coupling structure for preventing upward movement of the anchor within the channel defined between the bottom rail and an upright angle rail.

Referring now to FIG. 15A, the anchor coupling structure 46' of FIG. 14 is shown which includes a shorter shackle 122'. In the embodiment illustrated in FIG. 15A, the anchor 30$^{VII}$ of FIG. 13 is shown, although the anchor of FIG. 15A may alternatively be any of the anchors 30-30$^{VII}$. In any case, the body 31''' of the anchor 30$^{VII}$ is illustratively modified such that the bottom 32B' of the side wall 32''' is truncated such that the bottom 32B' terminates above the bottom 34B of the side wall 34, and the side wall 34' is unchanged from that shown in FIGS. 8A-8B and 14. In the embodiment illustrated in FIG. 14, the bottom 32B' of the side wall 32''' need not be sized to extend downwardly and outwardly from the end 20E of the upright angle rail 20, and instead only the bottom 34B of the side wall 34' is sized to extend downwardly and outwardly from the end 20E of the upright angle rail 20. The shackle 122' illustratively has sufficient length to pass through the opening 40B defined through the side wall 34' respectively of the body 31''' of the anchor 30$^{VII}$, and to then couple and lock to the padlock body 120. In this embodiment, the coupling structure 46' is configured such that after the body 31''' of the anchor 30$^{VI}$ is fully inserted into the channel 25 with the bottom end 34B of the side wall 34' of the body 31''' extending out of the bottom 20E of the upright angle rail 20 (see, e.g., FIG. 2A), the coupling structure 46' is engaged with the bottom end 30B of the anchor 30" by extending the unlocked shackle 122' through the opening 40B, and then securing, i.e., locking, the shackle 122' to the padlock body 120 in a conventional manner. With the shackle 122' extending through the opening 40B and locked to the padlock body 120, the shackle 122' is prevented from passing back through the opening 40B, and upward movement of the anchor 30$^{VII}$ within the channel 25 is prevented, or at least restricted, by contact between the shackle 122' and the bottom end 20A$_2$ of the side wall 20B of the upright angle rail 20 (see also FIG. 6).

Figure 15B:
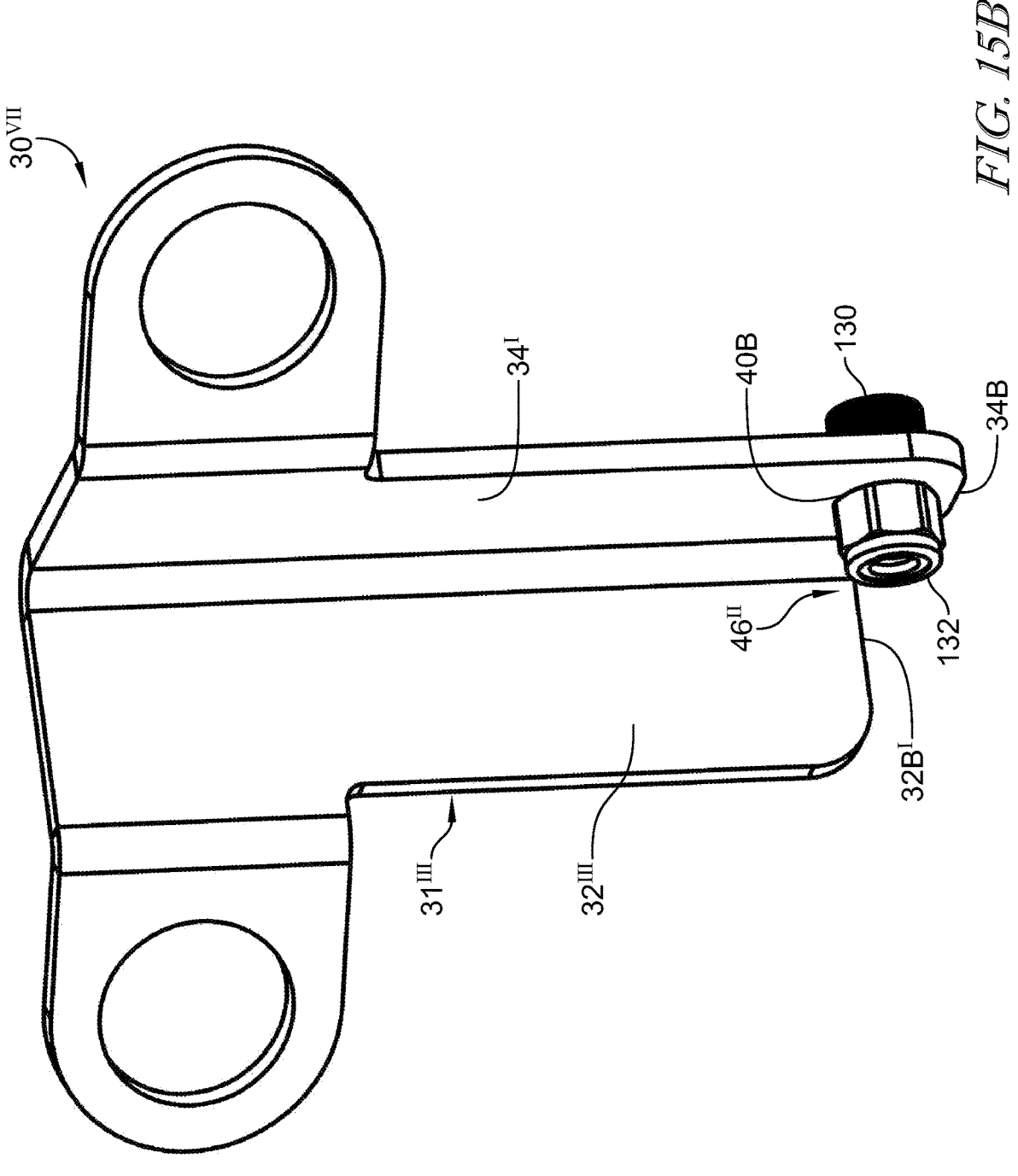
FIG. 15B is a front perspective view of the anchor of FIG. 15A illustrating another embodiment of an anchor coupling structure for preventing upward movement of the anchor within the channel defined between the bottom rail and an upright angle rail.

Referring now to FIG. 15B, an alternate embodiment is shown of another anchor coupling structure 46" for coupling to the side wall 34' of the body 31''' of the anchor 30$^{VII}$ illustrated in FIG. 15A. In the illustrated embodiment, the coupling structure 46" is provided in the form of a bolt 130 and nut 132 combination, wherein the bolt 130 is sized to extend through the opening 40B defined through the side wall 34' adjacent to the end 34B of the side wall 34' (opening 40B shown in FIG. 15A but obscured from view in FIG. 15B by the nut 132), and the nut 132 is sized to threadingly engage the nut 132 to secure the bolt 130 and nut 132 to the side wall 34'. In this embodiment, the coupling structure 46" is configured such that after the body 31''' of the anchor 30$^{VII}$ is fully inserted into the channel 25 with the bottom end 34B of the side wall 34' of the body 31''' extending out of the bottom 20E of the upright angle rail 20 (see, e.g., FIG. 2A), the coupling structure 46" is engaged with the bottom end 30B of the anchor 30" by extending the bolt 130 through the opening 40B, and then threading the nut 132 onto the bolt

130 to secure the bolt 130 and nut 132 to the side wall 34'. With the bolt 130 and nut 132 secured to the side wall 34' through the opening 40B, upward movement of the anchor 30$^{VII}$ within the channel 25 is prevented, or at least restricted, by contact between the bolt 130 and/or nut 132 and the bottom end 20A$_2$ of the side wall 20B of the upright angle rail 20 (see also FIG. 6).

Figure 16:
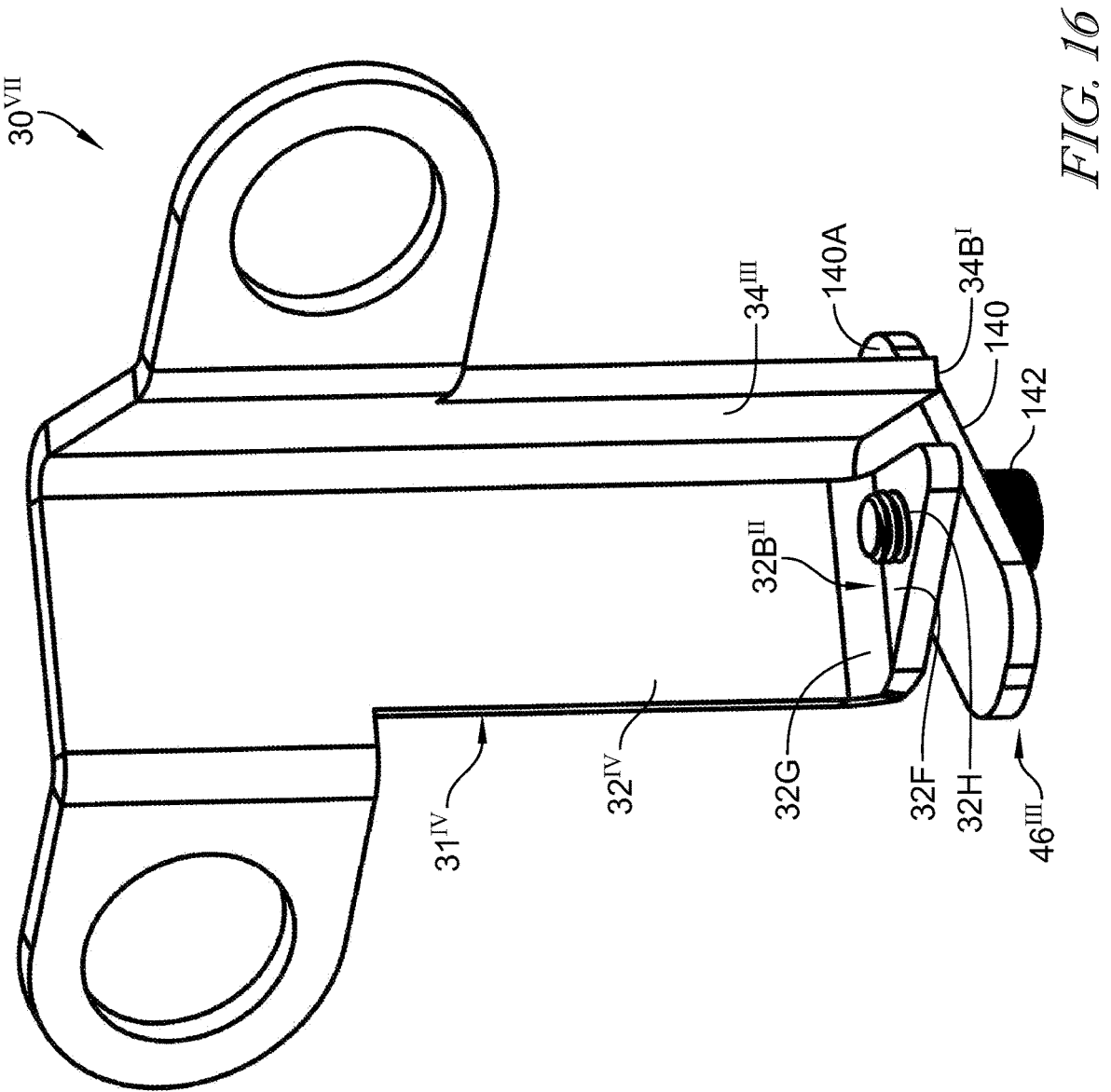
FIG. 16 is a front perspective view of the anchor of FIG. 13 illustrating another modified bottom end of the body of the anchor and yet another embodiment of an anchor coupling structure for preventing upward movement of the anchor within the channel defined between the bottom rail and an upright angle rail.

Referring now to FIG. 16, an alternate embodiment of a body 31$^{IV}$ of an anchor, and of a corresponding anchor coupling structure 46''', is shown in which the anchor head portion is the anchor head associated with the anchor 30$^{VII}$ of FIG. 13, although it will be understood that any of the anchors 30-30$^{VII}$, or at least the anchor heads of any of the anchors 30-30$^{VII}$, may alternatively be used with the body 31$^{IV}$ and anchor coupling structure 46''' of FIG. 16. In any case, the body 31$^{IV}$ includes a modified side wall 32$^{IV}$ in which the bottom end 32B" of the side wall 32$^{IV}$ includes a bend 32G and an ear or tab 32F extending from the bend 32H away from the side wall 32$^{IV}$, wherein the ear or tab 32F is a planar structure, illustratively integral with the side wall 32$^{IV}$, and illustratively having the shape of a right-triangle oriented and sized to as to be received within the channel 25 as the anchor 30$^{VII}$ is passed into and through the channel 25. The inwardly-facing surfaces of the side wall 32$^{IV}$ and the ear or tab 32F form an angle therebetween, and an opening 32H is defined through the ear or tab 32F. In the illustrated embodiment, the inwardly-facing surfaces of the side wall 32$^{IV}$ and the ear or tab 32F form substantially a right angle therebetween, although in alternate embodiments the angle may be greater or less than 90 degrees. The lateral terminal end of the other side wall 34''' of the body 31$^{IV}$ illustratively terminates flush with the downwardly-facing surface of the ear or tab 32F, and an anchor coupling structure 46''' in the form of an anchor plate 140 is provided with a bolt 142 extending therethrough, wherein the bolt 142 is threaded and configured to threadingly engage the opening 32H formed through the ear or tab 32F. The anchor plate 140 illustratively has a length which, when the anchor plate 140 is attached by the bolt 142 to the ear or tab 32F, extends beyond the edge of the diagonal portion of the ear or tab 32F and beyond the outer surface of the side wall 34''' as illustrated by example in FIG. 16. The lengths of the side walls 32$^{IV}$, 34''' are illustratively sized such that, with the body 31$^{IV}$ of the anchor 30$^{VII}$ fully inserted into the channel 25, the co-planar terminal end of the side wall 34''' and downwardly-facing surface of the ear or tab 32F terminate at or just above the respective terminal ends 20A$_1$, 20A$_2$ of the side walls 20A, 20B of the upright angle rail 20.

In the embodiment illustrated in FIG. 16, the coupling structure 46''' is configured such that after the body 31$^{IV}$ of the anchor 30$^{VII}$ is fully inserted into the channel 25 with the bottom end 34B' of the side wall 34''' and the downwardly-facing surface of the ear or tab 32F flush with, or slightly retracted from, the terminal ends 20A$_1$, 20A$_2$ of the side walls 20A, 20B of the upright angle rail 20, the coupling structure 46''' is engaged with the ear or tab 32F of the side wall 32$^{IV}$ of the body 31$^{IV}$ by threading the bolt 142 into the opening 32H, to secure the anchor plate 140 to the side walls 32$^{IV}$ and 34'''. With the bolt 142 secured to the side walls 32$^{IV}$ and 34''', upward movement of the anchor 30$^{VII}$ within the channel 25 is prevented, or at least restricted, by contact between the upwardly-facing surface 140A of the anchor plate 140 and at least one of the bottom end 20A$_1$ of the side wall 20A of the upright angle rail 20, the bottom end 20A$_2$ of the side wall 20B of the upright angle rail 20, and the downwardly-facing surface 14D of the bottom rail 14 (see also FIG. 6). Prior to fully securing the anchor plate 140 to the body $31^{IV}$ of the anchor $30^{VII}$, the anchor plate 140 is laterally rotatable relative to the body $31^{IV}$, and in the illustrated embodiment the anchor plate 140 is sized such that the anchor plate 140 may be positioned so as to secure the upwardly-facing surface 140A against the downwardly-facing surface 14D of the bottom rail 14 and one of the bottom ends $20A_1$, $20A_2$ of a respective one of the side walls 20A, 20B of the upright angle rail 20, although in alternate embodiments the anchor plate 140 may be sized and/or configured in shape such that the upwardly-facing surface 140A of the anchor plate 140 contacts any one or more of the bottom end $20A_1$ of the side wall 20A of the upright angle rail 20, the bottom end $20A_2$ of the side wall 20B of the upright angle rail 20, and the downwardly-facing surface 14D of the bottom rail 14.

Figure 17:
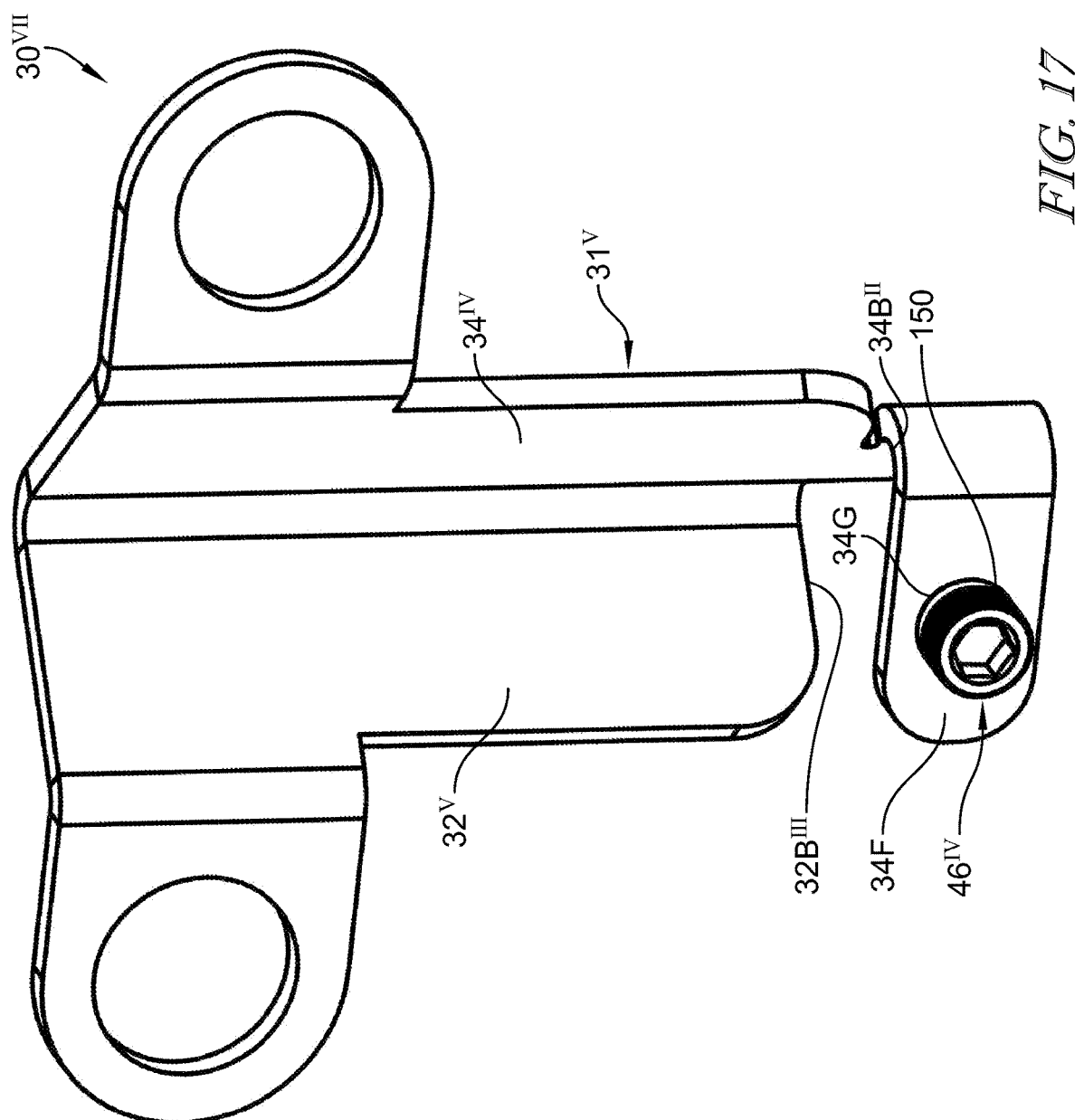
FIG. 17 is a front perspective view of the anchor of FIG. 13 illustrating yet another modified bottom end of the body of the anchor and still another embodiment of an anchor coupling structure for preventing upward movement of the anchor within the channel defined between the bottom rail and an upright angle rail.

Referring now to FIG. 17, another alternate embodiment of a body $31^V$ of an anchor, and of a corresponding anchor coupling structure $46^{IV}$, is shown in which the anchor head portion is the anchor head associated with the anchor $30^{VII}$ of FIG. 13, although it will be understood that any of the anchors $30$-$30^{VII}$, or at least the anchor heads of any of the anchors $30$-$30^{VII}$, may alternatively be used with the body $31^V$ and anchor coupling structure $46^{IV}$ of FIG. 17. In any case, the body $31^V$ includes a modified side wall $32^V$ in which the bottom end 32B''' of the side wall $32^V$ is truncated so that it does not pass through (i.e., outwardly of) the end 20E of the upright angle rail 20 when the anchor $30^{VII}$ is fully inserted in to the channel 25. The body $31^V$ further includes a modified side wall $34^{IV}$ in which a lateral tab or ear 34F extends away from the inwardly-facing surface of the side wall $34^{IV}$. Illustratively, the ear or tab 34F is oriented and sized such that it extends away from the inwardly-facing surface of the side wall $34^{IV}$ at an angle which allows it to be received within the channel 25 as the anchor $30^{VII}$ is passed into and through the channel 25. The ear or tab 34F defines an opening 34G therethrough sized to receive and engage an anchor coupling structure $46^{IV}$, illustratively provided in the form of a threaded bolt 150. The side wall $34^{IV}$ and the ear or tab 34F extending therefrom are illustratively sized so that the resulting length of the combination of the side wall $34^{IV}$ and the ear or tab 34F is such that, with the body $31^V$ of the anchor $30^{VII}$ fully inserted into the channel 25, the opening 34G clears, i.e., extend downwardly out of, the bottom end 20E of the upright angle rail 20. The ear or tab 34F is illustratively configured and oriented such that the bolt 15 enters the opening 34G defined through the ear or tab 34F along an axis that is approximately perpendicular to the longitudinal axis of the channel 25. As a result, with the body $31^V$ of the anchor $30^{VII}$ fully inserted into the channel 25, the bolt 150 is secured to the ear or tab 34F by threading the bolt 150 into the opening 34G, and upward movement of the anchor $30^{VII}$ within the channel 25 is thus prevented, or at least restricted, by contact between the anchor coupling structure $46^{IV}$, i.e., the head of the bolt 150, and the downwardly-facing surface 14D of the bottom rail 14 (see also FIG. 6). In alternate embodiments the ear or tab 34F may be oriented such that upward movement of the anchor $30^{VII}$ within the channel 25 may be prevented, or at least restricted, by contact between the anchor coupling structure $46^{IV}$, i.e., the head of the bolt 150, and the bottom end $20A_1$ of the side wall 20A of the upright angle rail 20, or the bottom end $20A_2$ of the side wall 20B of the upright angle rail 20.

Figure 18A:
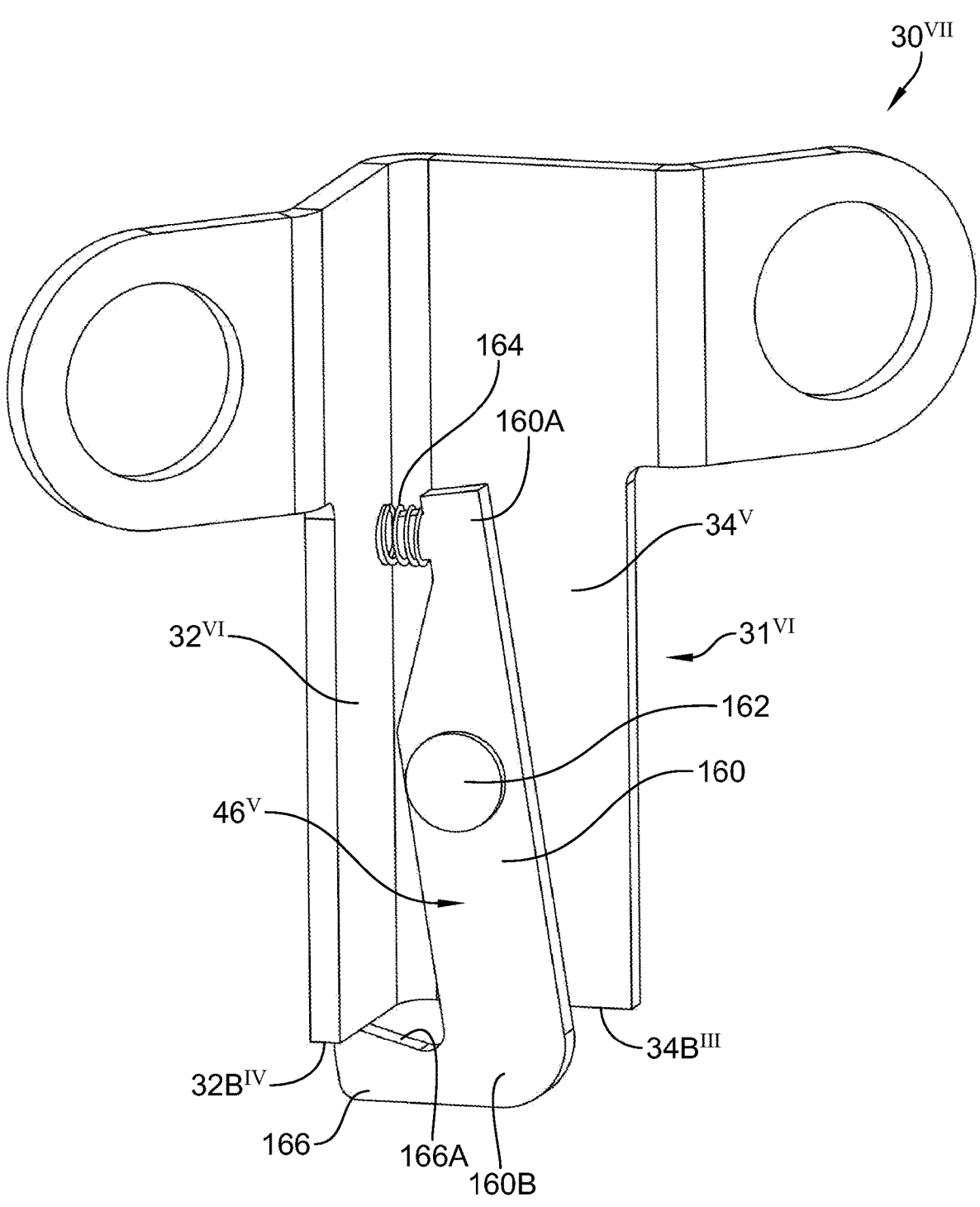
FIG. 18A is a front perspective view of the anchor of FIG. 13 illustrating still another modified bottom end of the body of the anchor and a further embodiment of an anchor coupling structure for preventing upward movement of the anchor within the channel defined between the bottom rail and an upright angle rail, wherein the anchor coupling structure is shown in a deployed state.
Figure 18B:
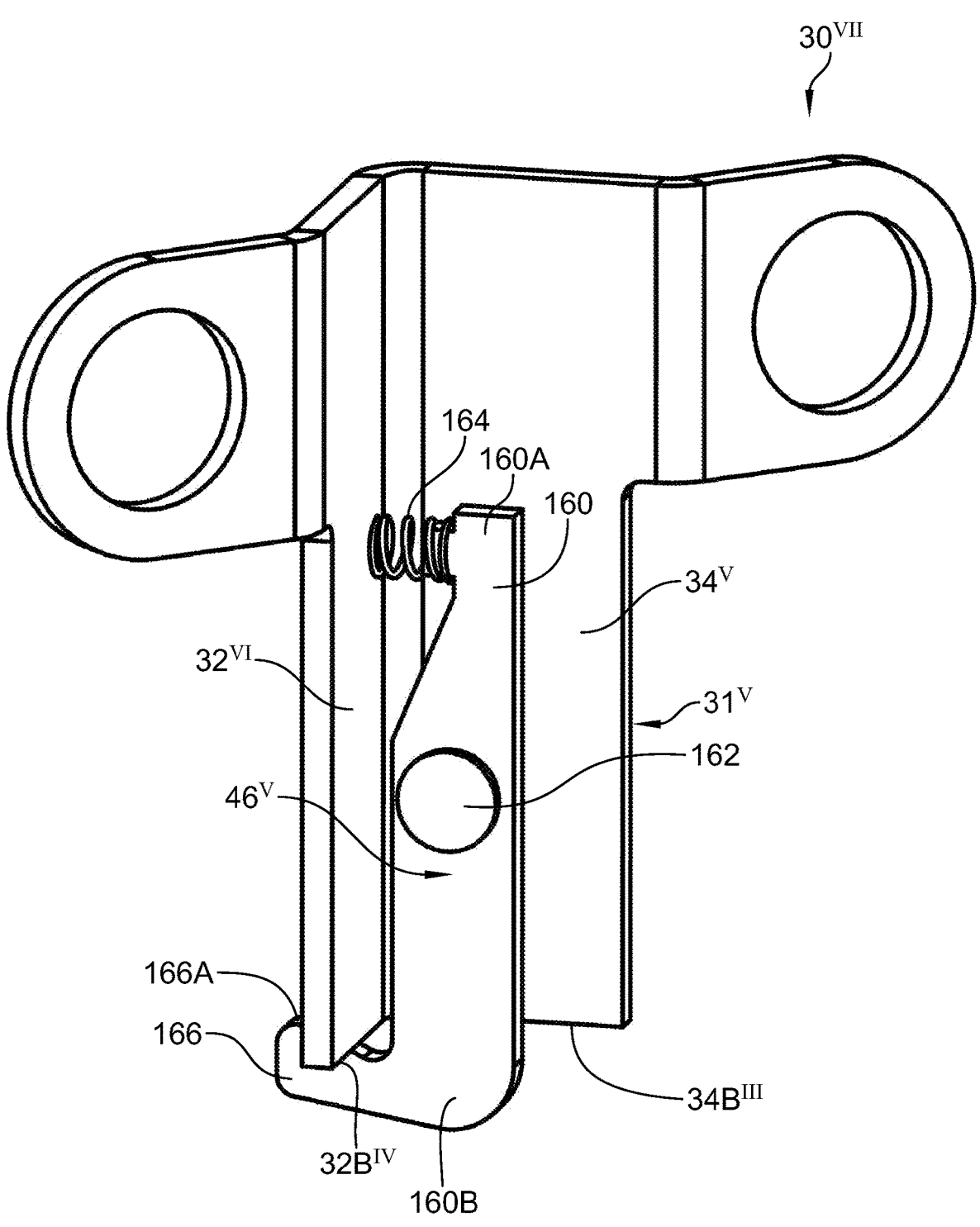
FIG. 18B is a front perspective view similar to FIG. 18A and showing the anchor coupling structure in an undeployed state.

Referring now to FIGS. 18A and 18B, yet another alternate embodiment of a body $31^{VI}$ of an anchor, and of a corresponding anchor coupling structure $46^V$, is shown in which the anchor head portion is the anchor head associated with the anchor $30^{VII}$ of FIG. 13, although it will be understood that any of the anchors $30$-$30^{VII}$, or at least the anchor heads of any of the anchors $30$-$30^{VII}$, may alternatively be used with the body $31^{VI}$ and anchor coupling structure $46^V$ of FIGS. 18A-18B. In any case, the body $31^{VI}$ includes a modified side wall $32^{VI}$ in which the bottom end $32B^{IV}$ of the side wall $32^{VI}$ is truncated so as to clear (i.e., terminate at or pass outwardly of) the end 20E of the upright angle rail 20 when the anchor $30^{VII}$ is fully inserted in to the channel 25, and a modified side wall $34^V$ in which the bottom end 34B''' of the side wall $34^V$ is truncated so as to clear (i.e., terminate at or pass outwardly of) the end 20E of the upright angle rail 20 when the anchor $30^{VII}$ is fully inserted in to the channel 25. In the illustrated embodiment, the bottom ends $32B^{IV}$ and 34B''' of the respective side walls $32^{VI}$ and $34^V$ are co-planar with one another, although in alternate embodiments the bottom end 34B''' of the side wall $34^V$ may terminate higher or lower than the bottom wall $32B^{IV}$ of the side wall $32^{VI}$.

The anchor coupling structure 46\ is illustratively provided in the form of a biased latch 160 pivotably coupled to the inwardly-facing surface of the side wall $34^V$ and configured to automatically deploy upon full insertion of the anchor $30^{VII}$ into the channel 25 defined between the upright angle rail 20 and the bottom rail 14 so as to prevent, or at least restrict, upward movement of the anchor $30^{VII}$ within the channel 25 via contact between the latch 160 and the bottom end $20A_1$ of the side wall 20A of the upright angle rail 20. In alternative embodiments, the biased latch 160 may be coupled to the inwardly-facing surface of the side wall $32^{VI}$ and configured to automatically deploy so as to prevent, or at least restrict, upward movement of the anchor $30^{VII}$ within the channel 25 via contact between the latch 160 and the bottom end $20A_2$ of the side wall 20B of the upright angle rail 20. In the illustrated embodiment, the latch 160 is provided in the form of an elongated lever 160 having an upper end 160A and a lower end 160B, wherein the lever 160 is pivotably coupled to the side wall $34^V$ of the body $31^{VI}$ via a pivot point in the form of conventional fixation member 162, e.g., a bolt or other conventional mechanical element, positioned between the upper end 160A and the lower end 160B such that the ends 160A, 160B of the lever 160 are together pivotable about the fixation member 162.

A biasing member 164, e.g., a coil spring, is positioned between, and coupled to each of, the lever 160 at or adjacent to the upper end 160A thereof and to an oppositely facing portion of the inwardly-facing surface of the side wall $32^{VI}$. The biasing member 164 is normally biased to an expanded state to maintain the upper end 160A of the lever spaced away from the inwardly-facing surface of the side wall $32^{VI}$ as illustrated by example in FIG. 18B, and is compressible, under force, to pivot the upper end 160A of the lever 160 toward and against the inwardly-facing surface of the side wall $32^{VI}$ as illustrated by example in FIG. 18A. A projection 166 extends away from the lower end 160B of the lever 160 in the direction of the side wall $32^{VI}$, and the projection 166 is sized and oriented so as to extend under the bottom end $32B^{IV}$ of the side wall $32^{VI}$ and outwardly away from the outwardly-facing surface of the side wall $32^{VI}$ under the normally biased (extended) state of the biasing member 164, as illustrated by example in FIG. 18B, and such that the terminal end of the projection 166 clears the outwardly-facing surface of the side wall $32^{VI}$ under the bottom end $32B^{IV}$ of the side wall $32^{VI}$ as the biasing member 164 is compressed so as to pivot bottom end 160B of the lever 160 away from the inwardly-facing surface of the side wall $32^{VI}$, as illustrated by example in FIG. 18A. With the lever 160 in the position illustrated in FIG. 18A, the projection 166 of the lever 160 thus does not extend beyond the outwardly-facing surface of the side wall 32$^{VI}$ such that the body 31$^{VI}$ of the anchor 30$^{VII}$ will be freely moved axially along the channel 25 defined between the upright angle rail 20 and the bottom rail 14.

In the embodiment illustrated in FIGS. 18A and 18B, the anchor coupling structure 46$^{V}$ is configured such that sufficient force must be applied to the upper end 160A of the lever 160 to cause the biasing member 164 to compress so as to pivot the bottom end 160B of the lever 160 away from the side wall 32$^{VI}$ to the position illustrated in FIG. 18A in which the terminal end of the projection 166 is inward of the outwardly-facing wall of the side wall 32$^{VI}$. In this position, the body 31$^{VI}$ of the anchor 30$^{VII}$ can be inserted into the channel 25, and when the bottom ends 32B$^{IV}$ and 34B''' of the respective side walls 32$^{VI}$, 34$^{V}$ are captured within the channel 25, the force applied to the upper end 160A of the lever 160 can be released, and the biasing force of the biasing member 164, in turn, forces the terminal end of the projection 166 into contact with the inwardly-facing surface of the side wall 20A of the upright angle rail 20. The body 31$^{VI}$ of the anchor 30$^{VII}$ is then moved downwardly into the channel 25, and when the terminal end of the projection 166 clears the bottom end 20A$_1$ of the side wall 20A of the upright angle rail 20 (see FIG. 6), the biasing force of the biasing member 164 further pivots the bottom end 160B of the lever 160 such that the projection extends outwardly away from the outwardly-facing surface of the side wall 32$^{VI}$, as illustrated in FIG. 18B, and across or over the bottom end 20A$_1$ of the side wall 20A of the upright angle rail 20. With the lever 160 and the projection 166 in this position, upward movement of the anchor 30$^{VII}$ within channel 25 is prevented, or at least restricted, by contact between the upwardly-facing surface 166A of the projection 166 of the lever 160 and the bottom end 20A$_1$ of the side wall 20A of the upright angle rail 20.

Figure 19A:
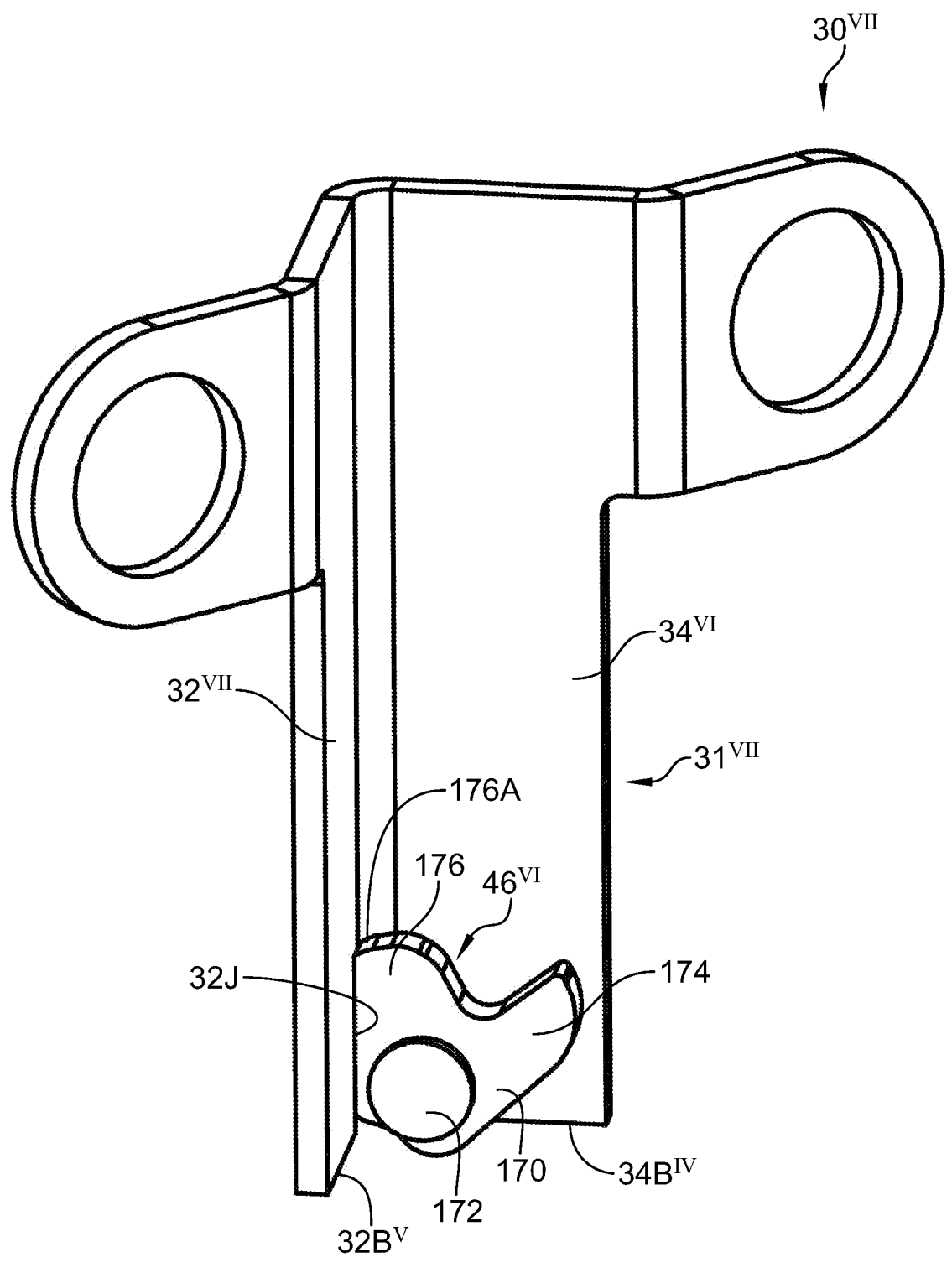
FIG. 19A is a front perspective view of the anchor of FIG. 13 illustrating another modified bottom end of the body of the anchor and another embodiment of an anchor coupling structure for preventing upward movement of the anchor within the channel defined between the bottom rail and an upright angle rail, wherein the anchor coupling structure is shown in an undeployed state.
Figure 19B:
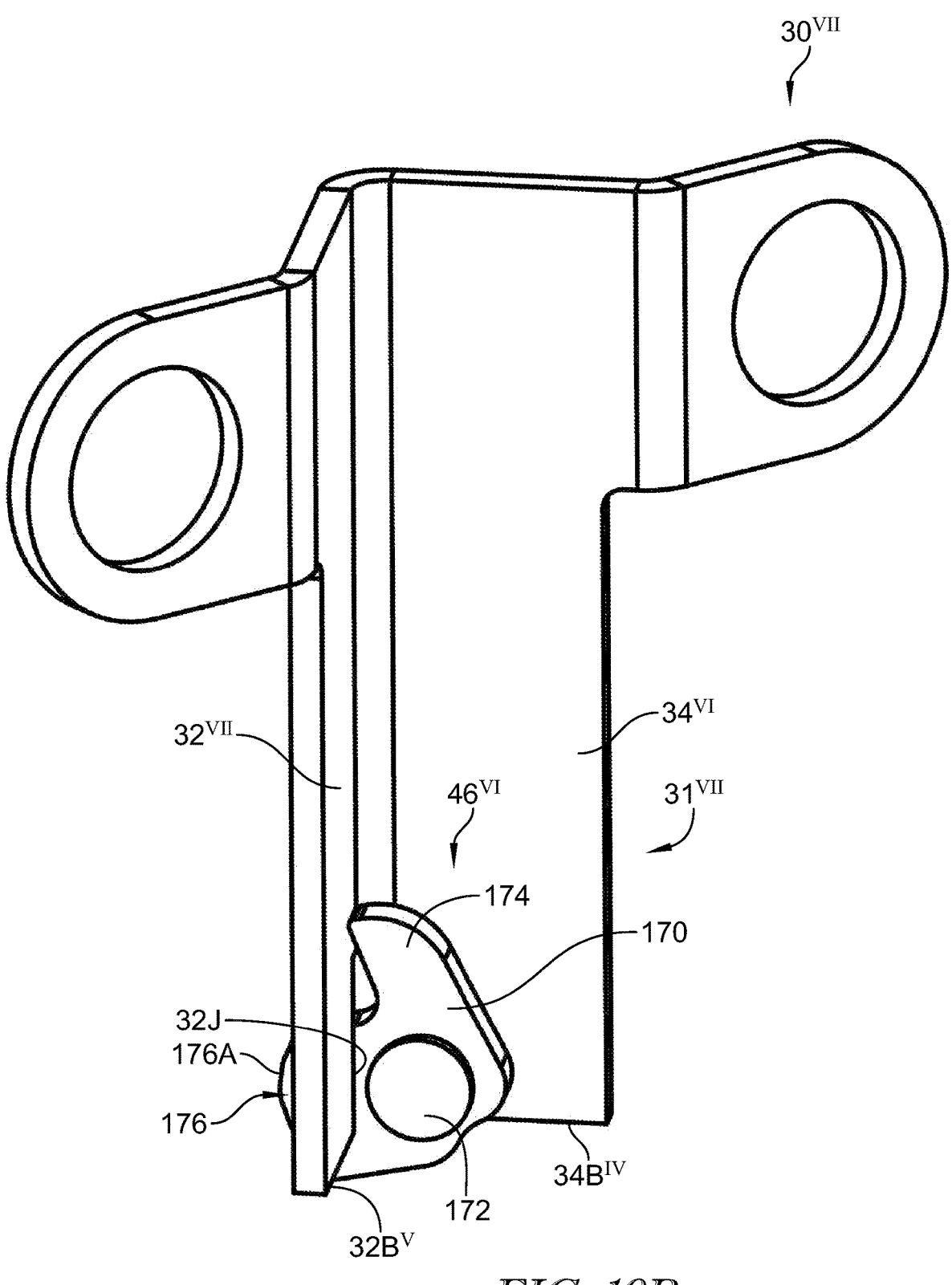
FIG. 19B is a front perspective view similar to FIG. 19A and showing the anchor coupling structure in a deployed state.

Referring now to FIGS. 19A and 19B, still another alternate embodiment of a body 31$^{VII}$ of an anchor, and of a corresponding anchor coupling structure 46$^{VI}$, is shown in which the anchor head portion is the anchor head associated with the anchor 30$^{VII}$ of FIG. 13, although it will be understood that any of the anchors 30-30$^{VII}$, or at least the anchor heads of any of the anchors 30-30$^{VII}$, may alternatively be used with the body 31$^{VII}$ and anchor coupling structure 46$^{VI}$ of FIGS. 19A-19B. In any case, the body 31$^{VII}$ includes a modified side wall 32$^{VII}$ in which the bottom end 32B$^{V}$ of the side wall 32$^{VII}$ is truncated so as to clear (i.e., terminate at or pass outwardly of) the end 20E of the upright angle rail 20 when the anchor 30$^{VII}$ is fully inserted in to the channel 25, and wherein the side wall 32$^{VII}$ includes a slot 32J formed therethrough which is open to the bottom end 32B$^{V}$. The body 31$^{VII}$ further includes a modified side wall 34$^{VI}$, wherein the bottom end 34B$^{IV}$ of the side wall 34$^{VI}$ is likewise truncated so as to be co-planar with the bottom end 32B$^{V}$ of the side wall 32$^{VII}$, although in alternate embodiments the bottom end 34B$^{V}$ of the side wall 34$^{VI}$ may terminate higher or lower than the bottom wall 32B$^{V}$ of the side wall 32$^{VII}$.

The anchor coupling structure 46$^{VI}$ is illustratively provided in the form of a weighted cam 170 pivotably coupled to the inwardly-facing surface of the side wall 34$^{VI}$ and configured to automatically deploy upon full insertion of the anchor 30$^{VII}$ into the channel 25 defined between the upright angle rail 20 and the bottom rail 14 so as to prevent, or at least restrict, upward movement of the anchor 30$^{VII}$ within the channel 25 via contact between the cam 170 and the bottom end 20A$_1$ of the side wall 20A of the upright angle rail 20. In alternative embodiments, the biased cam 170 may be coupled to the inwardly-facing surface of the side wall 32$^{VII}$ and configured to automatically deploy so as to prevent, or at least restrict, upward movement of the anchor 30$^{VII}$ within the channel 25 via contact between the cam 170 and the bottom end 20A$_2$ of the side wall 20B of the upright angle rail 20. In the illustrated embodiment, the weighted cam 170 is provided in the form of a flat, disk-shaped body 170 having a projection 174 extending away from an engagement portion 176, wherein the engagement portion 176 of the body 170 is pivotably coupled to the side wall 34$^{VI}$ of the body 31$^{VII}$ via a pivot point in the form of conventional fixation member 172, e.g., a bolt or other conventional mechanical element, positioned between the engagement portion 176 and the projection 174 such that an engagement surface 176A of the engagement portion 176 and the projection 174 are together pivotable about the fixation member 162.

The engagement portion 176 of the cam body 170 is sized and configured so as to form a weighted body which normally rotates the cam body 170, under the force of gravity, to cause the engagement portion 176 to extend into and through the slot 32J formed through the side wall 32$^{VII}$ as illustrated by example in FIG. 19B. The cam body 170 rotates relative to the side wall 34$^{VI}$ as just described until the projection 174 comes into contact with the side wall 32$^{VII}$ above the slot 32J, which fixes the position of the cam body 170 such that engagement surface 176A of at least part of the engagement portion 176 extends outwardly away from the outwardly-facing wall of the side wall 32$^{VII}$. The cam body 170 may be pivoted in the opposite direction by application of a suitable force to the projection 174 to cause the cam body 170 to rotate such as that the projection 174 moves away from the side wall 32$^{VII}$, the engagement portion 176 rotates back through the slot 32J until the engagement surface 176A of the engagement portion 176 clears the outwardly-facing surface of the side wall 32$^{VI}$ of the side wall 32$^{VI}$, as illustrated by example in FIG. 19A. With the cam body 170 in the position illustrated in FIG. 19A, the engagement portion 176 of cam body 170 thus does not extend beyond the outwardly-facing surface of the side wall 32$^{VII}$ such that the body 31$^{VII}$ of the anchor 30$^{VII}$ will be freely moved axially along the channel 25 defined between the upright angle rail 20 and the bottom rail 14.

In the embodiment illustrated in FIGS. 19A and 19B, the anchor coupling structure 46$^{VI}$ is configured such that sufficient force must be applied to the projection 174 of the cam body 170 to cause the cam body 170 to rotate the engagement portion 176 of the cam body 170 through the slot 32J in the direction inwardly away from the inwardly-facing surface of the side wall 32$^{VII}$ to the position illustrated in FIG. 19A in which the engagement surface 176A of the engagement portion 176 of the cam body 170 is completely inward of the outwardly-facing wall of the side wall 32$^{VII}$. In this position, the body 31$^{VII}$ of the anchor 30$^{VII}$ can be inserted into the channel 25, and when the bottom ends 32B$^{V}$ and 34B$^{IV}$ of the respective side walls 32$^{VII}$, 34$^{VII}$ are captured within the channel 25, the force applied to the projection 174 can be released, and the weighted engagement portion 176 of the cam body 170, in turn, rotates the cam body 170 in the opposite direction to cause the engagement portion 176 to pass into and through the slot 32J until the engagement surface 176A of the engagement portion 176 of the cam body 170 comes into contact with the inwardly-facing surface of the side wall 20A of the upright angle rail 20. The body 31$^{VII}$ of the anchor 30$^{VII}$ is then moved downwardly into the channel 25, and when the engagement surface 176A of the engagement portion 176 of the cam body 170 clears the bottom end 20A₁ of the side wall 20A of the upright angle rail 20 (see FIG. 6), the weighted engagement portion 176 of the cam body 170 further rotates the cam body 170 until the projection 174 contacts the inwardly-facing surface of the side wall 32$^{VII}$ above the lot 32J, which causes the engagement portion 176 to extend outwardly away from the outwardly-facing surface of the side wall 32$^{VII}$, as illustrated in FIG. 19B, and across or over the bottom end 20A₁ of the side wall 20A of the upright angle rail 20. With the cam body 170 in this position, upward movement of the anchor 30$^{VII}$ within the channel 25 is prevented, or at least restricted, by contact between the upwardly-facing engagement surface 176A of the engagement portion 176 of the cam body 170 and the bottom end 20A₁ of the side wall 20A of the upright angle rail 20.

In the embodiments illustrated in FIGS. 1-19B and described above, the various anchors 30-30$^{VII}$ are illustratively constructed in the form of an elongated V-shaped body 31-31$^{VII}$ with an integral anchor head, e.g., such that the anchor body and the anchor head are illustratively of uniform construction, and with various lower body configurations for accommodating and/or coupling to various anchor coupling structures 46-46$^{VI}$. In some alternate embodiments, the anchor body may be provided in the form of a closed structure, i.e., a three-sided triangle in transverse cross-section, with a top end configured to mount an anchor head of any desired design thereto, and with a bottom end configured to mount an anchor coupling structure of any desired design thereto. In some such embodiments, the anchor body, anchor head, and the anchor coupling structure may each be formed as a solid structure, and in other embodiments the anchor body may be formed as a hollow or semi-hollow, yet three-sided structure, and in still other embodiments the anchor body. In some embodiments, the anchor body, the anchor head and/or the anchor coupling structure may be formed by any conventional technique such as casting or other conventional technique.

Figure 20A:
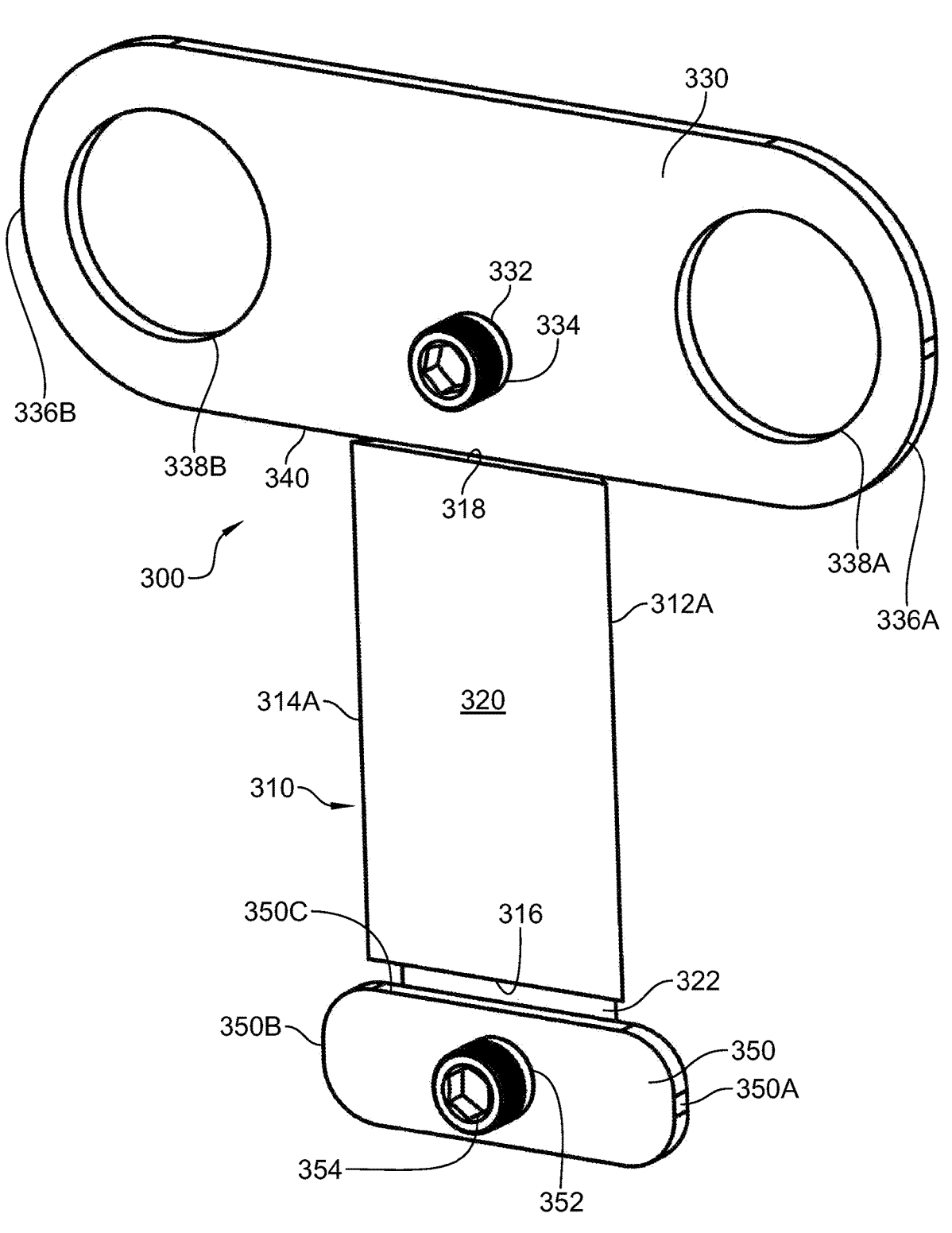
FIG. 20A is a front perspective view of another embodiment of an anchor mountable to and within a channel defined between a bottom rail and an upright angle rail of the trailer of FIG. 1.
Figure 20B:
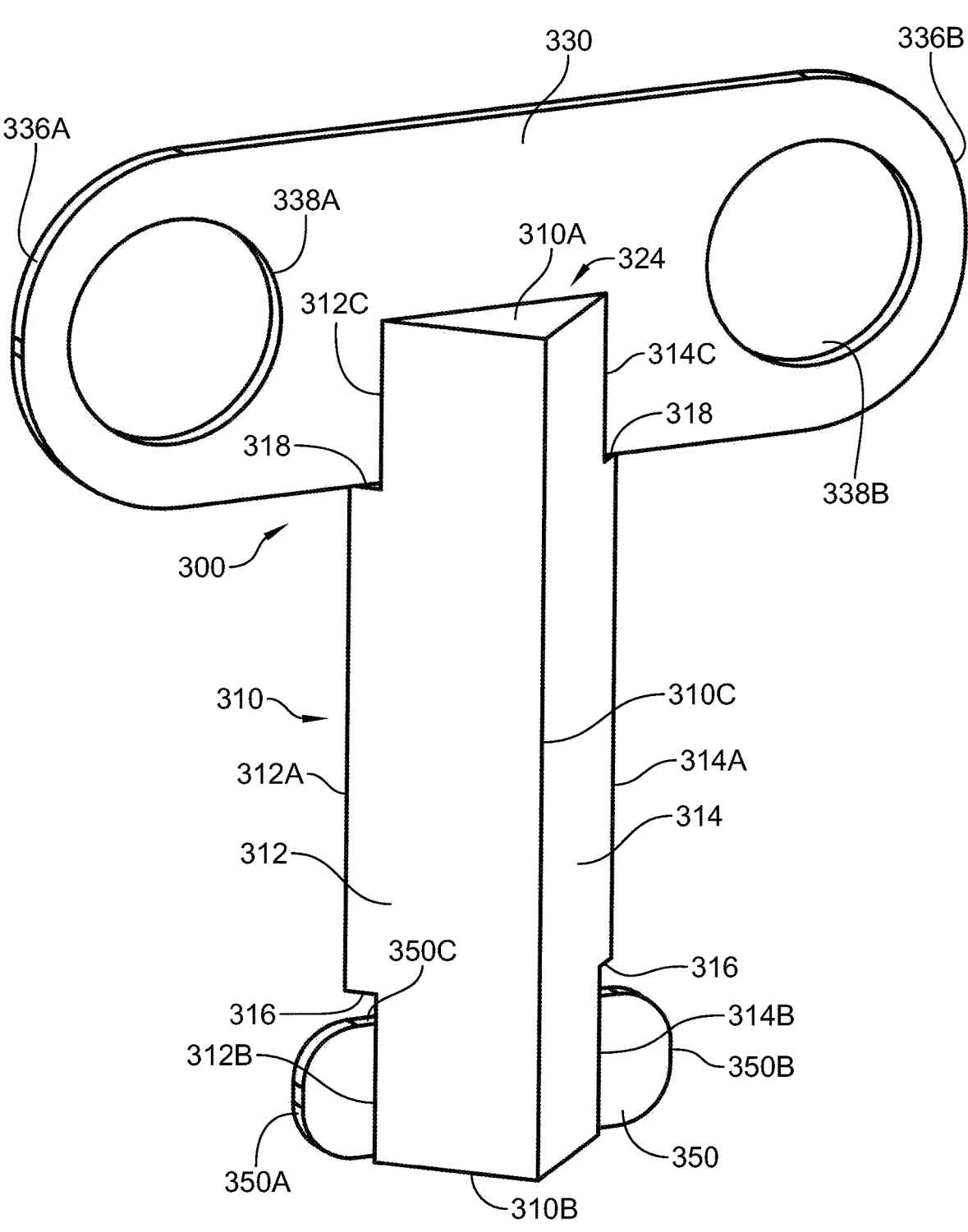
FIG. 20B is a rear perspective view of the anchor of FIG. 20A.

Referring now to FIGS. 20A and 20B, an anchor 300 of the type just described is shown. In the illustrated embodiment, the anchor 300 includes a three-sided body 310 generally having the shape of a triangle in lateral cross-section as described above with respect to the various anchors 30-30$^{VII}$ of FIGS. 1-13, wherein the body 310 is configured to detachably mount an anchor head and an anchor coupling structure thereto, as the terms "anchor head" and "anchor coupling structure" are used hereinabove. The body 310 illustratively includes two sides 312, 314, which meet at an apex 310C that extends from a top end 310A of the body 310 to a bottom end 310B of the body 310. Between the top end 310A and the bottom end 310B of the body 310, the side wall 312 extends away from the apex 310C to a lateral terminal end 312A which forms another apex with a lateral terminal end of a front wall 320, and the side wall 314 similarly extends away from the apex 310C to a lateral terminal end 314A which forms yet another apex with the opposite lateral terminal end of the front wall 320. Adjacent to the bottom end 310B of the body 310, the side wall 312 extends away from the apex 310C to another lateral terminal end 312B, wherein the lateral terminal end 312A extends further away from the apex 310C than the lateral terminal end 312B so as to form a step 316 at the junction of the lateral terminal ends 312A, 312B of the side wall 312. The step 316 extends across the front wall 320 and is also defined between the lateral terminal end 314A of the side wall 314 and another lateral terminal side wall 314B of the side wall extending between the bottom end 310B of the body 310 and the step 316. Adjacent to the top end 310A of the body 310, the side wall 312 likewise extends away from the apex 310C to another lateral terminal end 312C, wherein the lateral terminal end 312A extends further away from the apex 310C than the lateral terminal end 312C so as to form another step 318 at the junction of the lateral terminal ends 312A, 312C of the side wall 312. The step 318 extends across the front wall 320 and is also defined between the lateral terminal end 314A of the side wall 314 and another terminal side wall 314C of the side wall extending between the top end 310A of the body 310 and the step 318. The walls 312, 314, 320 are all illustratively planar, and a lower recessed planar wall 322 is illustratively defined between bottom end 310B of the body 310 and the step 316, and an upper recessed planar wall 324 is illustratively defined between the top end 310A of the body 310 and the step 318, wherein the planes formed by the planar walls 320, 322, and 324 are illustratively parallel with one another.

The recessed wall 324 and the step 318 defined between the front wall 320 and the recessed wall 324 illustratively together form a mounting platform and surface upon which to mount an anchor head. In the embodiment illustrated in FIGS. 20A, 20B, an anchor head 330 is illustratively provided in the form of an elongated plate having rounded lateral terminal ends 336A, 336B, and defining a mounting opening 332 therethrough approximately centrally between the lateral terminal ends 336A, 336B. A complementary opening is formed into the recessed wall 324, e.g., centrally between the terminal lateral ends 312C, 314C, and a conventional fixation element 334, e.g., a threaded bolt or other conventional fixation element, extends through and/or engages the opening 332 and the opening defined in the recessed wall 324, and fixes the anchor head 330 to the anchor body 310. In the illustrated embodiment, the anchor head 336 defines two anchor openings 338A, 338B therethrough adjacent to the respective ends 336A, 336B, each of which extends through the anchor head 330. In some embodiments, the anchor openings 338A, 338B are sized for connection thereto of a conventional hook or other engagement structure to or integral with a conventional tie-down or anchoring strap. In any case, the downwardly-facing bottom edge 340 of the anchor head 330 is oriented to rest upon the terminal end 15B of the side wall 14B of the bottom rail 14 upon full insertion of the anchor 300 into the channel 25 defined between the upright angle rail 20 and the bottom rail 14 as described above with respect to FIGS. 1-13, such that the bottom edge 340 defines an anchor support surface of the anchor 300 relative to the utility trailer 10.

In other embodiments, the anchor opening 338A and/or the anchor opening 338B may be sized and/or configured to mount an anchoring structure to the anchor head 330, e.g., such as an eye-bolt 42, and in such embodiments the anchoring structure will illustratively be sized and configured for connection thereto of a conventional hook or other engagement structure to or integral with a conventional tie-down or anchoring strap. In any case, although two openings 338A, 338B are defined through the anchor head 330 in FIGS. 20A, 20B, it will be understood that the anchor head 330 may defined more or fewer openings therethrough, at least one of which is configured for connection thereto of a conventional hook or other engagement structure to or integral with a conventional tie-down or anchoring strap or for attachment thereto of an anchoring structure as just described. It will be further understood that the anchor head 330 illustrated in FIGS. 20A, 20B and described above represents only one example shape and configuration of an anchor head that may be mounted to the anchor body 310, and that other shapes and/or configurations of the anchor head 330 may be mounted to the anchor body 310, some non-exhaustive examples of which are illustrated in FIGS. 4A-13 and described above.

The recessed wall 322 and the step 316 defined between the front wall 320 and the recessed wall 322 illustratively together form a mounting surface upon which to mount an anchor coupling structure. In the embodiment illustrated in FIGS. 20A, 20B, an anchor coupling structure 350 is illustratively provided in the form of an elongated plate having rounded lateral terminal ends 350A, 350B, and defining a mounting opening 352 therethrough approximately centrally between the lateral terminal ends 350A, 350B. A complementary opening is formed into the recessed wall 322, e.g., centrally between the lateral terminal ends 312B, 314B, and a conventional fixation element 354, e.g., a threaded bolt or other conventional fixation element, extends through and/or engages the opening 352 and the opening defined in the recessed wall 322, and fixes the anchor coupling structure 350 to the anchor body 310. In the illustrated embodiment, the length of the anchor body 310 is such that, with the anchor body 310 fully inserted into a channel 25 defined between an upright angle rail 20 and the bottom rail 14, the recessed wall 322 clears the terminal ends $20A_1$, $20A_2$ of the respective side walls 20A, 20B of the upright angle rail 20 sufficiently to allow for mounting of the anchor coupling structure 350 to the recessed wall 322 as depicted by example in FIGS. 20A, 20B. The length of the anchor coupling structure 350 between the lateral terminal ends 350A, 350B is such that, with the anchor body 310 fully inserted into a channel 25 as just described, the upwardly-facing top edge 350C of the anchor coupling structure 350 extends laterally beyond the clears the terminal ends $20A_1$, $20A_2$ of the respective side walls 20A, 20B of the upright angle rail 20 so as to prevent, or at least restrict, upward movement of the anchor body 310 within the channel 25.

The anchor 300 is operatively mounted to a utility trailer 10 by first mounting an anchor head, such as the anchor head 330 depicted by example in FIGS. 20A, 20B, to the recessed wall 324 of the anchor body 310. The bottom end 310B of the anchor body 310 is then inserted into a channel 25 defined between an upright angle rail 20 and the bottom rail 14, and the anchor body 310 is passed fully into the channel 25 until the downwardly-facing anchor support surface 340 of the anchor head 330 contacts the upwardly-facing terminal end 15B of the side wall 14B of the bottom rail 14 such that the anchor 300 is supported in the channel 25 by the bottom edge 340 of the anchor head 330 resting upon the terminal end 15B of the bottom rail 14. The anchor coupling structure 350 is then mounted to the recessed wall 322 of the anchor body 310 as described above. The upwardly-facing edge 350C of the anchor coupling structure 350 prevents, or at least restricts, upward movement of the anchor 300 within the channel 25 by contact between the upwardly-facing edge 350C of the coupling structure 350 with the bottom ends $20A_1$, $20A_2$ of the side walls 20A, 20B of the upright angle rail 20. In alternate embodiments, the anchor coupling structure 350 may be shaped and/or configured such that the upwardly-facing edge 350C of the anchor coupling structure 350 prevents, or at least restricts, upward movement of the anchor 300 within the channel 25 by contact between the upwardly-facing edge 350C of the coupling structure 350 with only one of the bottom ends $20A_1$, $20A_2$ of the respective side wall 20A, 20B of the upright angle rail 20.

Referring now to FIGS. 21A-22B, an example variant 400 is shown of the anchor 300 of the type just described is shown. In the illustrated embodiment, the anchor 400 includes a three-sided body 410 generally having the shape of a triangle in lateral cross-section as described above with respect to FIGS. 20A, 20B, and the body 410 is configured to detachably mount an anchor head and an anchor coupling structure thereto, as the terms "anchor head" and "anchor coupling structure" are used hereinabove. The body 410 illustratively includes two sides 412, 414, which meet at an apex 410C that extends from a top end 410A of the body 410 to a bottom end 410B of the body 410. In the illustrated embodiments, the top end 410A and the top and bottom ends 410A, 410B are both planar surfaces and parallel to one another, although in alternate embodiments the top end 410A and/or the bottom end 410B may be a non-planar surface. In any case, between the top end 410A and the bottom end 410B of the body 410, the side wall 412 extends away from the apex 410A to a lateral terminal end 412A which forms another apex with a lateral terminal end of a front wall 416 of the body 410, and the side wall 414 similarly extends away from the apex 410C to a lateral terminal end 414A which forms yet another apex with the opposite lateral terminal end of the front wall 416.

A generally L-shaped bracket 420 includes a lower bracket leg 422 configured to mount directly to the top end 410A of the body 410 of the anchor 400, e.g., via a conventional fixation element 424 passed through aligned openings in each of the bracket leg 422 and the top end 410A of the body 410 such that the fixation element 424 engages the opening in the top end 410A of the body 410. An upper bracket leg 426 is configured to mount directly to an anchor head 430, e.g., via a conventional fixation element 428 passed through aligned openings in each of the bracket leg 426 and the body of the anchor head 430 4 such that the fixation element 428 engages the opening in the anchor head 430 or engages a nut or other such fixation element to fix the anchor head 430 therebetween. In any case, the anchor head 430 is illustratively identical to the anchor head 330 illustrated in FIGS. 20A, 20B and described above, including respective lateral terminal ends 432A, 432B, openings 434A, 434B and anchor support surface 436, although it will be understood that the anchor head 430 may have any desired configuration with any number of openings as described above with respect to the anchor head 330.

The bottom end 410B of the body 410 of the anchor 400 illustratively forms a mounting surface to mount to an anchor coupling structure. In the embodiment illustrated in FIGS. 21A, 21B, an anchor coupling structure 450 is illustratively provided in the form of an elongated plate having rounded lateral terminal ends 450A, 450B, and defining a mounting opening therethrough approximately centrally between the terminal ends 450A, 450B. A complementary opening is formed into the bottom end 410B of the body 410 of the anchor, and a conventional fixation element 452, e.g., a threaded bolt or other conventional fixation element, extends through and/or engages the openings to fix the anchor coupling structure 450 to the anchor body 410 such that one face 450C of the anchor coupling plate 450 faces upwardly toward the anchor head 430. In the illustrated embodiment, the length of the anchor body 410 is such that, with the anchor body 410 fully inserted into a channel 25 defined between an upright angle rail 20 and the bottom rail 14, the bottom end 410B of the body 410 clears, terminates at, or is recessed slightly above, the terminal ends $20A_1$, $20A_2$ of the respective side walls 20A, 20B of the upright angle rail 20 so as to allow for mounting of the anchor coupling structure 450 to the bottom end 410B of the body 410 of the anchor 400 as depicted by example in FIGS. 21A, 21B. The length of the anchor coupling structure 450 between the terminal ends 450A, 450B is such that, with the anchor body 410 fully inserted into a channel 25 as just described, the upwardly-facing top surface 450C of the anchor coupling structure 450 extends laterally beyond the clears the terminal ends 20A₁, 20A₂ of the respective side walls 20A, 20B of the upright angle rail 20 so as to prevent, or at least restrict, upward movement of the anchor body 410 within the channel 25.

Figure 21A:
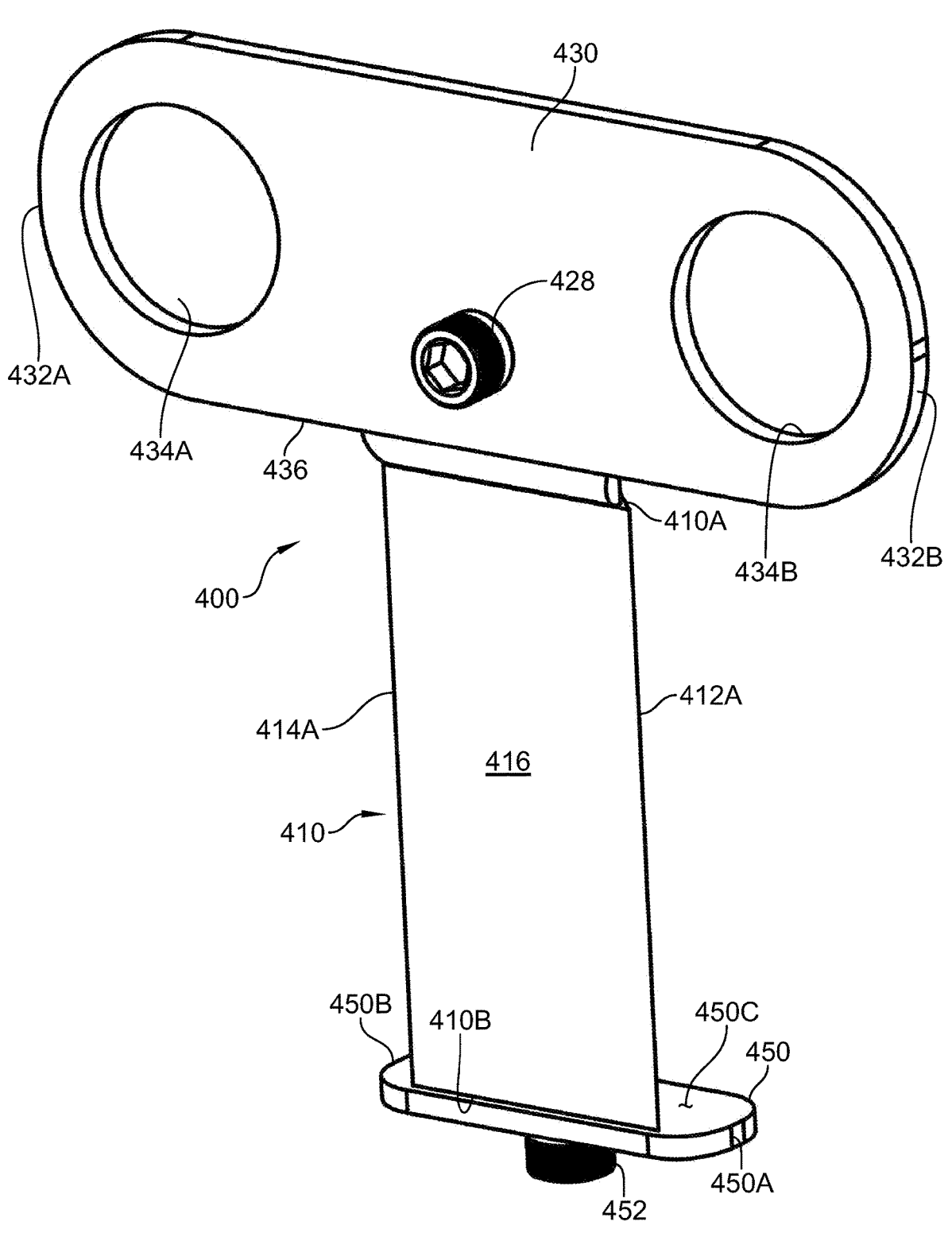
FIG. 21A is a front perspective view of yet another embodiment of an anchor mountable to and within a channel defined between a bottom rail and an upright angle rail of the trailer of FIG. 1.
Figure 21B:
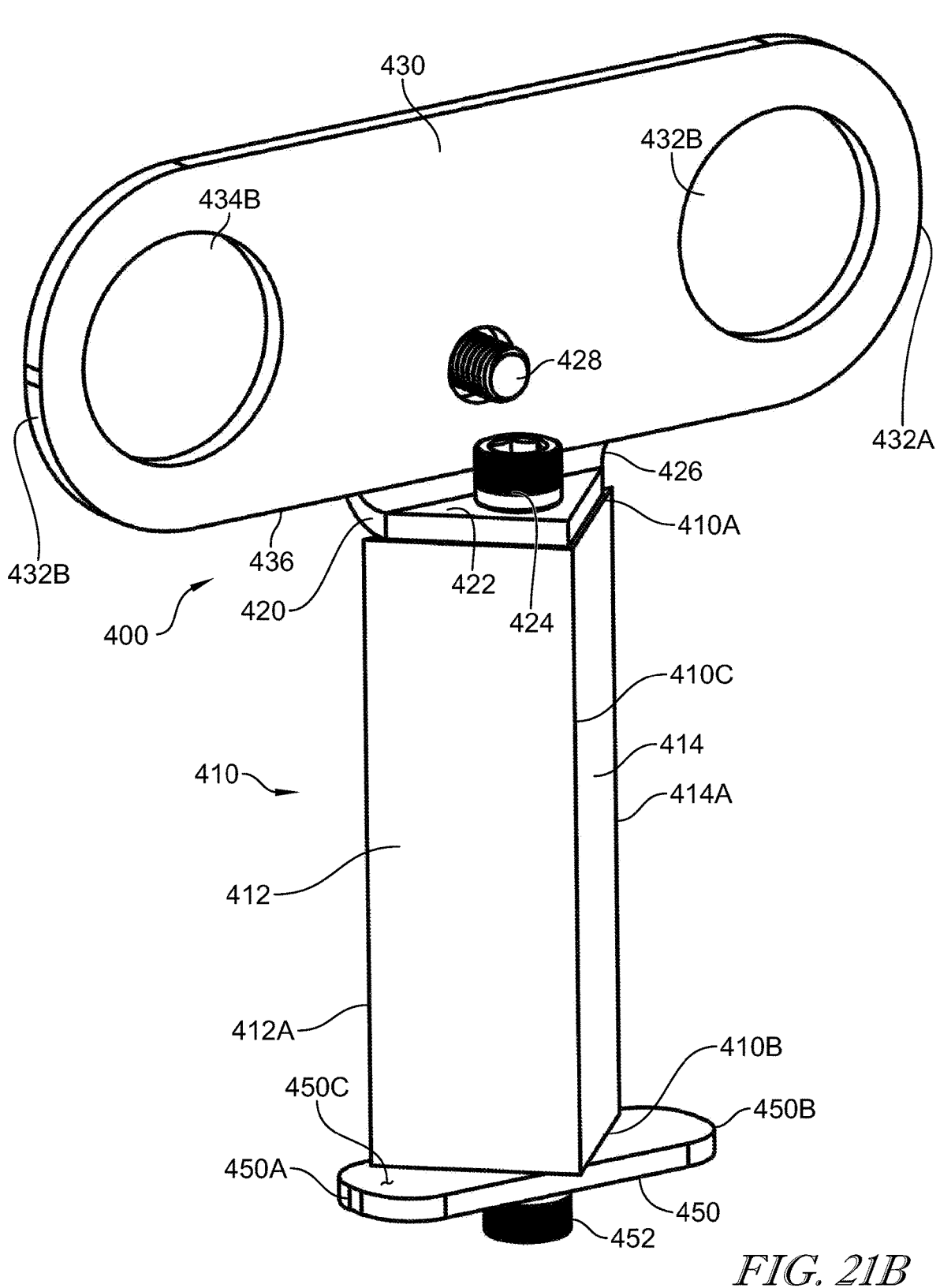
FIG. 21B is a rear perspective view of the anchor of FIG. 21A.

The anchor 400 is operatively mounted to a utility trailer 10 by first mounting an anchor head, such as the anchor head 400 depicted by example in FIGS. 21A, 21B, to the top end 410A of the anchor body 410. The bottom end 410B of the anchor body 410 is then inserted into a channel 25 defined between an upright angle rail 20 and the bottom rail 14, and the anchor body 410 is passed fully into the channel 25 until the downwardly-facing anchor support surface 436 of the anchor head 430 contacts the upwardly-facing terminal end 15B of the side wall 14B of the bottom rail 14 such that the anchor 400 is supported in the channel 25 by the bottom edge 436 of the anchor head 430 resting upon the terminal end 15B of the bottom rail 14. The anchor coupling structure 450 is then mounted to the bottom end 410B of the anchor body 410 as described above. The upwardly-facing surface 450C of the anchor coupling structure 450 prevents, or at least restricts, upward movement of the anchor 400 within the channel 25 by contact between the upwardly-facing surface 450C of the coupling structure 450 with the bottom ends 20A₁, 20A₂ of the side walls 20A, 20B of the upright angle rail 20. In alternate embodiments, the anchor coupling structure 450 may be shaped and/or configured such that the upwardly-facing surface 450C of the anchor coupling structure 450 prevents, or at least restricts, upward movement of the anchor 400 within the channel 25 by contact between the upwardly-facing surface 450C of the coupling structure 450 with only one of the bottom ends 20A₁, 20A₂ of the respective side wall 20A, 20B of the upright angle rail 20.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. An anchor configured to be slidably received within an elongated channel defined between and bounded by a base rail and an upright angle rail of an angle rail utility trailer, the anchor comprising:

an elongated body including an elongated first side wall and an elongated second side wall extending laterally away at an angle from the elongated first side wall, each of the first and second side walls defining a respective top end and a bottom end opposite the top end, the elongated body sized and configured complementary to the elongated channel so as to be slidably receivable within the elongated channel, an anchor head extending from the top end of at least one of the first and second side walls, the anchor head configured to secure at least one structure thereto, wherein at least one of the anchor head, the first side wall and the second side wall defines at least one support surface configured to engage the bottom rail of the angle rail utility trailer to support the body of the anchor received within the channel on the bottom rail with the anchor head extending above the bottom rail, and means for engaging at least one of the first and second side walls at or near a respective bottom end thereof and at least one of the bottom rail and a lower terminal end of the upright angle rail following insertion of the elongated body into the channel to prevent or restrict upward movement of the anchor within the channel.

2. The anchor of claim 1, wherein the elongated channel is defined between inwardly-facing surfaces of two side walls of the upright angle rail and an outwardly-facing surface of a side wall of the bottom rail such that the channel defines a triangular transverse cross section, and wherein the first and second side walls of the elongated body laterally intersect at an apex which extends along a length of the first and second side walls, each of the first and second side walls having a respective lateral terminal end extending laterally away from the apex between the respective top and bottom end, the angle and lengths of the first and second side walls between the apex and the respective lateral terminal ends together defining an open-ended triangular transverse cross section.

3. The anchor of claim 1, wherein at least one of the first and second side walls of the elongated body defines a step between the bottom and top ends thereof, and wherein the step defines the at least one support surface.

4. The anchor of claim 3, wherein the step is located adjacent to the anchor head such that, with the body of the anchor received within the channel, the anchor head is adjacent to the bottom rail.

5. The anchor of claim 1, wherein a step is spaced apart from the anchor head such that, with the body of the anchor received within the channel, the anchor head is spaced apart from the bottom rail.

6. The anchor of claim 1, wherein the anchor head defines at least one downwardly-facing surface, and wherein the at least one downwardly-facing surface of the anchor head defines the at least one support surface.

7. The anchor of claim 1, wherein the anchor head is configured to secure at least one engagement structure thereto.

8. The anchor of claim 7, wherein the anchor head includes a first portion extending from the top end of the first side wall and a second portion extending from the top end of the second side wall, and wherein the first portion of the anchor head is configured to secure at least one engagement structure thereto and the second portion of the anchor head is configured to secure at least another engagement structure thereto.

9. The anchor of claim 1, wherein the anchor head includes a first portion extending from the top end of the first side wall and a second portion extending from the top end of the second side wall, and wherein the first and second portions of the anchor head are both configured to secure an installable trailer side wall thereto.

10. The anchor of claim 7, wherein the anchor head includes a first portion extending from the top end of the first side wall and a second portion extending from the top end of the second side wall, and wherein the first portion of the anchor head is configured to secure at least one engagement structure thereto and the second portion of the anchor head is configured to secure at least another engagement structure thereto, and wherein the first and second portions are each configured to extend partially about the upright angle rail of the angle rail utility trailer so as to be accessible from outside of the trailer.

11. The anchor of claim 7, wherein the anchor head includes a first portion extending from the top end of the first side wall and a second portion extending from the top end of the second side wall, and wherein the first and second portions of the anchor head are together configured to receive therein and support a rod or pin, and wherein the rod or pin is configured to define an anchor point to which to secure a web or strap.

12. An anchoring system for an angle rail utility trailer including a plurality of upright angle rails secured to an along the base rail, a different one of a corresponding plurality of elongated channels is defined between each of the plurality of upright angle rails and the base rail, the anchoring system comprising:

a plurality of the anchors each according to claim 1, each of the plurality of anchors configured to be slidably received within a different one of the plurality of elongated channels, and an accessory support panel configured to be attached to the anchor heads of two or more of the plurality of anchors, the accessory support panel configured to support or to secure thereto at least one accessory.

13. The anchor of claim 1, wherein the elongated body includes an elongated third side wall extending between lateral sides of the first and second elongated side walls to form a closed elongated body, and wherein the anchor head and the means for engaging are both detachably mountable to the elongated body.

14. An anchor configured to be slidably received within an elongated channel defined between and bounded by a base rail and an upright angle rail of an angle rail utility trailer, the anchor comprising:

an elongated body including an elongated first side wall and an elongated second side wall extending laterally away at an angle from the elongated first side wall, each of the first and second side walls defining a respective top end and a bottom end opposite the top end, the elongated body sized and configured complementary to the elongated channel so as to be slidably receivable within the elongated channel, an anchor head extending from the top end of at least one of the first and second side walls, the anchor head configured to secure at least one engagement structure thereto, wherein at least one of the anchor head, the first side wall and the second side wall defines at least one support surface configured to engage the bottom rail of the angle rail utility trailer to support the body of the anchor received within the channel on the bottom rail with the anchor head extending above the bottom rail, and an anchor coupling structure configured to detachably engage at least one of the first and second side walls at or near a respective bottom end thereof, the anchor coupling structure sized and configured such that, with the elongated body received within the channel and the engagement member engaged with the at least one of the first and second side walls at or near a respective bottom end thereof, the anchor coupling structure prevents or restricts upward movement of the elongated body within the channel by contact with at least one of the bottom rail and a lower terminal end of the upright angle rail.

15. The anchor of claim 14, wherein the first side wall of the elongated body defines a first opening at or near the bottom end thereof, and wherein the anchor coupling structure is configured to be received within the first opening and to be detachably engaged to the elongated body.

16. The anchor of claim 15, wherein the second side wall of the elongated body defines a second opening at or near the bottom end thereof, and wherein the anchor coupling structure is further configured to be received within the second opening.

17. The anchor of claim 16, wherein the anchor coupling structure comprises:

a pin configured to extend through both of the first and second openings, and a clip or bracket configured to detachably mount to the pin and to prevent the pin from passing out of either of the first and second openings.

18. The anchor of claim 14, wherein an ear or tab extends away from the bottom end of the first side wall of the elongated body, the ear or tab defining a first opening therein, and wherein the anchor coupling structure comprises an anchor plate defining a second opening therein, and a fixation member configured to be received within the first and second openings to detachably secure the anchor plate to the ear or tab, the anchor plate configured, upon securement to the ear or tab, to prevent or restrict upward movement of the elongated body within the channel by contact with at least one of the bottom rail and the lower terminal end of the upright angle rail.

19. The anchor of claim 14, wherein the anchor coupling structure is movably coupled to the first wall of the elongated body, and wherein the anchor coupling structure is configured, upon receipt of the elongated body within the elongated channel, to move under bias to a position in which the anchor coupling structure prevents or restricts upward movement of the elongated body within the channel by contact with at least one of the bottom rail and the lower terminal end of the upright angle rail.

20. The anchor of claim 14, wherein the elongated body includes an elongated third side wall extending between lateral sides of the first and second elongated side walls to form a closed elongated body, and wherein the anchor head and the anchor coupling structure are both detachably mountable to the elongated body.

* * * * *